(12) United States Patent
Fukuguchi

(10) Patent No.: US 7,836,265 B2
(45) Date of Patent: Nov. 16, 2010

(54) STORAGE SYSTEM, MANAGEMENT METHOD, AND MANAGEMENT APPARATUS

(75) Inventor: Hitoshi Fukuguchi, Odawara (JP)

(73) Assignee: Hitachi, Ltd., Tokyo (JP)

( * ) Notice: Subject to any disclaimer, the term of this patent is extended or adjusted under 35 U.S.C. 154(b) by 514 days.

(21) Appl. No.: 11/657,554

(22) Filed: Jan. 25, 2007

(65) Prior Publication Data

US 2008/0133854 A1 Jun. 5, 2008

(30) Foreign Application Priority Data

Dec. 4, 2006 (JP) .............................. 2006-326754

(51) Int. Cl.
*G06F 19/00* (2006.01)
*G06F 12/00* (2006.01)
(52) U.S. Cl. ............... 711/161; 711/162; 711/E12.103; 707/725; 707/999.204; 707/E17.001; 707/E17.007; 707/E17.008; 714/E11.118; 714/E11.121; 714/E11.123; 714/E11.124; 714/E11.125; 705/1.1; 705/317; 434/109; 700/306; 725/29
(58) Field of Classification Search ................. 711/161, 711/162
See application file for complete search history.

(56) References Cited

U.S. PATENT DOCUMENTS 6,744,762 B1 * 6/2004 Hojo .......................... 370/392

| | | | | |
|---|---|---|---|---|
| 2001/0054133 A1* | 12/2001 | Murotani et al. | ............ | 711/114 |
| 2005/0055428 A1* | 3/2005 | Terai et al. | ................... | 709/220 |
| 2006/0047930 A1 | 3/2006 | Takahashi et al. | | |
| 2006/0064541 A1* | 3/2006 | Kano | ......................... | 711/114 |
| 2006/0075007 A1* | 4/2006 | Anderson et al. | ........... | 707/206 |
| 2006/0107016 A1* | 5/2006 | Murotani et al. | ............ | 711/170 |
| 2006/0179087 A1 | 8/2006 | Fujii et al. | | |
| 2006/0197724 A1* | 9/2006 | Sakai | .......................... | 345/87 |
| 2006/0209707 A1* | 9/2006 | Nakaya et al. | .............. | 370/252 |

FOREIGN PATENT DOCUMENTS

JP 2006-215954 2/2005
JP 2006-099748 8/2005

* cited by examiner

*Primary Examiner*—Reginald G Bragdon
*Assistant Examiner*—Daniel J Bernard
(74) *Attorney, Agent, or Firm*—Volpe and Koenig, P.C.

(57) ABSTRACT

In order to provide a storage system for enabling an administrator to manage information for each apparatus in a straightforward manner, the present invention comprises an acquiring section for acquiring a connection relationship of host apparatus, host management apparatus, storage apparatus, and storage management apparatus, a storage relationship for programs of every host apparatus, and a saving time period for saving data of every program, based on external operation, and a display control section for displaying the connection relationship and storage relationship acquired by the acquiring section on a display screen, and displaying the saved time period of every program on the same screen as the connection relationship and the storage relationship.

17 Claims, 56 Drawing Sheets

FIG.8

| APPLICATION NUMBER | DATA TYPE |
|---|---|
| AP1 | DATA TYPE "MAIL DATA" |
| AP2 | LEDGER DATA |

| HOST APPARATUS NUMBER | APPLICATION NUMBER |
|---|---|
| H1 | AP1 |
| H1 | AP2 |

| APPLICATION NUMBER | ARCHIVE SETTING | NUMBER OF YEARS TO BE SAVED | STORAGE APPARATUS NUMBER |
|---|---|---|---|
| AP1 | 1 | FIVE YEARS | ST1 |
| AP2 | 1 | TEN YEARS | ST1 |

| IP ADDRESS | USER ID | PASSWORD |
|---|---|---|
| 192.168.xxx.1 | admin | root |
| 192.172.xxx.100 | test | user |
| ⋮ | ⋮ | ⋮ |
| 192.200.xxx.145 | set | set |
| ⋮ | ⋮ | ⋮ |

| ARCHIVE APPARATUS NUMBER | APPLICATION NUMBER | ARCHIVE SETTING | NUMBER OF YEARS TO BE SAVED | STORAGE APPARATUS NUMBER | DATA TYPE |
|---|---|---|---|---|---|
| AC1 | AP1 | 1 | FIVE YEARS | ST1 | MAIL DATA |
| AC1 | AP2 | 1 | TEN YEARS | ST1 | LEDGER DATA |
| AC2 | AP3 | 1 | FIVE YEARS | ST2 | MAIL DATA |
| AC2 | AP4 | 1 | TEN YEARS | ST2 | LEDGER DATA |
| AC3 | AP5 | 1 | FIVE YEARS | ST3 | MAIL DATA |
| AC3 | AP6 | 0 | - | ST3 | LEDGER DATA |
| ... | ... | ... | ... | ... | ... |

| REGULATING LAW NUMBER | REGULATING LAW NAME | NUMBER OF YEARS TO BE SAVED |
|---|---|---|
| 1 | ELECTRONIC LEDGER SAVING LAW | TEN YEARS |
| 2 | IT SHEET BULK LAW | THREE YEARS |
| 3 | ELECTRONIC SIGNATURE LAW | TEN YEARS |
| 4 | ELECTRONIC CONTRACT LAW | FIVE YEARS |
| 5 | PROTECTION OF PERSONAL INFORMATION LAW | FIVE YEARS |
| 6 | ELECTRONIC DOCUMENT LAW | FIVE YEARS |
| ⋮ | ⋮ | ⋮ |

| APPLICATION NUMBER | NUMBER OF YEARS TO BE SAVED | WORM SETTING | ARCHIVE SETTING | REGULATING LAW NAME | DATA TYPE |
|---|---|---|---|---|---|
| AP1 | FIVE YEARS | 1 | 1 | ELECTRONIC DOCUMENT LAW | MAIL DATA |
| AP2 | TEN YEARS | 0 | 1 | ELECTRONIC LEDGER SAVING LAW | LEDGER DATA |
| AP3 | FIVE YEARS | 1 | 1 | ELECTRONIC DOCUMENT LAW | MAIL DATA |
| AP4 | TEN YEARS | 1 | 1 | ELECTRONIC LEDGER SAVING LAW | LEDGER DATA |
| AP5 | FIVE YEARS | 1 | 1 | ELECTRONIC DOCUMENT LAW | MAIL DATA |
| AP6 | - | 0 | 0 | - | LEDGER DATA |
| ... | ... | ... | ... | ... | ... |

FIG.17

| ARCHIVE APPARATUS NUMBER | USER ID | PASSWORD | RANGE OF PERMISSIONS |
|---|---|---|---|
| Ac1 | manager | pass | all |
| Ac1 | japan | yen | view |
| Ac1 | korea | won | view.setting |
| Ac2 | america | doller | all |
| ⋮ | ⋮ | ⋮ | ⋮ |

| DATA TYPE NUMBER | DATA TYPE |
|---|---|
| 1 | MAIL DATA |
| 2 | LEDGER DATA |
| ⋮ | ⋮ |

126A  126B

126

| APPLICATION NUMBER | CHANGED NUMBER OF YEARS TO BE SAVED |
|---|---|
|  |  |
|  |  |
|  |  |
| ⋮ | ⋮ |

127A  127B  (127)

| CHANGED DATA TYPE |
|---|
|  |

128A  (128)

| APPLICATION NUMBER | TRANSFER DESTINATION STORAGE APPARATUS NUMBER |
|---|---|
|  |  |
|  |  |
| ⋮ | ⋮ |

| 221 | 222 | 223 220 |
|---|---|---|
|  | REGULATING LAW NAME | NUMBER OF YEARS TO BE SAVED |
| 1 | ELECTRONIC LEDGER SAVING LAW | TEN YEARS |
| 2 | IT SHEET BULK LAW | THREE YEARS |
| 3 | ELECTRONIC SIGNATURE LAW | TEN YEARS |
| 4 | ELECTRONIC CONTRACT LAW | FIVE YEARS |
| 5 | PROTECTION OF PERSONAL INFORMATION LAW | FIVE YEARS |
| 6 | ELECTRONIC DOCUMENT LAW | FIVE YEARS |
| ⋮ | ⋮ 224 | ⋮ |
| - | OTHER | - |

ADD  CHANGE  OK  CANCEL
225    226    227  228

FIG.27

| 221 | 222 | 223 / 220 | 240 / 241 |
|---|---|---|---|
|  | REGULATING LAW NAME | NUMBER OF | ALL APPLICATIONS LIST DISPALY |
|  |  |  | UNSET APPLICATIONS LIST DISPALY |
| 1 | ELECTRONIC LEDGER SAVING LAW | TEN YEARS | 242 |
| 2 | IT SHEET BULK LAW | THREE YEARS |  |
| 3 | ELECTRONIC SIGNATURE LAW | TEN YEARS |  |
| 4 | ELECTRONIC CONTRACT LAW | FIVE YEARS |  |
| 5 | PROTECTION OF PERSONAL INFORMATION LAW | FIVE YEARS |  |
| 6 | ELECTRONIC DOCUMENT LAW | FIVE YEARS |  |
| ⋮ | ⋮ (224) | ⋮ |  |
| - | OTHER | - |  |

| ADD (225) | CHANGE (226) | OK (227) | CANCEL (228) |

FIG.28

| | ALL APPLICATION NUMBERS | NUMBER OF YEARS TO BE SAVED |
|---|---|---|
| ☐ | AP1 | FIVE YEARS |
| ☐ | AP2 | TEN YEARS |
| ☐ | AP3 | FIVE YEARS |
| ☐ | AP4 | TEN YEARS |
| ☐ | AP5 | FIVE YEARS |
| ☐ | AP6 | - |
| ⋮ | ⋮ | ⋮ |

OK    CANCEL

FIG.30

| 221 | 222 | 223 | 220 |
|---|---|---|---|
|  | REGULATING LAW NAME | NUMBER OF YEARS TO BE SAVED | |
| 1 | ELECTRONIC LEDGER SAVING LAW | TEN YEARS | |
| 2 | IT SHEET BULK LAW | THREE YEARS | |
| 3 | ELECTRONIC SIGNATURE LAW | TEN YEARS | |
| 4 | ELECTRONIC CONTRACT LAW | FIVE YEARS | |
| 5 | PROTECTION OF PERSONAL INFORMATION LAW | FIVE YEARS | |
| 6 | ELECTRONIC DOCUMENT LAW | FIVE YEARS | |
| ... | ... 224 | ... | |
| - | OTHER | UNSET APPLICATION AUTOMATIC CHANGE 270 | |
| ADD 225 | CHANGE 226 | OK 227 | CANCEL 228 |

FIG.32

| | TRANSFERRED APPLICATION NUMBERS |
|---|---|
| ☐ | AP11 |
| ☐ | AP12 |
| ☐ | AP13 |
| ☐ | AP14 |
| ☐ | AP15 |
| ☐ | AP16 |
| ☐ | AP17 |
| ⋮ | ⋮ |

291 292 290

OK    CANCEL 293   294

STORAGE SYSTEM, MANAGEMENT METHOD, AND MANAGEMENT APPARATUS

BACKGROUND OF THE INVENTION

1. Field of the Invention

The present invention relates to a storage system, management method, and management apparatus, appropriate for application in, for example, a storage system where a plurality of host apparatus, storage apparatus, and management apparatus managing the apparatus are connected.

2. Description of the Related Art

In the related art, computer systems are implemented where host apparatus and storage apparatus are connected to a network so that data managed by the host apparatus is transmitted and received via the network, and the data is stored on a hard disc within the storage apparatus.

In recent years, from the point of view of compliance etc., it has been necessary to retain even data that is used infrequently for legally defined periods. To this end, this kind of infrequently used data is moved to another storage apparatus and saved.

As this kind of computer system, for example, in patent document 1, a storage system is proposed, for example, in patent document 1, for a computer system where a plurality of storage apparatus each having at least one volume and the volumes each of the storage apparatus are in possession of are managed virtually in a collective manner. Attribute information for each volume is then managed, and designated transfer source volumes are then relocated at instructed storage tiers between pluralities of storage tiers respectively generated based on a plurality of preset policies and volume attribute information.

Further, for example, in patent document 2, a storage system is proposed where data sent from the host apparatus is written to an empty region of a volume made to correlate to a saving period in order from the top, and the region written with the data is made to be a write-inhibit region.

[Patent Document 1] Japanese Patent Laid-open Publication No. 2006-099748.

[Patent Document 2] Japanese Patent Laid-open Publication No. 2006-215954.

However, in the computer system described above, the number of years data handled by applications at host apparatus is to be saved for is inputted manually at each respective apparatus. It is therefore necessary for an administrator of the computer system to confirm setting information for connection conditions and number of years to be saved information etc. at each respective apparatus in the event of, for example, confirming storage apparatus storing application data of the host apparatus or in the event of confirming the number of years application of host apparatus is to be saved for, which makes the administrative work of the administrator substantial.

This means that the administrative work of the administrator increases more and more as the scale of the computer system is increased by connecting a large number of host apparatus, storage apparatus, and other apparatus.

The present invention therefore proposes a storage system, management method and management apparatus taking into consideration the above points where an administrator can manage and acquire information of each apparatus in a straightforward manner.

SUMMARY

In order to resolve the above problems, the present invention is provided with host apparatus for storing predetermined programs, host management apparatus for managing the host apparatus, storage apparatus for storing data handled by the programs, storage management apparatus for managing the storage apparatus, and management apparatus for managing the host apparatus, the host management apparatus, the storage apparatus and the storage management apparatus. The management apparatus is provided with an acquiring section for acquiring a connection relationship between the host apparatus, the host management apparatus, the storage apparatus and the storage management apparatus, a storage relationship for the programs every host apparatus, and a saving period of saving the data every program, based on external operation, and a display control section for displaying the connection relationship and the storage relationship acquired by the acquiring section on a display screen, and displaying the saving period every program on the same screen as the connection relationship and the storage relationship.

It is therefore possible to effectively prevent substantial increases in management tasks where the administrator has to confirm information for the connection relationship, storage relationship and saving period of each of the apparatus of the host apparatus, host management apparatus, storage apparatus and storage management apparatus, and it is possible to confirm information for the connection relationship, storage relationship and saving period described above in a straightforward manner.

Further, the present invention is also provided with a first step of a processor acquiring a connection relationship of host apparatus for storing predetermined programs, host management apparatus for managing the host apparatus, storage apparatus for storing the data handled by the programs, and storage management apparatus for managing the storage apparatus, a relationship for storing the programs every host apparatus, and saving periods for saving the data every program, based on external operation, and a second step of a processor displaying the connection relationship and the storage relationship acquired in the first step on a display screen, and displaying the saving period every program on the same screen as the connection relationship and the storage relationship.

It is therefore possible to effectively prevent substantial increases in management tasks where the administrator has to confirm information for the connection relationship, storage relationship and saving period of each of the apparatus of the host apparatus, host management apparatus, storage apparatus and storage management apparatus, and it is possible to confirm information for the connection relationship, storage relationship and saving period described above in a straightforward manner.

Further, in the present invention, management apparatus for managing a plurality of apparatus are provided with an acquiring section for acquiring a connection relationship for the plurality of apparatus, a storage relationship for predetermined programs stored at predetermined apparatus of the apparatus, and a saving period for saving the data each program, and a display control section for displaying the connection relationship and the storage relationship acquired by the acquiring section on a display screen, and displaying the saving period every program on the same screen as the connection relationship and the storage relationship.

It is therefore possible to effectively prevent substantial increases in management tasks where the administrator has to confirm information for the connection relationship, storage relationship and saving period of each apparatus, and it is possible to confirm information for the connection relationship, storage relationship and saving period described above in a straightforward manner.

According to the present invention, by acquiring a connection relationship of host apparatus for storing predetermined programs, host management apparatus for managing the host apparatus, storage apparatus for storing the data handled by the programs, and storage management apparatus for managing the storage apparatus, a relationship for storing the programs every host apparatus, and saving periods for saving the data every program, based on external operation, and displaying the connection relationship and the storage relationship acquired in the first step on a display screen, and displaying the saving period every program on the same screen as the connection relationship and the storage relationship, it is possible to effectively prevent substantial increases in management tasks where the administrator has to confirm information for the connection relationship, storage relationship and saving period of each of the apparatus of the host apparatus, host management apparatus, storage apparatus and storage management apparatus, it is possible to confirm information for the connection relationship, storage relationship and saving period described above in a straightforward manner, and it is possible to implement a storage system where an administrator can manage and acquire information for each apparatus in a straightforward manner.

BRIEF DESCRIPTION OF THE DRAWINGS

FIG. 8 is an outline view illustrating an application—data type management table;

FIG. 9 is an outline view illustrating a host apparatus—application management table;

FIG. 10 is an outline view illustrating an application—archive setting management table;

FIG. 13 is an outline view illustrating an IP address management table;

FIG. 14 is an outline view illustrating an archive apparatus—application management table;

FIG. 15 is an outline view illustrating a regulating law management table;

FIG. 16 is an outline view illustrating an application attribute management table;

FIG. 17 is an outline view illustrating an archive apparatus password management table;

FIG. 18 is an outline view illustrating a data type management table;

FIG. 25 is an outline view illustrating a regulating law setting/saved year changing display column;

FIG. 27 is an outline view illustrating an application list display button;

FIG. 28 is an outline view illustrating an all applications list display column;

FIG. 30 is an outline view illustrating an unset application automatic change button;

FIG. 32 is an outline view illustrating a transferred applications list display column;

DESCRIPTION OF THE EMBODIMENT

The following is a description with reference to the drawings below of a first embodiment of the present invention.

(1) Configuration of Storage System and Each Apparatus of this Embodiment.

Figure 1:
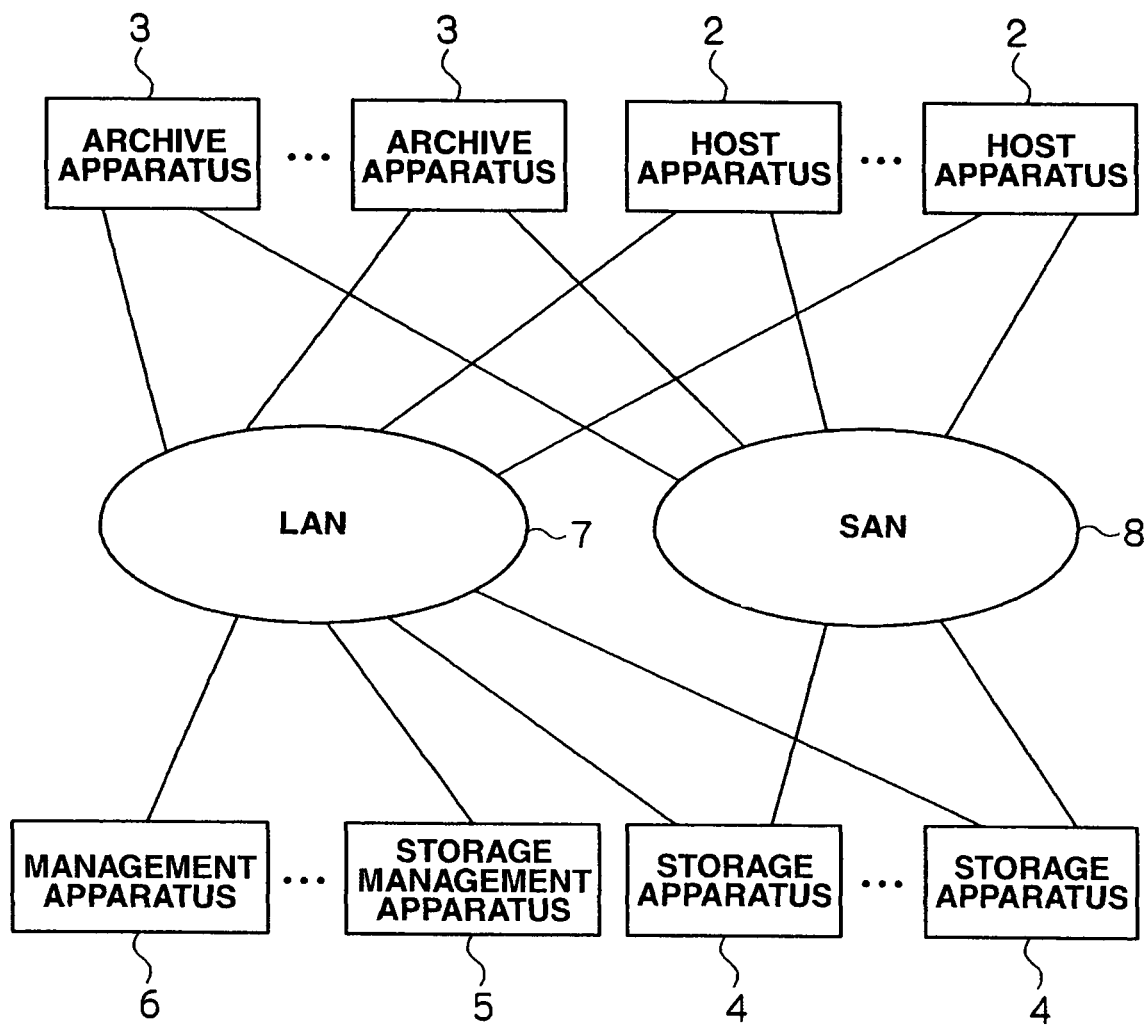
FIG. 1 is a block view showing an outline configuration for a storage system of an embodiment.

FIG. 1 shows a configuration for a storage system 1 of a first embodiment of the present invention. The storage system 1 is configured from host apparatus 2, archive apparatus (host management apparatus) 3, storage apparatus 4, storage management apparatus 5 and management apparatus 6 connected via a LAN (Local Area Network) 7, and host apparatus 2, archive apparatus 3 and storage apparatus 4 connected via a SAN (Storage Area Network) 8. There may be just one or a plurality of host apparatus 2, archive apparatus 3, and storage apparatus 4.

Figure 2:
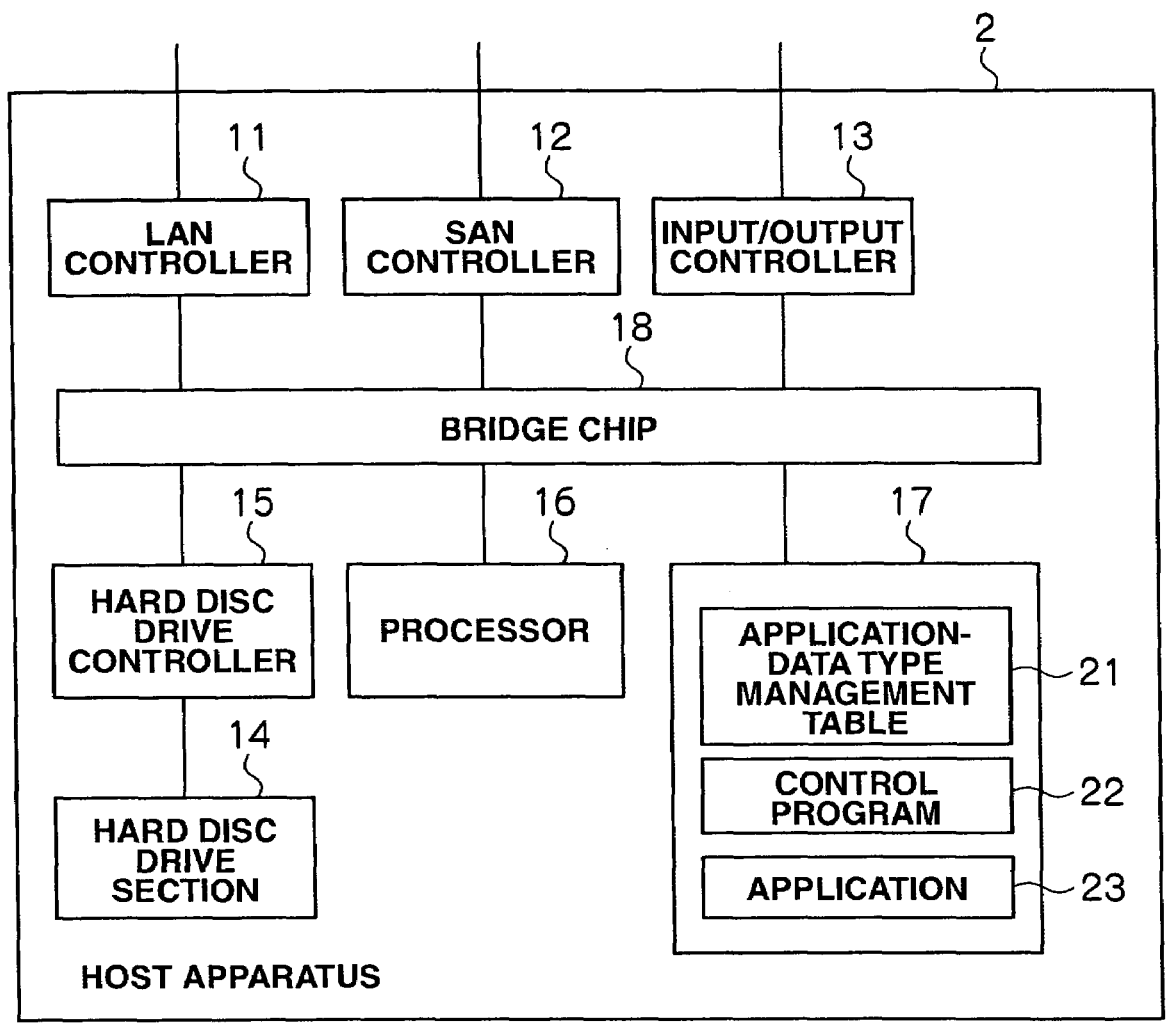
FIG. 2 is a block view showing an outline configuration for host apparatus.

FIG. 2 shows an example configuration for host apparatus 2. Host apparatus 2 is apparatus for executing various processing based on requests from client apparatus. Host apparatus 2 is configured in such a manner that a LAN controller 11, connected, for example, to a LAN 7, and controlling, for example, TCP/IP (Transmission Control Protocol/Internet Protocol) communication, a SAN controller 12 connected with a SAN 8, for controlling, for example, fiber channel communication, an input/output controller 13 for controlling information input apparatus (not shown) such as a keyboard, switch and pointing device, and microphone etc., and information output apparatus (not shown) of a monitor display and speaker etc., a hard disc drive controller 15, to which a hard disc drive section 14 equipped with a plurality of hard disc drives (not shown) is connected, for controlling the hard disc drive section 14, a CPU 16 controlling the whole of the host apparatus 2, and memory 17 for storing various tables and various programs etc. are connected via a bridge chip 18 for controlling transfer of data etc. and being connected to each of the elements of the configuration described above.

An application data type management table 21 managing the type of data handled by applications 23 (described later) every application 23, control programs 22 for controlling the whole of the host apparatus 2, one or a plurality of applications (AP) 23 executing processing for various functions such as, for example, mail functions and account ledger functions, as well as other tables and programs (not shown) are stored in the memory 17 of host apparatus 2. There may be one or a plurality of applications 23. Further, a detailed configuration for the data type management table 21 is given in the following. Moreover, the hardware configuration of this host apparatus 2 may be implemented through various forms of general purpose computers (personal computers), workstations, and mainframes, etc.

Figure 3:
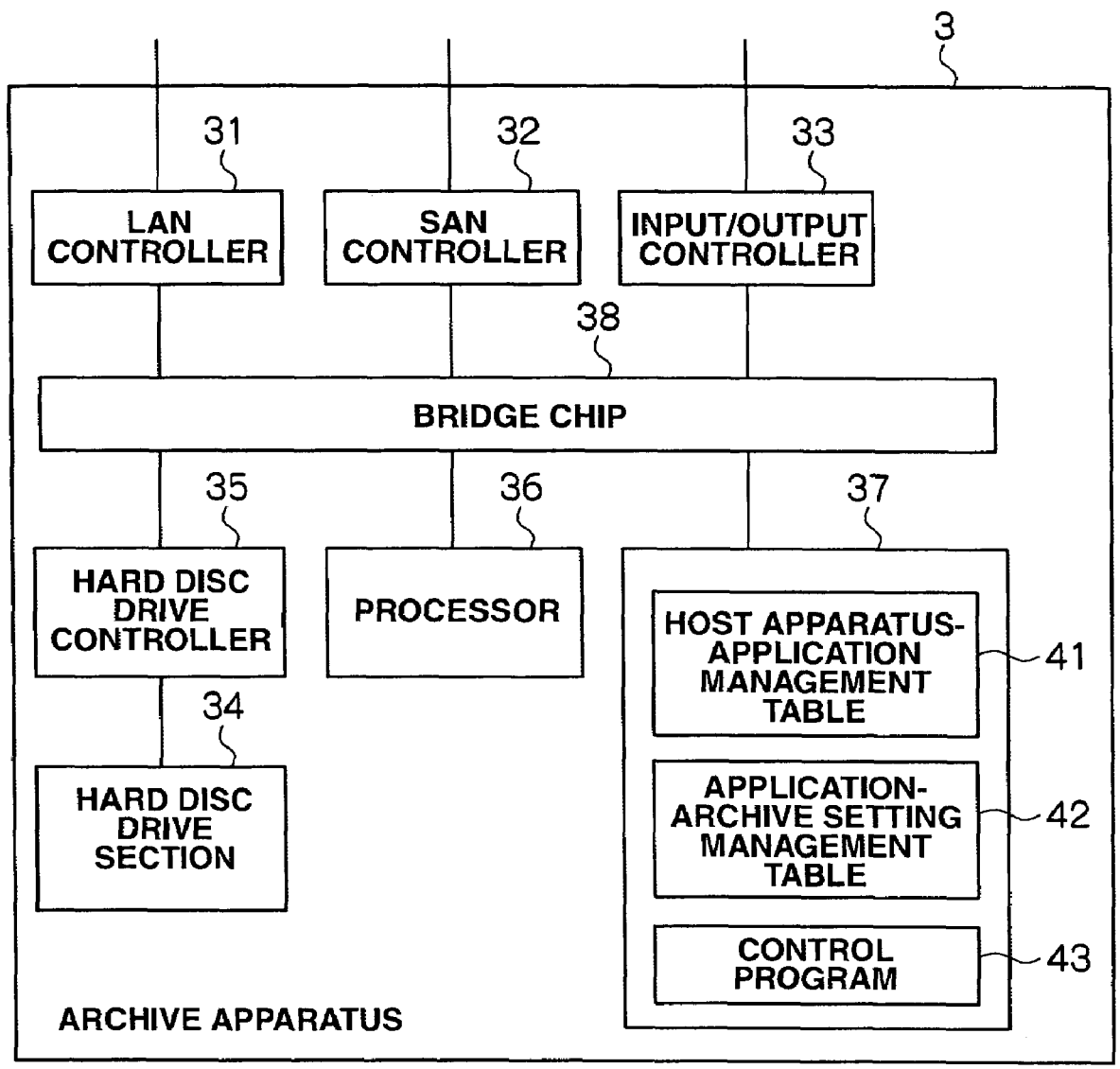
FIG. 3 is a block view showing an outline configuration for archive apparatus.

FIG. 3 shows an example configuration for archive apparatus 3. The archive apparatus 3 is apparatus for executing processing for the timing of moving data handled by an application 23 to a logical volume (described later) of storage apparatus having a WORM (Write Once Read Many) function as an archive and setting years data handled by an application 23 is to be saved for at a logical volume (described later) of storage apparatus 4 having a WORM function. In this event, an archive may be a plurality of items of data collected together into a single item of data, or the data may be compressed and then collected. Further, a WORM function refers to a function where if data is written to a logical volume (described later) once, then it cannot be erased or changed a second time.

In this embodiment, the archive apparatus 3 may be implemented using personal computers and workstations etc. configured in various forms but for ease of description, the configuration is taken to be the same as for the host apparatus 2, with the exception that the various programs and information etc. stored in the memory 37 are different. Namely, the archive apparatus 3 is configured from, for example, a LAN controller 31, SAN controller 32, input/output controller 33, hard disc driver controller 35 with a hard disc drive section 34 connected, CPU 36 and memory 37 connected via a bridge chip 38.

A host apparatus—application management table 41 managing applications 23 every host apparatus 2, an application archive setting management table 42 managing setting of archiving etc. for data managed by an application 23 every application 23, a control program 43 for controlling the whole of the archive apparatus 3, and other tables and programs (not shown) are stored in the memory 37 of the archive apparatus 3. A detailed configuration for the host apparatus—application management table 41 and the archive setting management table 42 is described in the following.

Figure 4:
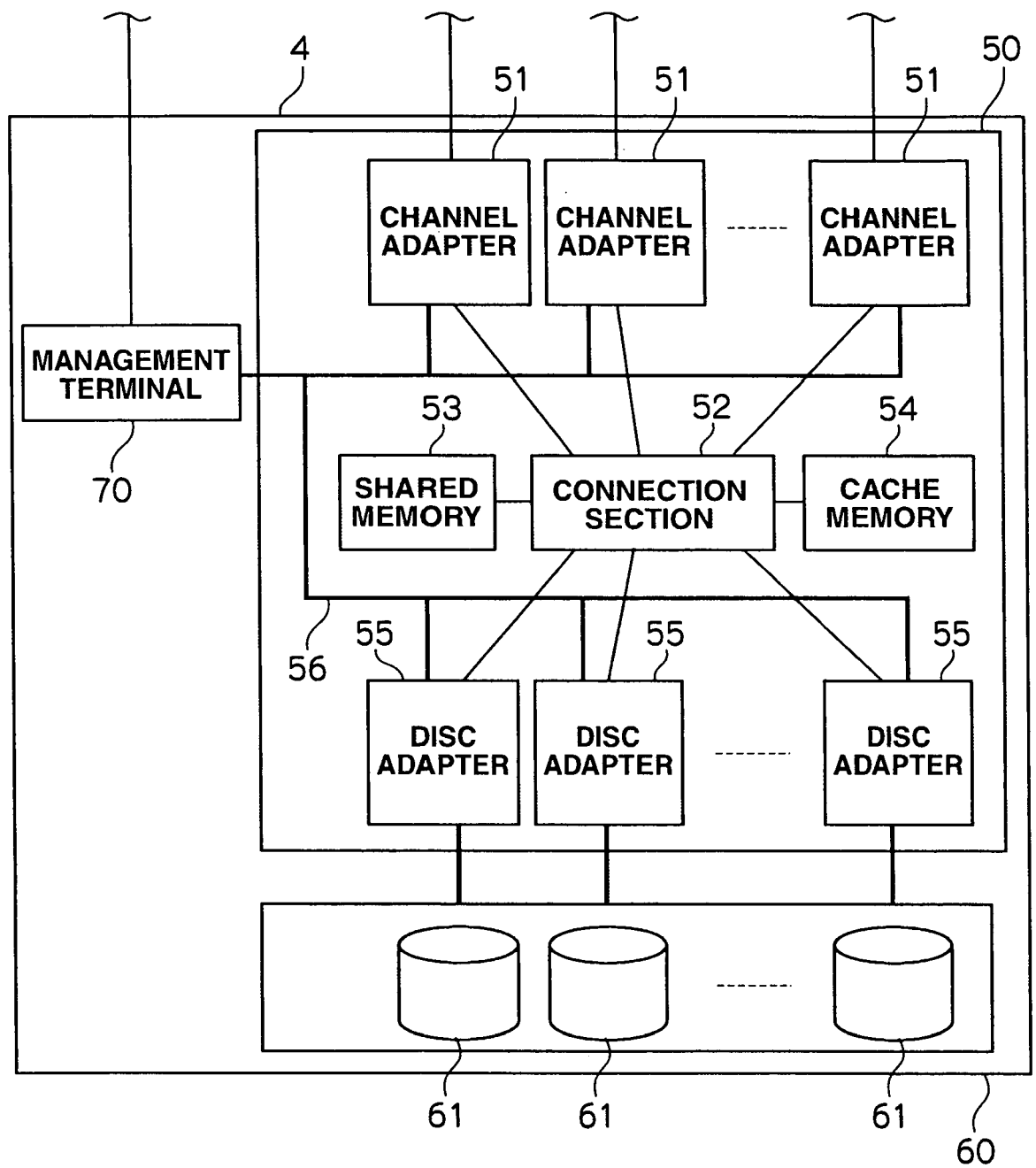
FIG. 4 is a block view showing an outline configuration for storage apparatus.

FIG. 4 shows an example of a configuration for the storage apparatus 4. The storage apparatus 4 is apparatus for executing processing for storing data handled by the applications 23 and reading out stored data etc. The storage apparatus 4 is comprised of, for example, a controller 50 for controlling input and output of data, a storage device 60 comprised of a plurality of disc devices 61 for storing data and a maintenance terminal 70 for maintaining and operating the storage apparatus 4.

The control section 50 is equipped with a plurality of channel adapters 51, a connecting section 52, shared memory 53, cache memory 54, and a plurality of disc adapters 55.

Each channel adapter 51 is configured from a microcomputer system having a microprocessor, memory, and communication interface etc., and a port for connecting respective SANs 8 and other storage apparatus 4, etc. Network addresses (for example, IP addresses, WWN) for providing identification are allocated to the ports of each channel adapter 51, so that it is possible for each channel adapter 51 to behave individually as NAS (Network Attached Storage). Further, channel adapters 51 interpret each command transmitted from the host apparatus 2 via LAN 7, the maintenance terminal 70 and an internal LAN 71.

The connecting section 52 is connected to channel adapters 51, shared memory 53, cache memory 54 and disc adapters 55. The exchange of data and commands with the channel adapters 51, shared memory 53, cache memory 54 and disc adapters 55 is carried out via this connecting section 52. The connecting section 52 is configured from a switch etc. such as, for example, an ultra-high-speed cross-bus switch for transferring data using high-speed switching.

Figure 5:
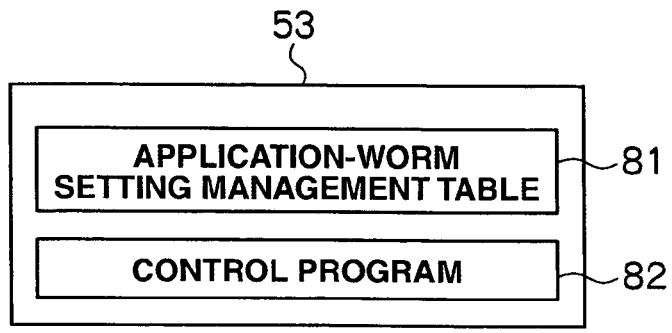
FIG. 5 is a block view showing an outline configuration for shared memory.

The shared memory 13 and the cache memory 14 are storage memory shared by the channel adapters 51 and disc adapters 55. An application—WORM setting management table 81 managing WORM settings for data handled by applications 23, a control program 82 for controlling the whole of the storage apparatus 4, various system configuration information relating to the overall configuration of other storage apparatus 4, and various tables and programs are stored in the shared memory 53, as shown in FIG. 5. Further, the shared memory 13 can be utilized in order to house commands such as write requests and read requests, etc. Further, the cache memory 14 is mainly utilized in temporarily housing data for that is the subject of reading and writing for inputting to and outputting from the storage apparatus 4.

Each disc adapter 55 is configured as a microcomputer system equipped with a microprocessor and memory etc. and functions as an interface for carrying out protocol control at the time of communication with the disc devices 61 within the storage device 60. These disc adapters 55 are connected to corresponding disc devices 61 within the storage device 60 via, for example, a fiber channel cable, and exchange data with the disc devices 61 in accordance with a fiber channel protocol.

On the other hand, as well as the application of expensive discs such as, for example, SCSI (Small Computer System Interface) discs etc. or cheap discs such as SATA (Serial AT Attachment) discs or optical discs etc., utilization of semiconductor memory such as flash memory etc. other than disc devices as the disc devices 61 for the storage device 60 is also possible.

Each disc device 61 of storage device 60 may operate using a RAID (Redundant Array of Independent Disks) method using the control section 50. One or a plurality of logical volumes (in the following, these are referred to as logical volumes) are set at physical storage regions supplied by one or a plurality of disc devices 61. This data is housed in block (hereinafter referred to as "logical block") units of a predetermined size within this logical volume. Further, it is possible for a further one or a plurality of logical volumes to be set at the one or a plurality of logical volumes. Respective unique identifiers (in the following, these are referred to as LUN's (Logical Unit Numbers)) are assigned to each logical volume. In the case of this embodiment, the input and output of data is carried out by taking a combination of this LUN and a unique logical block number (LBA: Logical Block Address) assigned to each logical block as an address, and designating this address.

The maintenance terminal 70 is terminal apparatus for controlling the overall operation of the storage apparatus 4 and is configured from, for example, a notebook-type personal computer. The maintenance terminal 70 is connected to each channel adapter 51 and each disc adapter 55 via an internal LAN 56. The maintenance terminal 70 sends various commands sent from host apparatus 2 via LAN 7, maintenance terminal 70 and internal LAN 71 to the channel adapter 51 via the internal LAN 71. Further, the administrator is capable of defining system configuration information using the maintenance terminal 70, and is capable of writing defined system configuration to the shared memory 53 via the channel adapter 51 or the disc adapters 55 and the connecting section 52.

Figure 6:
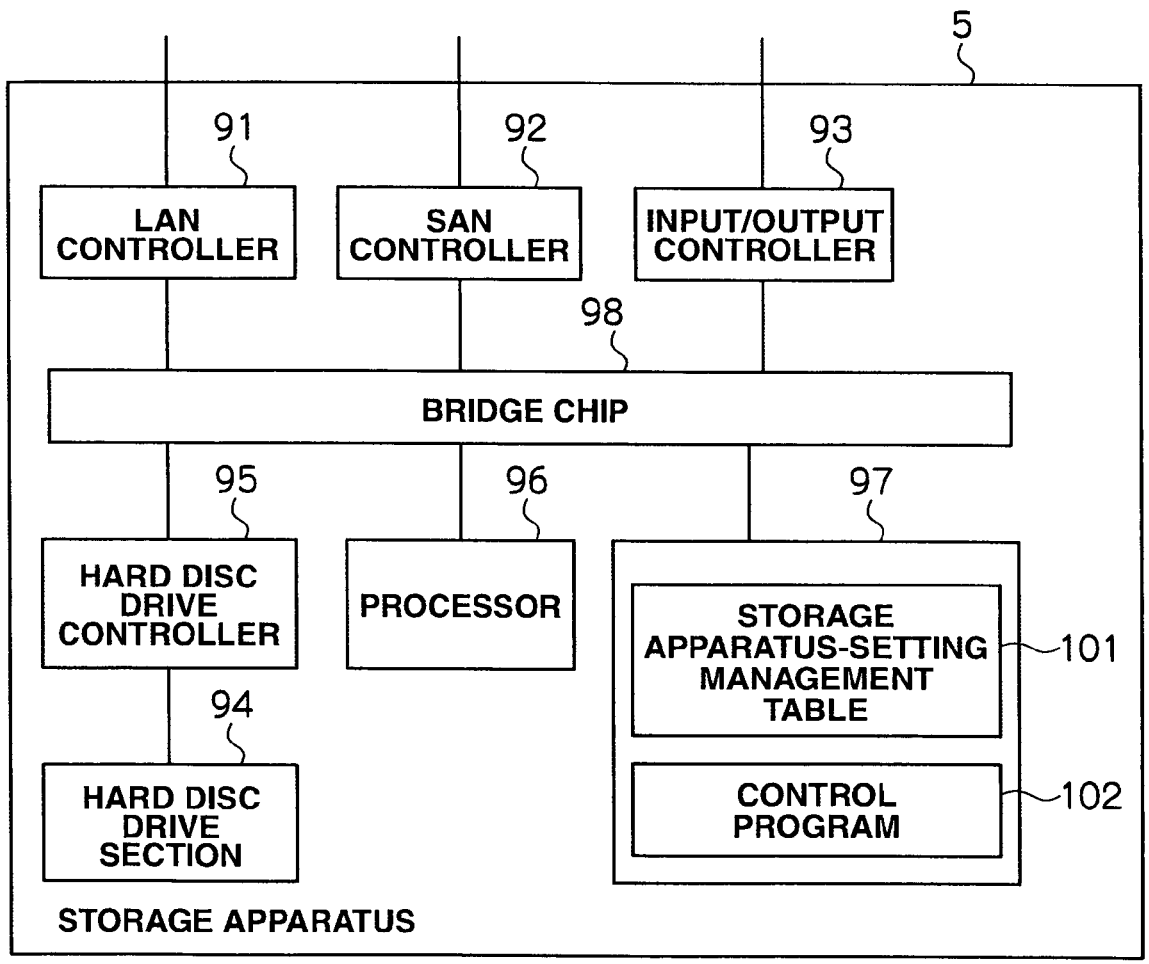
FIG. 6 is a block view showing an outline configuration for storage management apparatus.

FIG. 6 shows an example of a configuration for the storage management apparatus 5. The storage management apparatus 5 is apparatus for collectively managing system configuration information and various setting information etc. for each storage apparatus 4. In this embodiment, the storage management apparatus 5 may be implemented using personal computers and workstations etc. configured in various forms but for ease of description, the configuration is taken to be the same as for the host apparatus 2, with the exception that the various programs and information etc. stored in memory 97 are different. Namely, the storage management apparatus 5 is configured from, for example, a LAN controller 91, SAN controller 92, input/output controller 93, hard disc drive controller 95 with a hard disc drive section 94 connected, CPU 96 and memory 97 connected via a bridge chip 98.

A storage apparatus—WORM setting management table 101 for managing WORM setting for data handled by applications 23 every storage apparatus 4, a control program 102 for controlling the whole of the storage management apparatus 5, and other tables and programs (not shown) are stored in memory 97 of the storage management apparatus 5. A detailed configuration for the storage apparatus—WORM setting management table 101 is described in the following.

Figure 7:
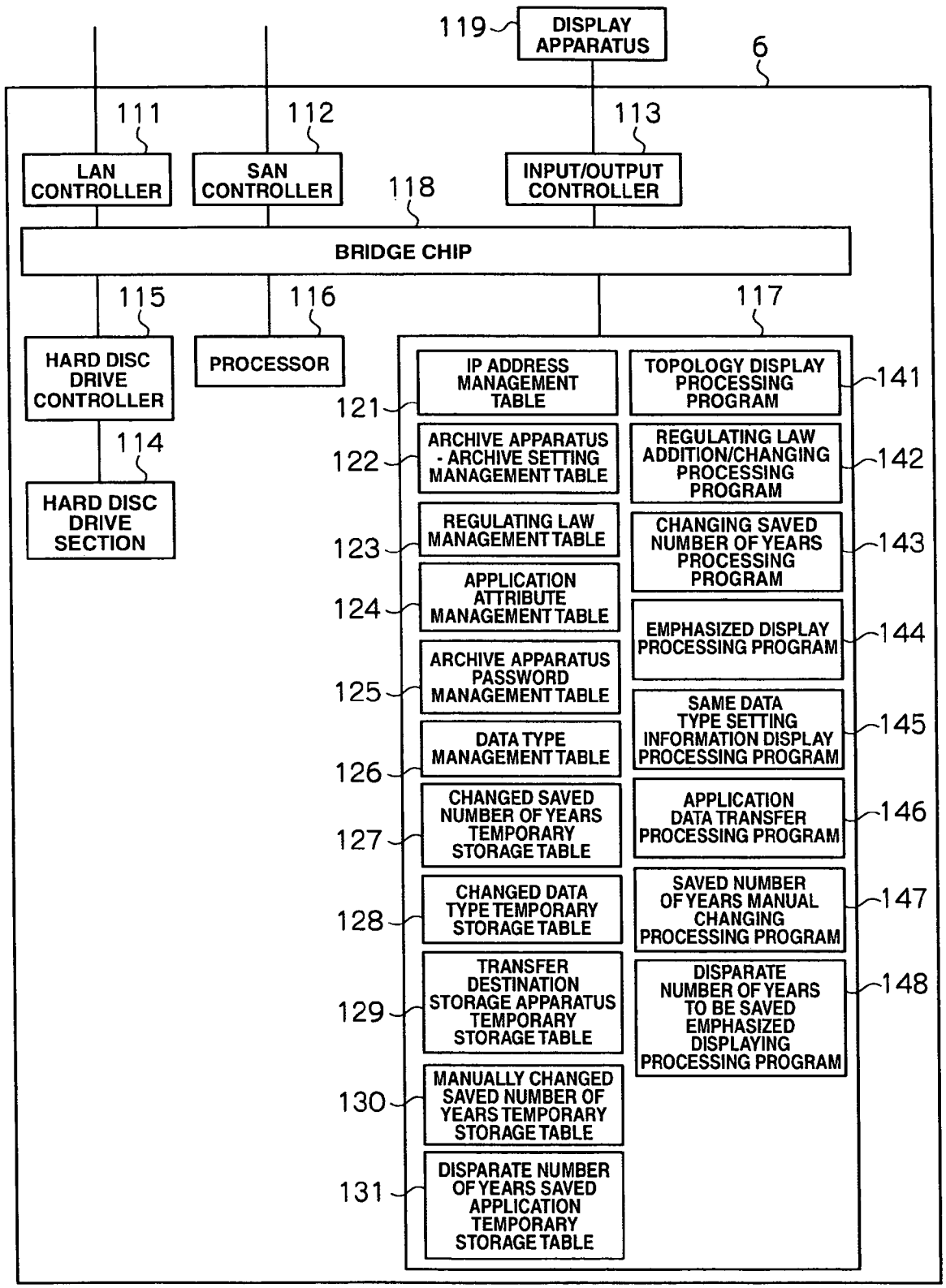
FIG. 7 is a block view showing an outline configuration for management apparatus.

FIG. 7 shows an example configuration for the management apparatus 6. The management apparatus 6 is apparatus for collectively managing system configuration information and various setting information of each host apparatus 2, archive apparatus 3, storage apparatus 4, and storage management apparatus 5. In this embodiment, the management apparatus 6 may be implemented using personal computers and workstations etc. configured in various forms but for ease of description, the configuration is taken to be the same as for the host apparatus 2, with the exception that the various programs and information etc. stored in memory 117 are different. Namely, the management apparatus 7 is configured from, for example, a LAN controller 111, SAN controller 112, input/output controller 113, hard disc drive controller 115 with a hard disc drive section 114 connected, CPU 116 and memory 117 connected via a bridge chip 118. In this case, at the management apparatus 6, as an example of connection to the input/output controller 13, for example, display apparatus 119 displaying processing results etc. are connected to the input/output controller 113.

An IP address management table 121 for managing IP addresses etc. of each host apparatus 2, archive apparatus 3, storage apparatus 4 and storage management apparatus 5, archive apparatus—application management table 122 for managing the applications 23 etc. each archive apparatus 2, regulating law management table 123 for managing regulating laws etc. stipulating the number of years data handled by the applications 23 is to be saved for, an application attribute management table 124 for managing the number of years etc. data handled by the applications 23 is to be saved for every application 23, an archive apparatus password management table 125 for managing passwords etc. for connecting with archive apparatus 3, a data type management table 126 for managing types of data handled by the applications 23, a changed saved number of years temporary storage table 127 for temporarily storing a saved number of years etc. during changing of the saved number of years, a changed data type temporary storage table 128 for temporarily storing a changed data type, a transfer destination storage apparatus temporary storage table 129 for temporarily storing transfer destination storage apparatus 4 etc. during transfer of data handled by the applications 23, a manually changed saved number of years temporary storage table 130 for temporarily storing a saved number of years etc. during manual changing of the saved number of years, a manually changed application temporary storage table 131 for temporarily storing applications during manual bulk changing of saved number of years, and other applications and programs (not shown) are stored in memory 117 of management apparatus 6.

The detail configuration of the IP address management table 121, archive apparatus—application management table 122, regulating law information management table 123, application attribute management table 124, archive apparatus password management table 125, changed saved number of years temporary storage table 127, changed data type temporary storage table 128, transfer destination storage apparatus temporary storage table 129, manually changed saved number of years temporary storage table 130 and manually changed application temporary storage table 131 is described in the following.

Further, the topology display processing program 141, regulating law addition/changing processing program 142, changing saved number of years processing program 143, emphasized display processing program 144, same data type setting information display processing program 145, application data transfer processing program 146, manually changing saved number of years processing program 147 and disparate saved number of years emphasized display processing program 148 are stored in memory 117 of management apparatus 6.

The details of the processing at the topology display processing program 141, regulating law addition/changing processing program 142, changing saved number of years processing program 143, emphasized display processing program 144, same data type setting information display processing program 145, application data transfer processing program 146, manually changing saved number of years processing program 147 and disparate saved number of years emphasized display processing program 148 is described in the following.

(2) Management Information Each Apparatus of this Embodiment is Provided with (2-1) Management Information Host Apparatus 2 is Provided with FIG. 8 shows an example of a configuration for application data type management table 21. Application data type management table 21 is comprised of an application number column 21A for managing application numbers that are identifiers for uniquely identifying applications 23, and a data type management column 21B that for managing the types of data handled by the application 23 every application 23. For example, in the event that an application 23 executing a mail function is stored in the memory 17 of host apparatus 2, as shown in FIG. 8, an application number "AP1" is housed in the application number column 21A, and a data type of "mail data" is housed in the data type column 21B corresponding to "AP1".

(2-2) Management Information the Archive Apparatus 3 is Provided with

FIG. 9 shows an example of a configuration for the host apparatus—application management table 41. The host apparatus—application management table 41 is comprised of a host apparatus number column 41A for managing a host apparatus number that is an identifier for uniquely identifying host apparatus 2, and an application number 41B for managing an application number of applications 23 stored in the host apparatus 2. For example, archive apparatus 3 collects applications 23 of host apparatus 2 intended for management by the archive apparatus 3 and manages the applications 23 each host apparatus 2. In the event that an application 23 of "AP1" is stored at host apparatus 2 of "H1" intended for management by the archive apparatus 3, as shown in FIG. 9, "H1" is stored in host apparatus number column 41A, and "AP1" is stored in the corresponding application number column 41B.

FIG. 10 shows an example of a configuration for application archive setting management table 42. Application archive setting management table 42 is configured from application number storage column 42A, archive setting column 42B for managing whether or not an archive is set for data handled by the application 23, saved number of years column 42C for managing the number of hears it is intended to save data handled by the application 23 for, and storage apparatus number column 42D for managing a storage apparatus number that is an identifier for uniquely identifying the storage apparatus 4. In this case, in the event that data handled by the application 23 is archived and stored, "1" is stored in the archive setting column 42B, and in the event that data handled by the application 23 is stored without being archived, "0" is stored in the archive setting column 42B. For example, in the event that data handled by application 23 of "AP1" is archived so as to be stored in storage apparatus 4 of "ST1", and the number of years saved is set to "five years", as shown in FIG. 10, "AP1" is stored in the application number column 42A, "1" is stored in the corresponding archive setting column 42B, "five years" is stored in the corresponding saved number of years column 42C, and "ST1" is stored in the corresponding storage apparatus number column 42D.

(2-3) Management Information the Storage Apparatus 4 is Provided with

Figure 11:
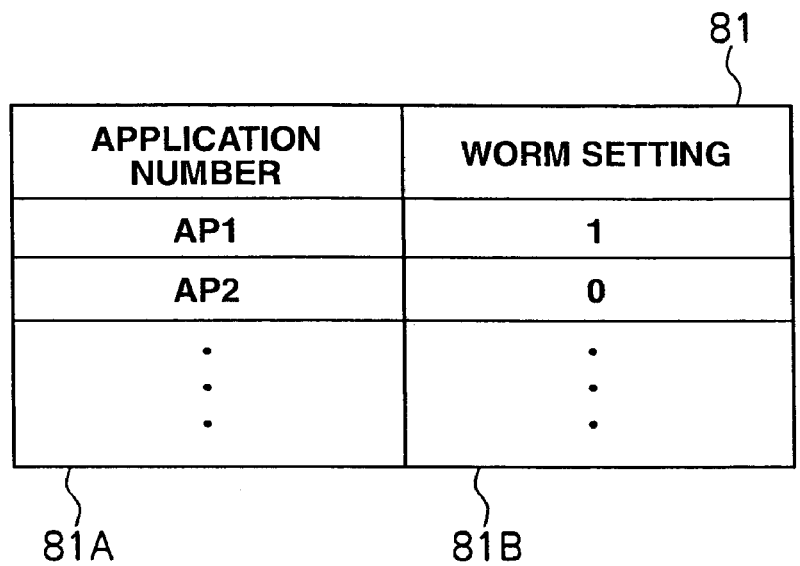
FIG. 11 is an outline view illustrating an application—WORM setting management table.

FIG. 11 shows an example of a configuration for application—WORM setting management table 81. The application—WORM setting management table 81 is comprised of an application number storage column 81A and a WORM setting column 81B for managing whether or not WORM is set for data handled by the application 23. In this case, in the event that data handled by the application 23 is set to WORM and stored, "1" is stored in the WORM setting column 81B, and in the event that data handled by the application 23 is stored without being set to WORM, "0" is stored in the WORM setting column 81B. For example, in the event that data handled by the application 23 of "AP1" is set to WORM and stored, as shown in FIG. 11, "AP1" is stored in the application number column 81A, and "1" is stored in the corresponding WORM setting column 81B.

Figure 12:
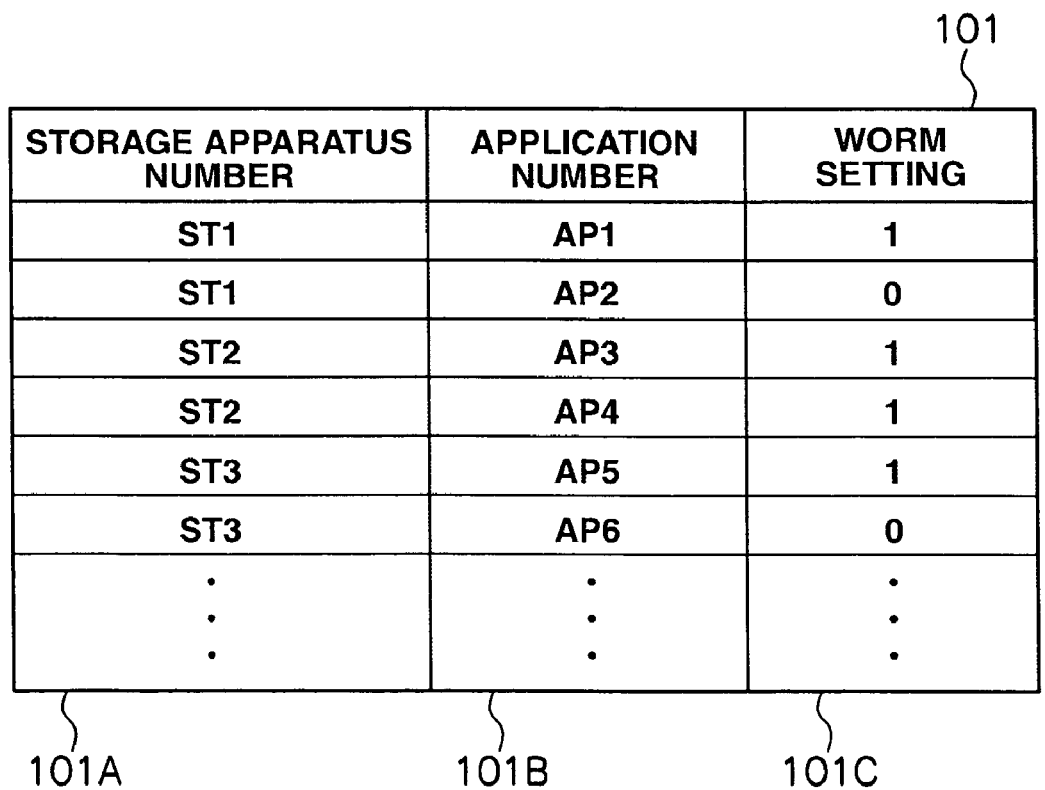
FIG. 12 is an outline view illustrating a storage apparatus—WORM setting management table.

(2-4) Management Information the Storage Management Apparatus 5 is Provided with FIG. 12 shows an example of a configuration for the storage apparatus—WORM setting management table 101. The storage apparatus—WORM setting management table 101 is comprised of a storage apparatus number 101A, application number 101B and WORM setting column 101C. For example, the storage management apparatus 5 collects information for application 23 of storage apparatus to be managed by the storage management apparatus 5, and identifies and manages this information every host apparatus 2. For example, in the event that data handled by the application 23 of "AP1" at the storage apparatus 4 of "ST1" is set to WORM and stored, as shown in FIG. 12, "ST1" is stored in storage apparatus number 101A, "AP1" is stored in the corresponding application number 101B, and "1" is stored in the corresponding WORM setting column 101C.

(2-5) Management Information Management Apparatus 6 is Provided with

FIG. 13 shows an example configuration for IP address management table 121. IP address management table 121 is comprised of an IP address column 121A for managing IP addresses of each host apparatus 2, archive apparatus 3, storage apparatus 4 and storage management apparatus 5, a user ID column for managing user ID's and passwords for connecting each apparatus, and a password column 121C. For example, in the event that the user ID of the host apparatus 2 of IP address "192.168.xxx.1" is "admin", and the password is "root", as shown in FIG. 13, "192.168.xxx.1" is stored in the IP address column 121A, "admin" is stored in the corresponding user ID column 121B, and "root" is stored in the corresponding password column 121C.

FIG. 14 shows an example configuration for the archive apparatus—application management table 122. Archive apparatus—application management table 122 is configured from an archive apparatus number column 121A for managing an archive apparatus number that is an identifier for uniquely identifying the archive apparatus 3, an application number column 121B, an archive setting column 121C, a saved number of years column 122D, a storage apparatus number 122E, and a data type column 122F. For example, the management apparatus 6 collects the application data type management tables 21 for host apparatus 2 to be managed by the management apparatus 6 and application archive setting management table 42 of the archive apparatus 3 for management every archive apparatus 3. Therefore, in the event that an application 23 of "mail data" of "AP1" is archived and stored at storage apparatus 4 of "ST1" at archive apparatus 3 of "AC1" to be managed by management apparatus 6, and the number of years saved is set to "five years", as shown in FIG. 14, "AC1" is stored in archive apparatus number column 121A, "AP1" is stored in the corresponding application number column 121B, "1" is stored in the corresponding archive setting column 121C, "five years" is stored in the corresponding saved number of years column 121D, "ST1" is stored in the corresponding storage apparatus number 121E, and "mail data" is stored in the corresponding data type column 121F. For example, "-" is stored in the saved number of years column 122D in the event that the saved number of years is not yet set.

FIG. 15 shows an example configuration for regulating law management table 123. Regulating law management table 123 is configured from a regulating law number column 123A for managing regulating law numbers that are identifiers for uniquely identifying regulating laws stipulating the number of hears data saved for the application 23 handling the data is to be saved for, regulating law name column 123B for managing regulating law names of the regulating laws, and saved number of years column 123C for managing the saved number of years. For example, in the event that the number of years of saving of "electronic ledger sheet law" is "ten years" and that these are inputted first, as shown in FIG. 15, "1" is stored in regulating law number column 123A, "electronic ledger sheet law" is stored in regulating law name column 123B, and "ten years" is stored in the corresponding saved number of years column 123C. In the initial conditions there is nothing saved in regulating law number column 123A, regulating law name column 123B and saved number of years column 123C of regulating law management table 123.

FIG. 16 shows an example of a configuration for the application attribute management table 124. The application attribute management table 124 is comprised of an application number column 124A, saved number of years column 124B, WORM setting column 124C, archive setting column 124D, regulating law name setting column 124E and data type 124F. For example, management apparatus 6 collects application data type management table 21 of the host apparatus 2 to be managed by the management apparatus 6 and application archive setting management table 42 of the archive apparatus 3 and the storage apparatus—WORM setting management table 101 of the storage management apparatus 5, makes the application attribute management table 124 based on the application data type management table 21, application archive setting management table 42, storage apparatus—WORM setting management table 101, archive apparatus—application management table 122, and regulating law management table 123, and manages this every application 23. Therefore, in the event that "AP1" is stored in application number column 21A of application data type management table 21, information corresponding to "AP1" is collected from the application data type management table 21, the application archive setting management table 42, the storage apparatus—WORM setting management table 101, the archive apparatus—application management table 122, and the regulating law management table 123. "AP1" is then stored in application number column 124A, "five years" that is the saved number of years column 42C of the corresponding application archive setting management table 42 is stored in the corresponding saved number of years column 124B, "1" that is the WORM setting column 101C of the corresponding storage Apparatus—WORM setting management table 101 is stored in the corresponding WORM setting column 124C, "1" that is the archive setting column 42B of the corresponding application archive setting management table 42 is stored in the corresponding archive setting column 124D, "electronic document law" is stored as a result of an input operation by an administrator in regulating law name column 124E, and "mail data" that is data type storage column 21B of the corresponding application data type management table 21 is stored in the corresponding data type column 124F. For example, "-" is stored at the regulating law name column 124E before an input operation by an administrator.

FIG. 17 shows an example configuration for the archive apparatus password management table 125. The archive apparatus password management table 125 is comprised of an archive apparatus number 125A, a user ID column 125B and password column 125C for managing user ID's and passwords for connecting to the archive apparatus 3, and a permissions range column 125D for managing the range of permissions during connection to the archive apparatus 3. For example, in the event that the user ID of the archive apparatus 3 of "AC1" is "manager", the password is "pass", and the range of permissions of the user ID is "all", as shown in FIG. 17, "AC1" is stored in the archive apparatus number 125A, "manager" is stored in the corresponding user ID column 121B, "pass" is stored in the corresponding password column 121C, and "all" is stored in the corresponding permissions range column 125D.

FIG. 18 shows an example configuration for the data type management table 126. The data type management table 126 is comprised of a data type number column 126A for managing a data type number that is an identifier for uniquely identifying a data type, and a data type column 126B. For example, management apparatus 6 collects application data type management tables 21 for host apparatus 2 to be managed by the management apparatus 6, makes the data type management table 126 based on the application data type management table 21, and manages the data type management table 126. Therefore, in the event that "mail data" is stored first in the data type column 126B of the application data type management table 21, then "1" is stored in the data type number column 126A, and "mail data" is stored in the corresponding data type column 126B.

Figures 19, 20, 21:
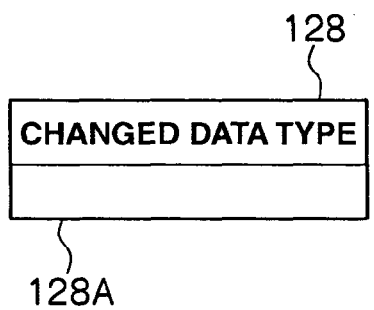
FIG. 19 is an outline view illustrating a changed saved number of years temporary storage table.
FIG. 20 is an outline view illustrating a changed data type temporary storage table.
FIG. 21 is an outline view illustrating a transfer destination storage apparatus temporary storage table.

FIG. 19 shows an example of a configuration for the changed saved number of years temporary storage table 127. The changed saved number of years temporary storage table 127 is comprised of an application number column 127A and a changed number of years to be saved column 127B for managing a changed saved number of years. For example, in the event that the saved number of years for the application 23 of "AP1" is changed to "ten years", "AP1" is stored in the application number column 127A, and "ten years" is stored in the corresponding changed number of years to be saved column 127B.

FIG. 20 shows an example configuration for the changed data type temporary storage table 128. The changed data type temporary storage table 128 is comprised of a changed data type column 128A for managing a data type to be changed. For example, in the event that the data type of the selected application 23 is changed to "mail data", "mail data" is stored in the changed data type column 128A.

FIG. 21 shows an example of a configuration for the transfer destination storage apparatus temporary storage table 129. The transfer destination storage apparatus temporary storage table 129 is comprised of a transfer destination storage apparatus column 129B for managing the storage apparatus 3 that is the transfer destination for transferring data handled by the application number column 127A and the application 23. For example, in the event that the storage apparatus 3 storing the data handled by the application 23 of "AP1" is moved to "ST1", "AP1" is stored in the application number column 128A, and "ST1" is stored in the corresponding transfer destination storage apparatus column 129B.

Figure 22:
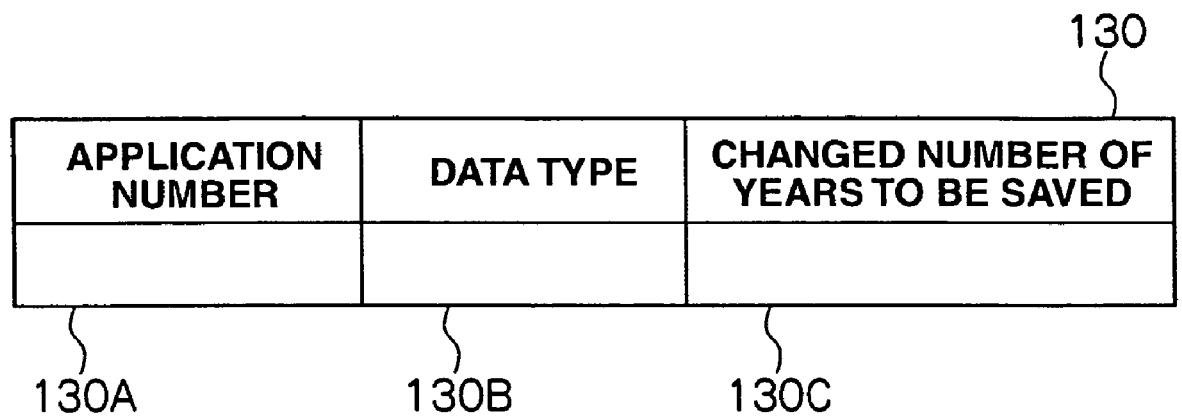
FIG. 22 is an outline view illustrating a manually changed saved number of years temporary storage table.

FIG. 22 shows an example of a configuration for manually changed saved number of years temporary storage table 130. The manually changed saved number of years temporary storage table 130 is configured from an application number column 130A, data type column 130B, and changed saved number of years column 130C. For example, in the event that the saved number of years for the application 23 of "AP1" is changed to "ten years" as a result of the administrator inputting a number of years to be saved manually, "AP1" is stored in the application number column 130A, and "ten years" is stored in the corresponding changed saved number of years column 130C.

Figure 23:
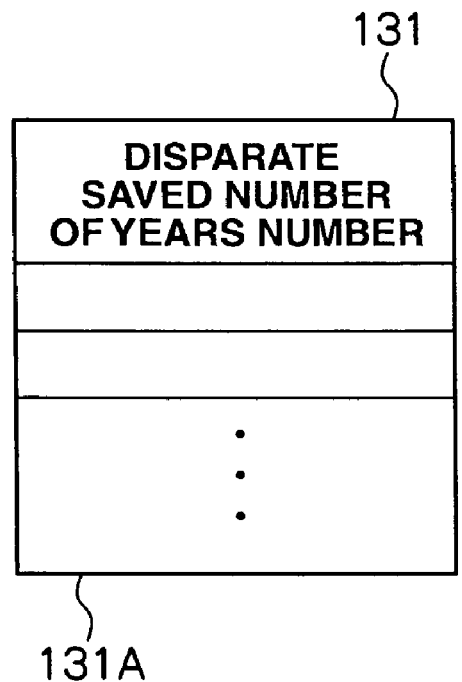
FIG. 23 is an outline view illustrating a disparate saved number of years application temporary storage table.

FIG. 23 shows an example of a configuration for a disparate number of years saved application temporary storage table 131. The disparate number of years saved application temporary storage table 131 is comprised form a disparate saved number of years application number column 131A for managing applications where the number of years saved is disparate.

(3) Display Screen of this Embodiment

Figure 24:
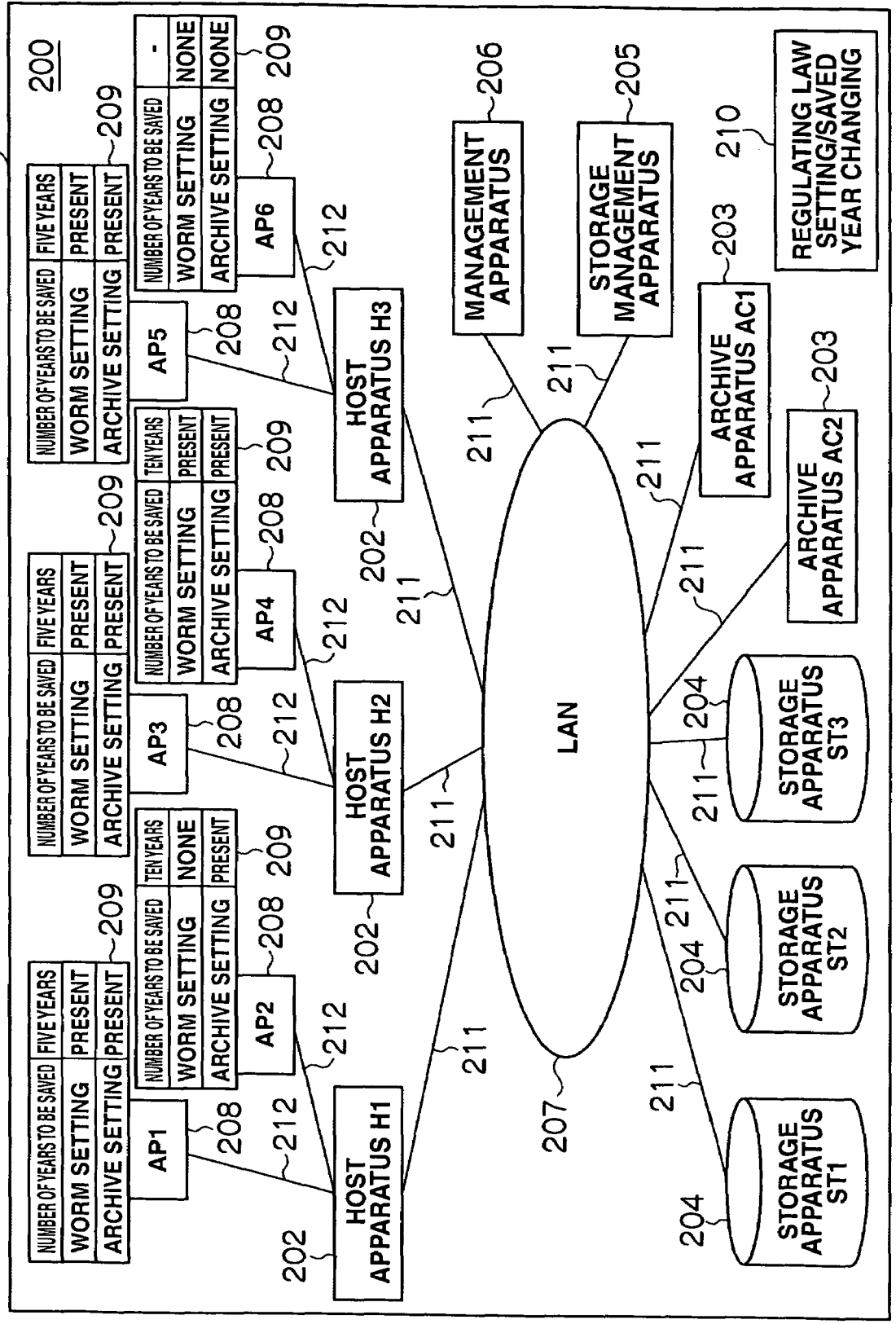
FIG. 24 is an outline view illustrating a topology display screen.

FIG. 24 shows an example of a configuration for a topology display screen 200. The topology display screen 200 is displayed at a display screen 119A of display apparatus 119 of management apparatus 7. The relationship of the connection of the management apparatus 6, and each host apparatus 2, each archive apparatus 3, each storage apparatus 4, and the storage management apparatus 5 connected to the management apparatus 6 via the LAN 7 is displayed at the topology display screen 200. Further, setting information for the applications 23 such as the storage relationship between each host apparatus 2 and the applications 23 stored at each host apparatus 2, the number of years data handled to the applications 23 are to be saved for, the presence or absence of WORM settings for the data and the presence or absence of archive settings for the data is also displayed at the topology display screen 200.

Specifically, the topology display screen 200 is comprised of, for example, a host apparatus display column 202, archive apparatus display column 203, storage apparatus display column 204, storage management apparatus display column 205, management apparatus display column 206, LAN display column 207, application display column 208, setting information display column 209, and regulating law setting/saved year changing button 210 for displaying a regulating law setting/saved year changing display column 220 for inputting new regulating laws and changing the number of years to save data handled by the applications 23. In this case, the relationship of the connection of the management apparatus 6, and each host apparatus 2, each archive apparatus 3, each storage apparatus 4, and the storage management apparatus 5 connected to the management apparatus 6 via the LAN 7 is shown using connecting lines 211. Further, the relationship between each host apparatus 2 and the applications 23 stored in each host apparatus 2 is shown by connections made by connecting lines 212. Further, that for the setting information display column 209 is shown, for example, at the upper side of the corresponding application display column 208. For example, "host apparatus H1" shown in host apparatus display column 202 denotes host apparatus 2 of application number "H1", and the administrator is therefore able to recognize which host apparatus 2 is denoted at a glance. The same also applies for each of the archive apparatus 3 and each of the storage apparatus 4.

FIG. 25 shows an example configuration for the regulating law setting/saved year changing display column 220. The regulating law setting/saved year changing display column 220 is shown at the tope of the topology display screen 200. The regulating law setting/saved year changing display column 220 is comprised of a regulating law number display column 221, regulating law name display column 222, number of years to be saved display column 223, others column 224 on the regulating law name display column 222 for displaying an unset application automatic change button 260, an add button 225 for displaying a regulating law addition setting display column 230 for adding settings for regulating laws, a change button 226 for changing the regulating law name or the number of years to be saved, an OK button 227 for reflecting addition and changing operations etc., and a cancel button 228 for canceling without reflecting the operations. A description is given in the following of specific processing using regulating law setting/saved year changing display column 220.

Figure 26:
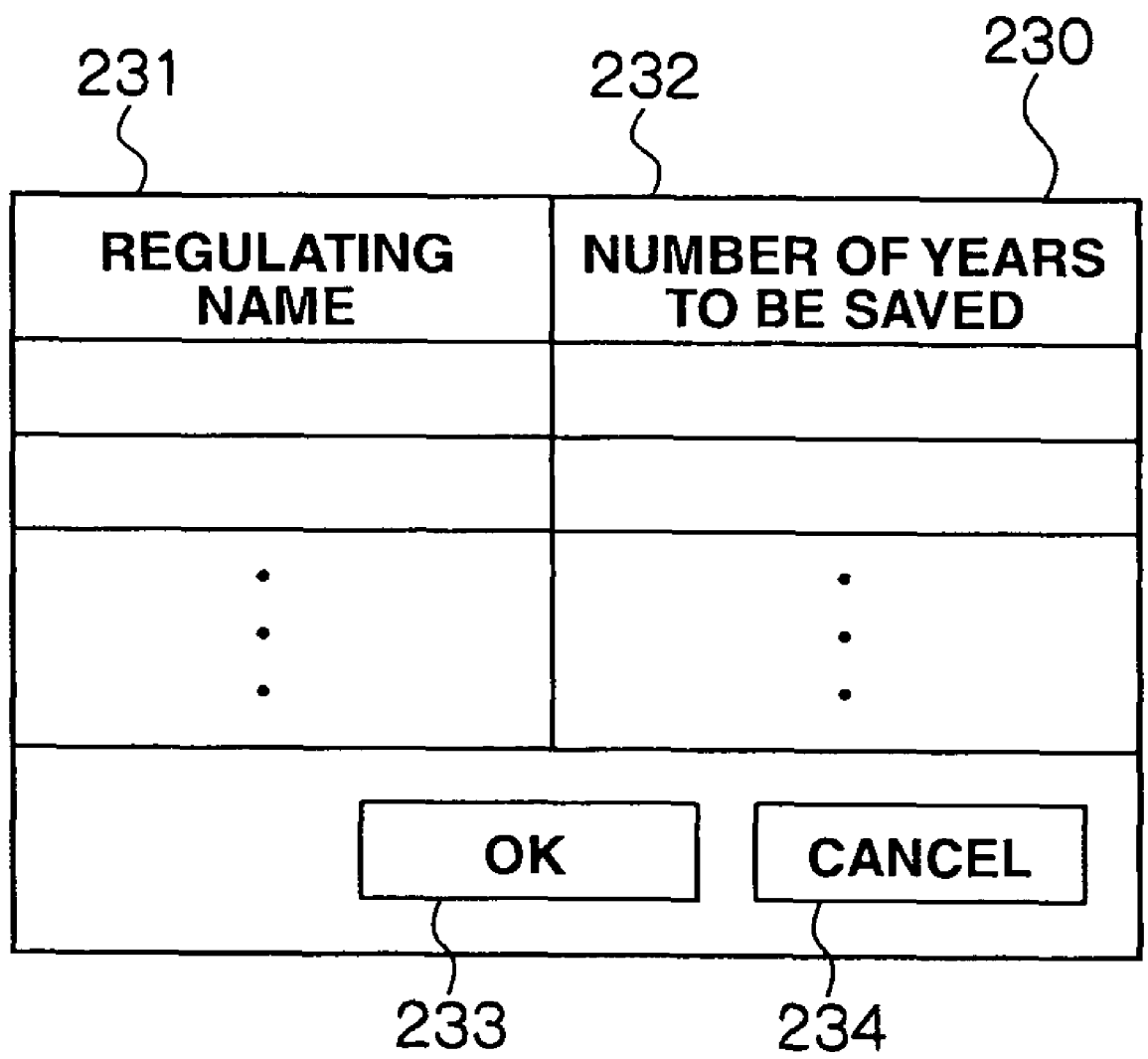
FIG. 26 is an outline view illustrating a regulating law addition setting display column.

FIG. 26 shows an example of a configuration for the regulating law addition setting display column 230. The regulating law addition setting display column 230 is displayed on the topology display screen 200. The regulating law addition setting display column 230 is comprised of regulating law name input column 231 for inputting names of regulating laws, an inputted number of years to be saved column 232 for inputting a number of years it is intended to save data handled by the applications 23 disclosed in the regulating laws, and OK button 233, and a cancel button 234. Specific processing using the regulating law addition setting display column 230 is described in the following.

FIG. 27 shows an example of a configuration for application list display button 240 displayed in the regulating law setting/saved year changing display column 220. Application list display button 240 is comprised of an all application list display button 231 for displaying an all applications list display column 250 that displays a list of the application numbers of all of the applications 23 stored in each of the host apparatus 2 connected to the management apparatus 6 via the LAN 7, and unset application list display button 232 for displaying an unset applications list display column 260 that displays a list of application numbers of applications 23 where the number of years is not yet set of the applications. A specific operation using the application list display button 240 is described in the following.

FIG. 28 shows an example of a configuration for the all applications list display column 250. The all applications list display column 250 is displayed on the topology display screen 200. The all applications list display column 250 is comprised of a change application check column 251 for checking applications where the number of years to be saved is to be changed, an all applications display column 252 for displaying the application numbers of all of the applications 23 stored in each of the host apparatus 2 connected to the management apparatus 6 via the LAN 7, a number of years to be saved display column 253, an OK button 254, and a cancel button 255. A specific operation using the all applications list display column 250 is described in the following.

Figure 29:
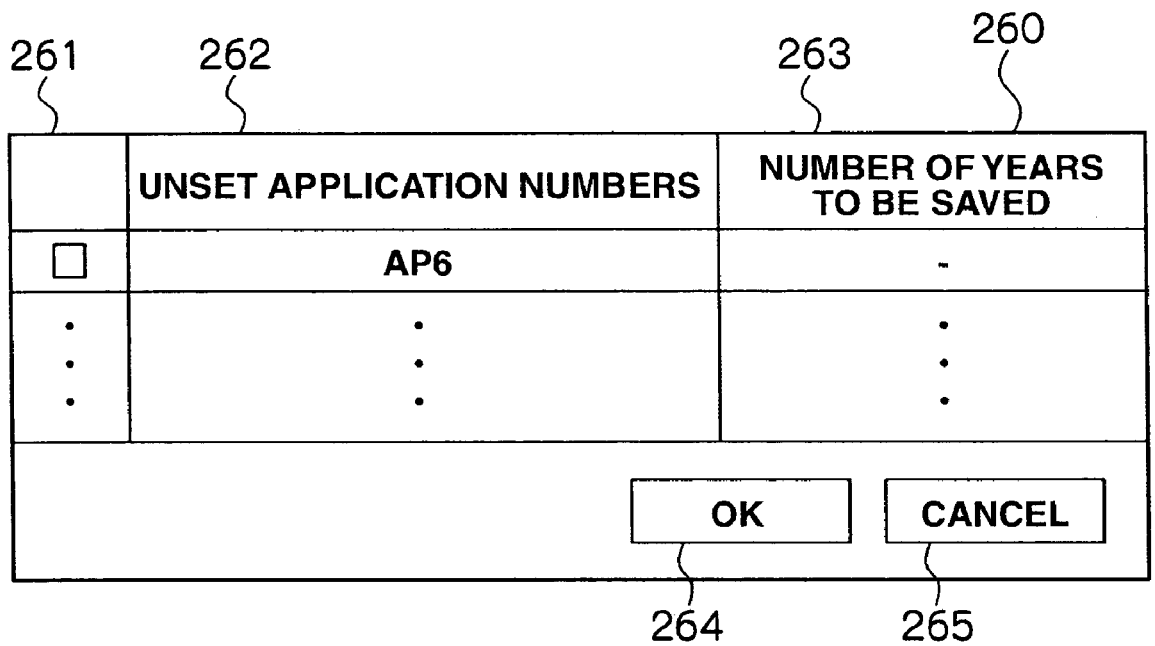
FIG. 29 is an outline view illustrating an unset applications list display column.

FIG. 29 shows an example of a configuration for an unset applications list display column 260. The unset applications list display column 260 is displayed on the topology display screen 200. The unset applications list display column 260 is comprised of a set application check column 261 for setting applications where the number of years to be saved is to be set, an unset applications display column 262 for displaying the application numbers of applications 23 stored in each of the host apparatus 2 connected to the management apparatus 6 via the LAN 7 for which the number of years to be saved is not yet set, a number of years to be saved display column 263, an OK button 264, and a cancel button 265. A specific operation using the unset applications list display column 260 is described in the following.

FIG. 30 shows an example of a configuration for an unset application automatic change button 270 displayed on the regulating law setting/saved year changing display column 220. The unset application automatic change button 270 is for automatically changing applications 23 of the applications 23 stored in each of the host apparatus 2 connected to the management apparatus 6 via the LAN 7 for which the number of years to be saved is not yet set. A specific operation using the unset application automatic change button 270 is described in the following.

Figure 31:
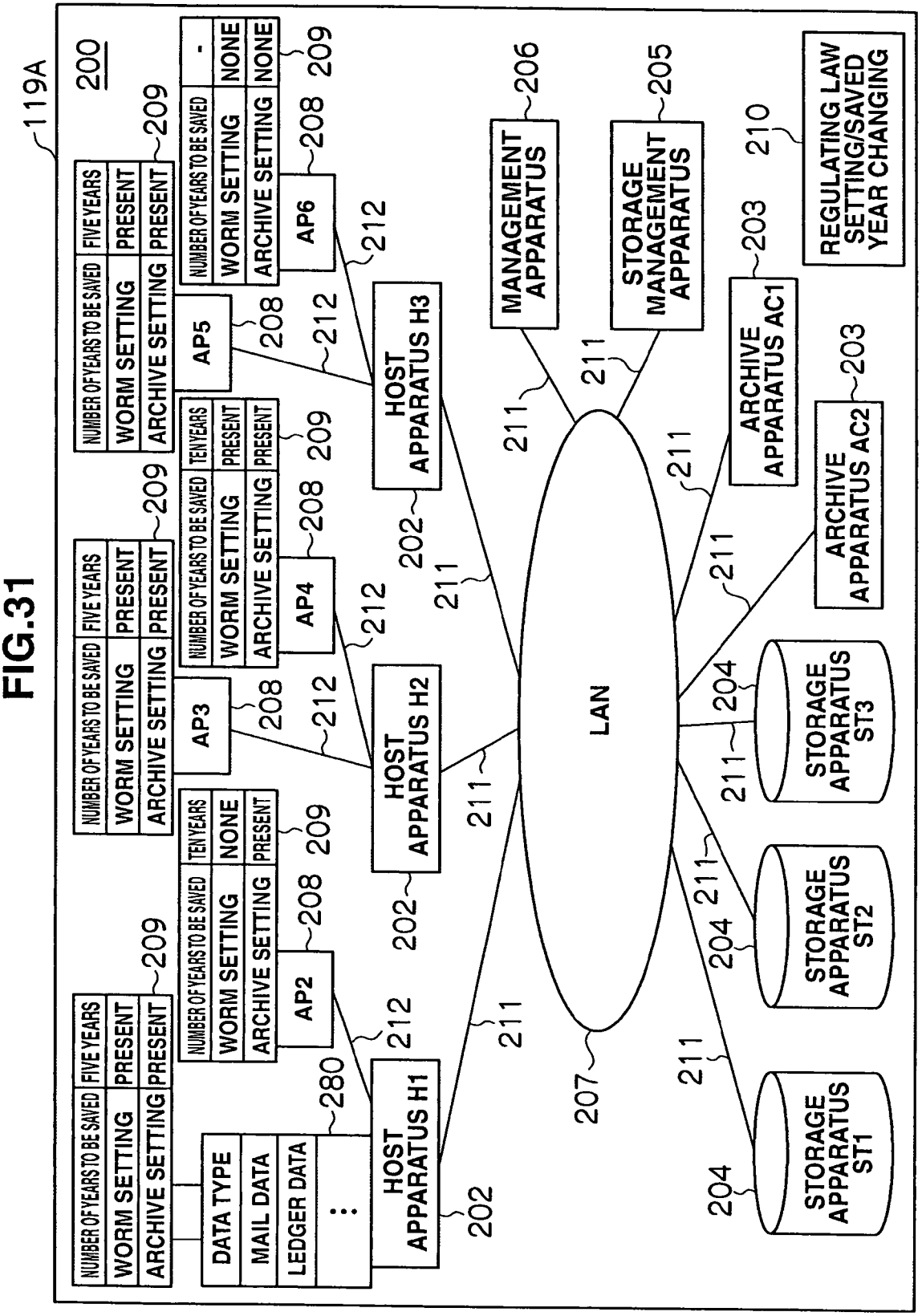
FIG. 31 is an outline view illustrating a selected data type display column.

FIG. 31 shows an example of a configuration for selected data type display column 280 displayed on the topology display screen 200. The selected data type display column 280 is for displaying the setting information display column 209 of applications 23 of the same type as the selected data type at the topology display screen 200. Specific processing using the selected data type display column 280 is described in the following.

FIG. 32 shows an example of a configuration for the transferred applications list display column 290. The transferred applications list display column 290 is displayed on the topology display screen 200. The transferred applications list display column 290 is comprised of a transferred application check column 291 for checking applications 23 where data is to be moved, transfer application number 292 indicating the application numbers of applications 23 where data is to be moved, OK button 293, and cancel button 294. A specific operation using the transferred applications list display column 290 is described in the following.

Figure 33:
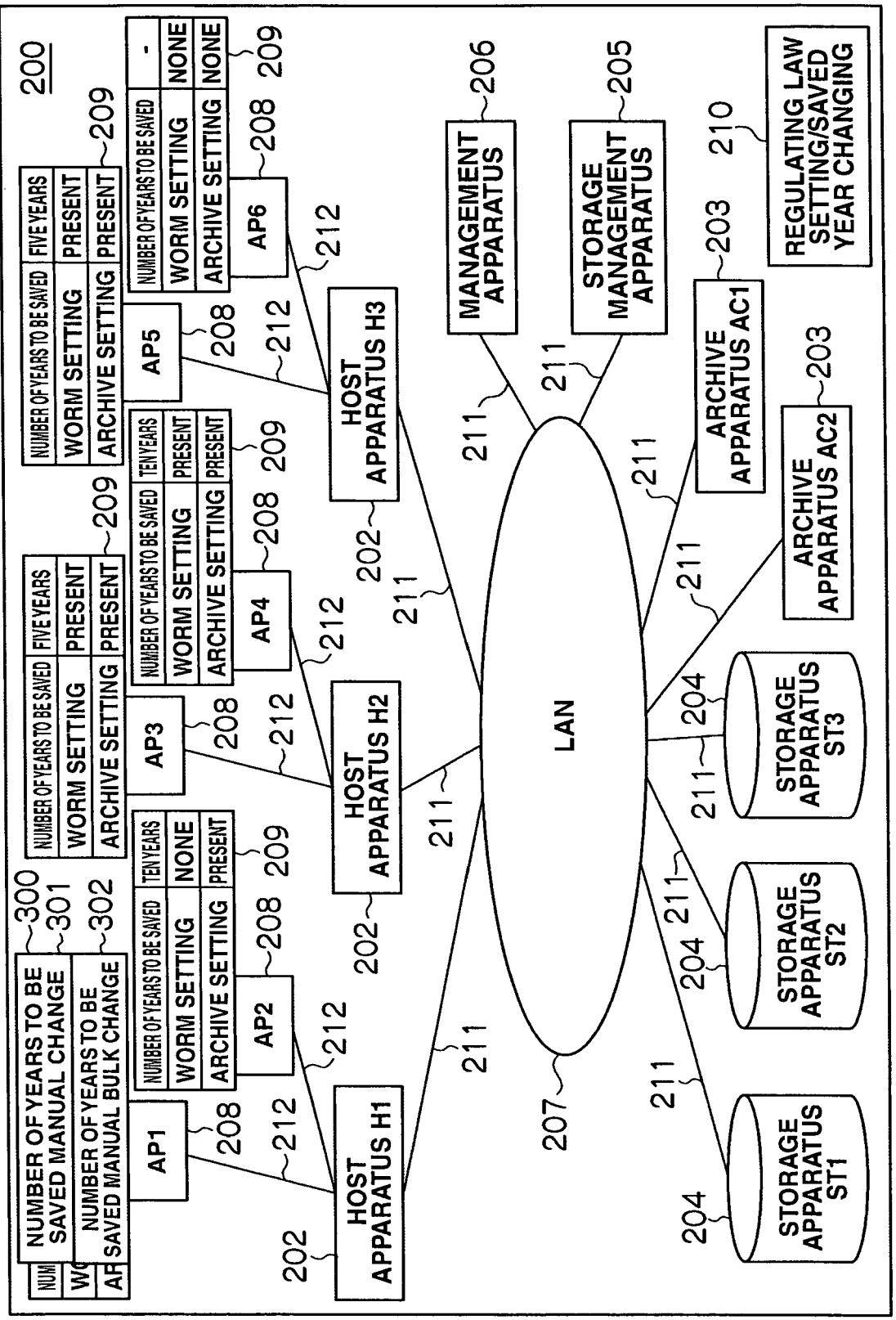
FIG. 33 is an outline view illustrating a number of years to be saved manual change display button.

FIG. 33 shows an example of a configuration for a number of years to be saved manual change display button 300 displayed on the topology display screen 200. The number of years to be saved manual change display button 300 is comprised of a number of years to be saved manual change button 301 for displaying an inputted number of years to be saved in an inputted number of years to be saved display column 310 while manually changing the number of years saved, and a number of years to be saved manual bulk change button 302 for selecting a data type for changing the number of years to be saved during bulk changing of the number of years to be saved manually to be displayed at data type bulk change selection column 320. A description is given in the following of specific processing using number of years to be saved manual change display button 300.

Figure 34:
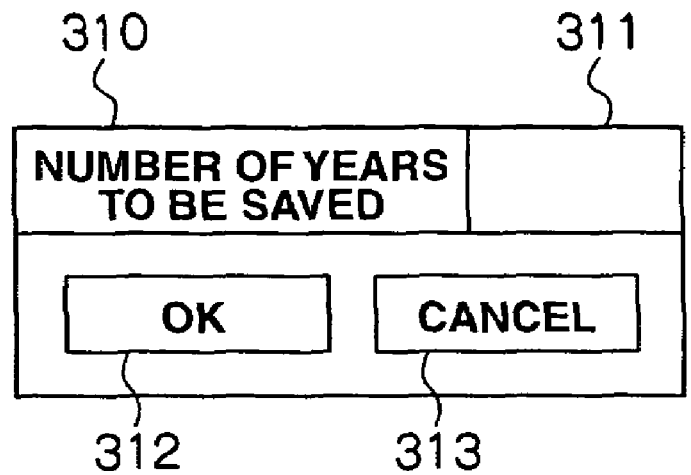
FIG. 34 is an outline view illustrating a number of years to be saved input display column.

FIG. 34 shows an example configuration for number of years to be saved input display column 310. The number of years to be saved input display column 310 is displayed on the topology display screen 200. The number of years to be saved input display column 310 is comprised of a number of years to be saved input column 311 for inputting a number of years to be saved, an OK button 312, and a cancel button 313. Specific processing using the number of years to be saved input display column 310 is described in the following.

Figure 35:
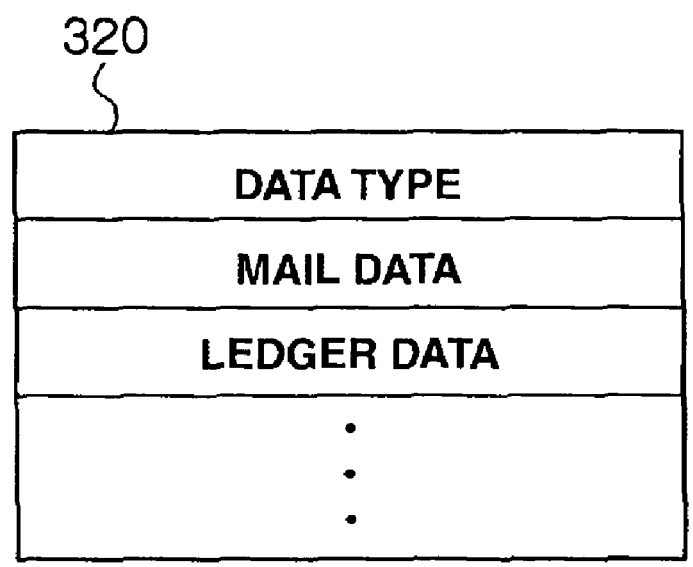
FIG. 35 is an outline view illustrating a data type changing display column.

FIG. 35 shows an example configuration for a data type changing display column 320. The data type changing display column 320 is displayed on the topology display screen 200. The data type changing display column 320 is for bulk-changing the number of years to be saved for selected data types. Specific processing using a data type bulk changing selection column 310 is described in the following.

(4) Various Processing of this Embodiment (4-1) Topology Display Processing

Figure 36:
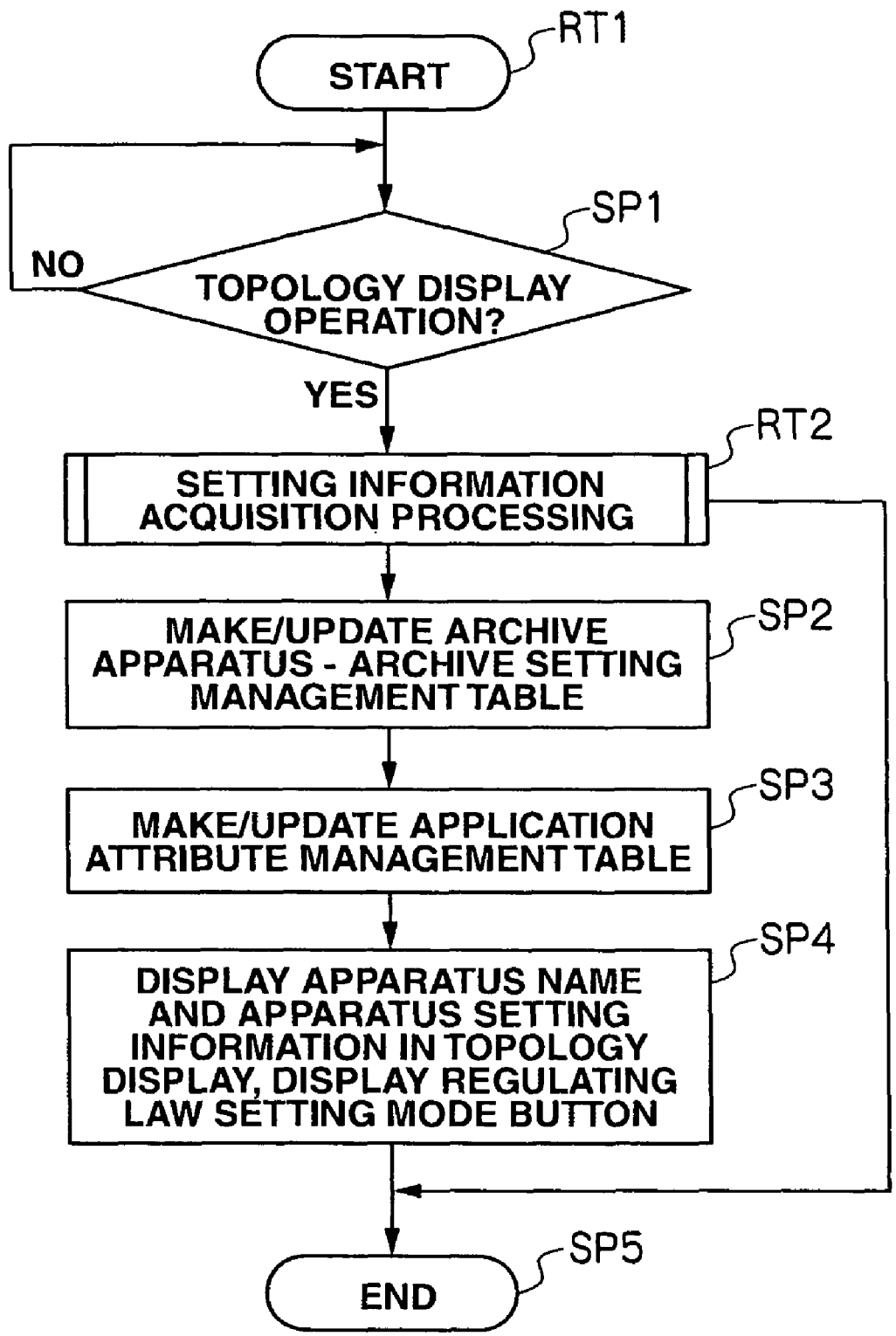
FIG. 36 is a flowchart showing a topology display processing procedure.

FIG. 36 is an example of a flowchart relating to topology display processing for management apparatus 6 at this storage system 1 and show a specific processing procedure for the processor 116 of the management apparatus 6.

When the management apparatus 6 is started up, the processor 116 of the management apparatus 6 waits for a topology display operation to be performed as a result of operation of an operation section by the administrator of the management apparatus 6 in accordance with topology display processing procedure RT1 shown in FIG. 36 by executing a topology display processing program (displaying topology) to display a connection relationship of the management apparatus 6 and each of the host apparatus 2, archive apparatus 3, storage apparatus 4, and storage management apparatus 5 connected to the management apparatus 6 via the LAN 7 at a display screen 119A of the display apparatus 119, and display setting information for the applications 23 such as the storage relationship between each host apparatus 2 and applications 23 stored in each host apparatus 2, the number of years it is intended to save data handled by the applications 23, the presence or absence of a WORM setting for the data and the presence or absence of archive setting for the data, etc. (SP1).

In the event that a topology display operation takes place (SP1: YES), the processor 116 of management apparatus 6 executes a setting information acquisition process (RT2).

Figure 37:
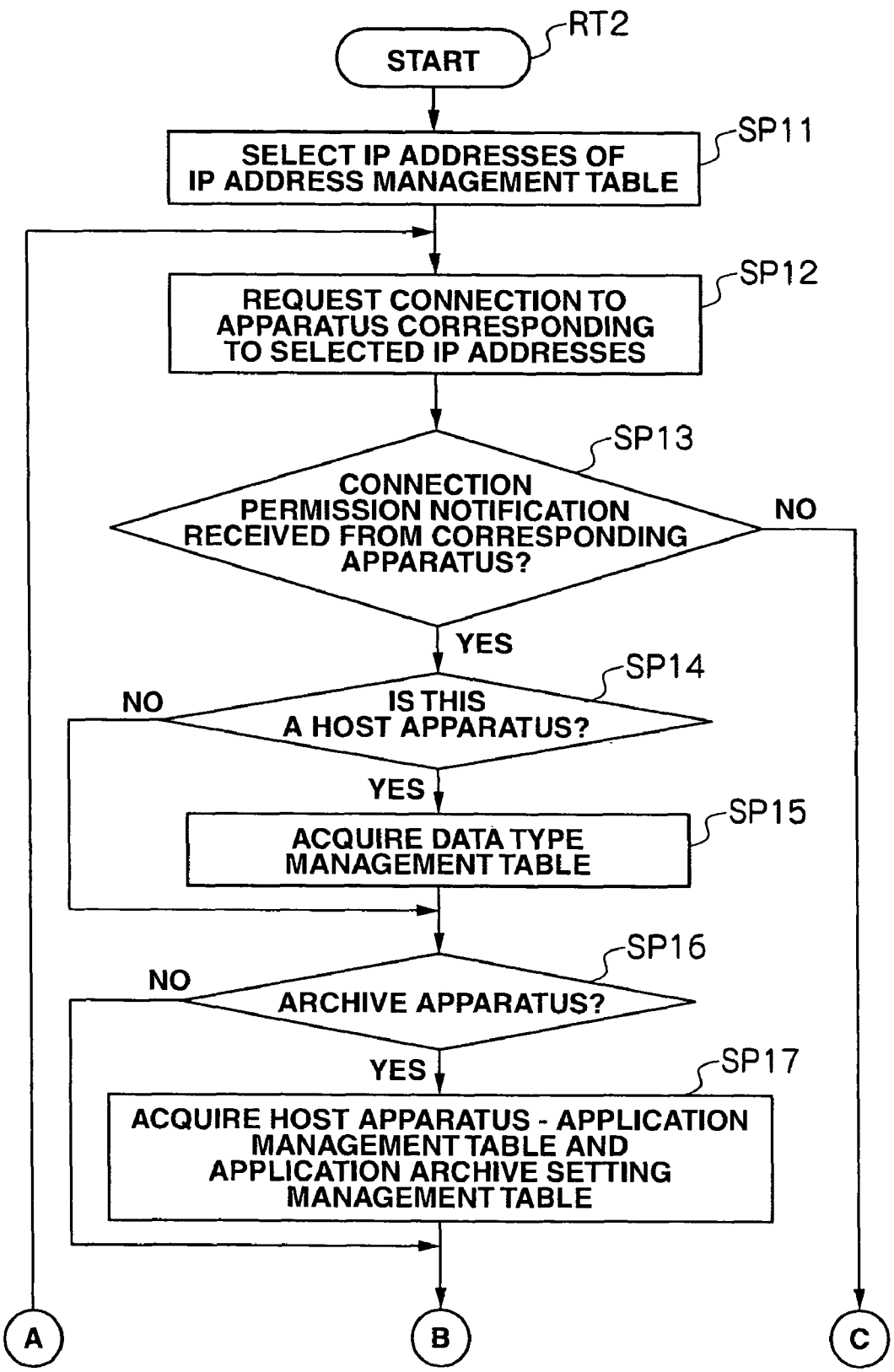
FIG. 37 is a flowchart showing a setting information acquisition processing procedure.
Figure 38:
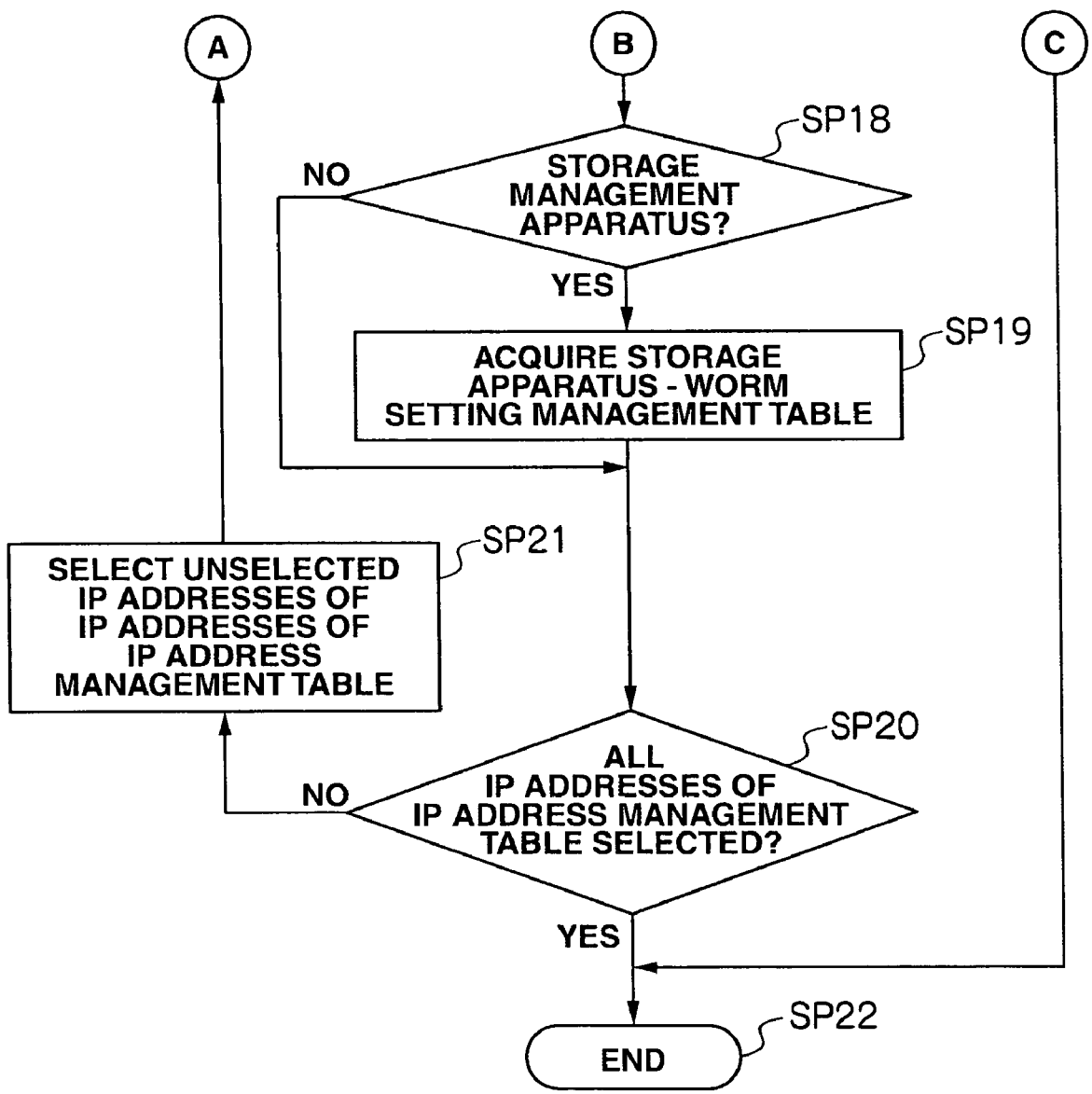
FIG. 38 is a further flowchart showing a setting information acquisition processing procedure.

FIG. 37 and FIG. 38 are examples of flowcharts relating to setting information acquisition processing for management apparatus 6 at this storage system 1 and show a specific processing procedure for the processor 116 of the management apparatus 6.

In the event that a topology display operation takes place (SP1: YES), in accordance with the setting information acquisition processing procedure RT2 shown in FIG. 37 and FIG. 38, the processor 116 of the management apparatus 6 refers to the IP address column 121A of the IP address management table 121 shown in FIG. 13, and selects a predetermined IP address (SP11).

Continuing on, the processor 116 of the management apparatus 6 requests connection to an apparatus corresponding to the selected IP address (SP12). For example, the processor 116 of the management apparatus 6 requests a connection by sending a connection request containing a user ID for "admin" and a "root" password to the apparatus corresponding to "192.168.xxx.1".

The processor 116 of the management apparatus 6 then checks whether or not connection permission notification has been received from the apparatus requesting the connection (SP13). For example, the processor 116 of the management apparatus 6 checks whether or not connection permission notification has been received from the apparatus requesting the connection using whether or not connection permission notification is received from the apparatus requesting the connection within a predetermined time from transmission of the connection request.

In the event that connection permission notification is not received from the apparatus requesting the connection (SP13: NO), the processor 116 of the management apparatus 6 ends the setting information acquisition processing procedure RT2 shown in FIG. 37 and FIG. 38 giving an error, and then ends the topology display process RT1 shown in FIG. 36 (SP5). For example, in the event that the user ID and password are different, notification that connection is not permitted is received, and connection permission notification is not received.

With respect to this, in the event that connection permission notification is received from the apparatus making the request (SP13: YES), the processor 116 of the management apparatus 6 checks as to whether the apparatus receiving the connection permission notification is the host apparatus 2 (SP14).

In the event that the apparatus receiving the connection permission notification is not the host apparatus 2 (SP14: NO), the processor 116 of the management apparatus 6 proceeds to step SP16. In regard to this, in the event that the apparatus receiving the connection permission notification is the host apparatus 2 (SP14: YES), the processor 116 of the management apparatus 6 acquires the data type management table 21 shown in FIG. 8 from the host apparatus 2 (SP15). Specifically, the processor 116 of the management apparatus 6 sends a transmission request for the data type management table 21 to the host apparatus 2. When the transmission request is received, the host apparatus 2 sends the data type management table 21 to the management apparatus 6.

The processor 116 of the management apparatus 6 then checks whether or not the apparatus receiving the connection permission notification is the archive apparatus 3 (SP16).

In the event that the apparatus receiving the connection permission notification is not the archive apparatus 3 (SP16: NO), the processor 116 of the management apparatus 6 proceeds to step SP18. With regards to this, in the event that the apparatus receiving the connection permission notification is the archive apparatus 3 (SP16: YES), the processor 116 of the management apparatus 6 acquires the host Apparatus—application management table 41 shown in FIG. 9 and the application archive setting management table 42 shown in FIG. 10 from the archive apparatus 3 (SP17). Specifically, the processor 116 of the management apparatus 6 then sends a transmission request for the host apparatus—application management table 41 and the application archive setting management table 42 to the archive apparatus 3. Upon receiving the transmission request, the archive apparatus 3 sends the host apparatus—application management table 41 and the application archive setting management table 42 to the management apparatus 6.

The processor 116 of the management apparatus 6 then checks whether or not the apparatus receiving the connection permission notification is the storage management apparatus 5 (SP18).

In the event that the apparatus receiving the connection permission notification is not the storage management apparatus 5 (SP18: NO), the processor 116 of the management apparatus 6 proceeds to step SP20. With regards to this, in the event that the apparatus receiving the connection permission notification is the storage management apparatus 5 (SP18: YES), the processor 116 of the management apparatus 6 acquires the storage apparatus—WORM setting management table 101 shown in FIG. 12 from the storage management apparatus 5 (SP19). Specifically, the processor 116 of the management apparatus 6 sends a transmission request for the storage apparatus—WORM setting management table 101 to the storage management apparatus 5. Upon receiving the transmission request, the storage management apparatus 5 sends the storage apparatus—WORM setting management table 101 to the management apparatus 6.

The processor 116 of the management apparatus 6 then checks whether or not all of the IP addresses stored in the IP address column 121A of the IP address management table 121 have been selected (SP20).

In the event that all of the IP addresses stored in the IP address column 121A of the IP address management table 121 have not been selected (SP20: NO), the processor 116 of the management apparatus 6 selects IP addresses, of the IP addresses stored in the IP address column 121A of the IP address management table 121, that have not yet been selected (SP21), then returns again to step SP12 of requesting connection to the apparatus corresponding to the selected IP address, and then repeats the same processing (SP12 to SP20).

With regards to this, in the event that all of the IP addresses stored in the IP address column 121A of the IP address management table 121 have been selected (SP20: YES), the processor 116 of the management apparatus 6 then ends the setting information acquisition processing procedure RT2 shown in FIG. 37 and FIG. 38 (SP22).

When the connection permission notification is received from the apparatus requesting the connection (SP13: YES), and the setting information acquisition processing procedure RT2 is complete (SP22), the processor 116 of the management apparatus 6 makes or updates the archive apparatus—archive setting management table 122 shown in FIG. 14 from the acquired data type management table 21, the application archive setting management table 42, and the storage apparatus—WORM setting management table 101 (SP2).

Continuing on, the processor 116 of the management apparatus 6 then makes or updates the application attribute management table 124 from the acquired storage apparatus—WORM setting management table 101, the made or updated archive apparatus—archive setting management table 122, and the regulating law management table 123 shown in FIG. 15.

The processor 116 of the management apparatus 6 then displays the topology display screen 200 at the display screen 119A of the display apparatus 119 (SP4) by displaying topology based on the acquired data type management table 21, host apparatus—application management table 41, application archive setting management table 42, storage apparatus—WORM setting management table 101, made or updated archive apparatus—archive setting management table 122 and application attribute management table 124 together with regulating law setting/saved year changing button 210 at a predetermined position of the display screen 119A of the display apparatus 119.

After this, the processor 116 of the management apparatus 6 ends the topology display process RT1 shown in FIG. 36 (SP5).

In this embodiment, a description is given of the case of displaying setting information for the applications 23 such as the number of years data handled by the applications 23 is to be saved for, the presence or absence of WORM settings for the data, and the presence or absence of archive settings for the data, but the present invention is by no means limited in this respect, and displaying using a predetermined operation is also possible without displaying the setting information.

With this kind of storage system 1, at the management apparatus 6, setting information for the applications 23 such as the connection relationship of each of the host apparatus 2, each of the archive apparatus 3, each of the storage apparatus 4 and the storage management apparatus 5 connected to the management apparatus 6 via the LAN 7, the storage relationship of each of the host apparatus 2 and the applications 23 stored in each of the host apparatus 2, the number of years it is intended to save data handled by the application 23 for, the presence or absence of WORM setting of the data, and the presence or absence of archive setting for the data is acquired, and is displayed at the display screen 119A of the display apparatus 119 as the topology display screen 200.

This therefore effectively prevents increases in administrative workload whereby an administrator has to confirm setting information such as connection state and number of years information etc. at each respective apparatus, it is possible to confirm the connection relationship, storage relationship, and setting information in a straightforward manner at the management apparatus 6, and each of the host apparatus 2, archive apparatus 3, storage apparatus 4 and storage management apparatus 5 can be managed in a straightforward manner.

(4-2) Regulation Law Addition/Changing Processing

Figure 39:
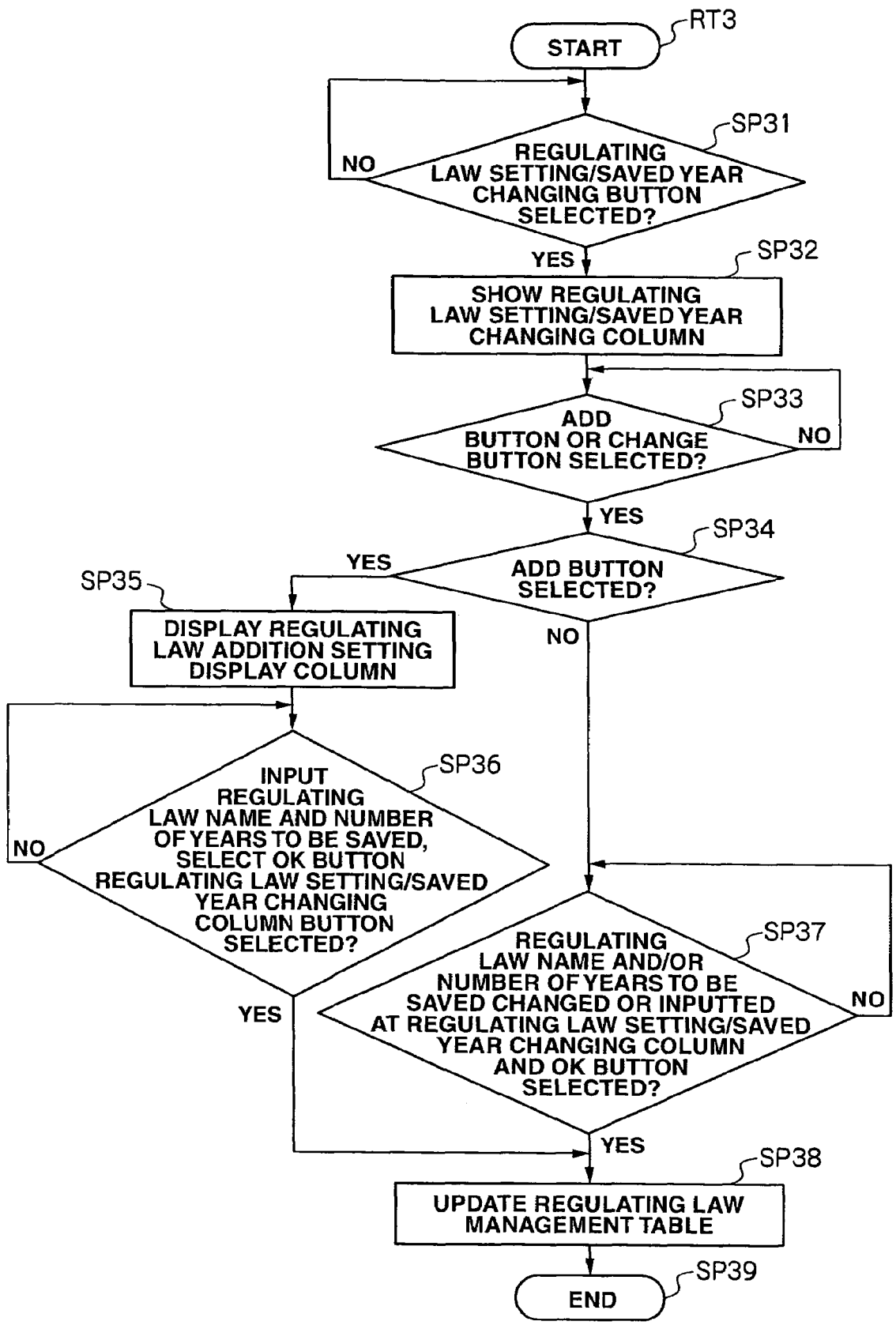
FIG. 39 is a flowchart showing a regulating law addition/changing processing procedure.

FIG. 39 is an example of a flowchart relating to regulation law addition/changing processing for management apparatus 6 at this storage system 1 and shows a specific processing procedure for the processor 116 of the management apparatus 6.

When the topology display screen 200 is displayed, by executing the regulating law addition/changing processing program 142 for adding and changing regulating laws, the processor 116 of the management apparatus 6 awaits selection by the regulating law setting/saved year changing button 210 by operation of an operating section by the administrator of the management apparatus 6 in accordance with regulating law addition/changing processing procedure RT3 shown in FIG. 39 in standby mode.

In the event that the regulating law setting/saved year changing button 210 is selected (SP31: YES), the processor 116 of the management apparatus 6 displays the regulating law setting/saved year changing display column 220 shown in FIG. 25 on the topology display screen 200 of the display screen 119A of the display apparatus 119 (SP32).

The processor 116 of the management apparatus 6 then awaits selection of the add button 225 or the change button 226 as a result of operation of an operation section by the administrator of the management apparatus 6 in standby mode (SP33).

In the event that the add button 225 or the change button 226 is selected as a result of operation of an operation section by the administrator of the management apparatus 6 (SP33: YES), the processor 116 of the management apparatus 6 checks whether or not the add button 225 of the add button 225 or the change button 226 is selected (SP34).

In the event that the add button 225 of the add button 225 and the change button 226 is selected (SP34: YES), the processor 116 of the management apparatus 6 displays the regulating law addition setting display column 230 shown in FIG. 26 on the topology display screen 200 of the display screen 119A of display apparatus 119 (SP35).

Continuing on, the processor 116 of the management apparatus 6 inputs a regulating law name and saved number of years to the regulating law name input column 231 and the saved number of years input column 232 of the regulating law addition setting display column 230, OK button 233 is selected, and the selection of the OK button 227 of the regulating law setting/saved year changing column 220 is awaited in standby mode (SP36).

On the other hand, in the event that the add button 225 of the add button 225 and the change button 226 is not selected, i.e. in the event that the change button 226 is selected (SP34: NO), the processor 116 of the management apparatus 6 changes and inputs a regulating law name and/or saved number of years to the regulating law name display column 222 and the number of years to be saved display column 223 of the regulating law setting/saved year changing column 220, an waits in standby mode for the OK button 227 to be selected (SP37).

In the event that a regulating law name and saved number of years are inputted to the regulating law name input column 231 and the saved number of years input column 232 of the regulating law addition setting display column 230, the OK button 233 is selected, and the OK button 227 of the regulating law setting/saved year changing column 220 is then selected (SP36: YES), or in the event that a regulating law name and/or a saved number of years are changed in the regulating law name display column 222 and the number of years to be saved display column 223 of the regulating law setting/saved year changing column 220 and the OK button 227 is selected (SP37: YES), the processor 116 of the management apparatus 6 updates the regulating law name and/or the saved number of years by adding to and changing the regulating law management table 123 shown in FIG. 15 (SP38).

The processor 116 of the management apparatus 6 then ends the regulating law addition/changing processing procedure RT3 shown in FIG. 39 (SP39).

At this storage system 1, at the management apparatus 6, in the event that a new regulating law is issued, or in the event that the number of years that saving is required for is changed as a result of an amendment etc. to the regulating laws, it is possible to add and change the regulating law disclosing the number of years the data handled by the applications 23 is to be saved for and the number of years of saving of the regulating law, and management of each of the host apparatus 2, archive apparatus 3, storage apparatus 4 and storage management apparatus 5 is much more straightforward.

(4-3) Processing for changing the saved number of years

Figure 40:
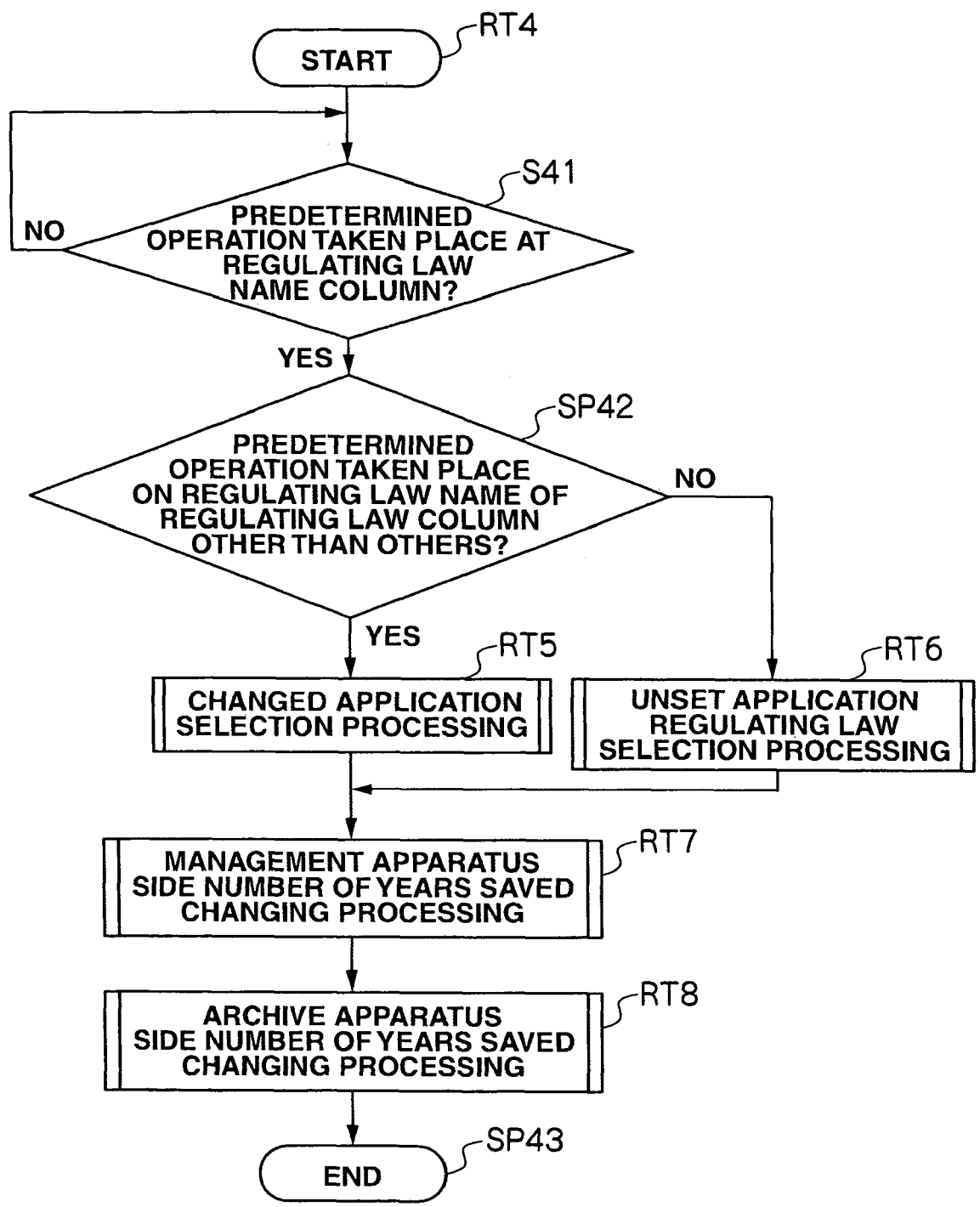
FIG. 40 is a flowchart showing a saved number of years changing processing procedure.

FIG. 40 is an example of a flowchart relating to saved number of years changing processing for management apparatus 6 at this storage system 1 and show a specific processing procedure for the processor 116 of the management apparatus 6.

In the event that the regulating law setting/saved year changing display column 220 is displayed (SP32), by executing the changing saved number of years processing program 143 changing the number of years data handled by the application 2.3 is saved for, the processor 116 of the management apparatus 6 waits in standby mode for a predetermined operation in the regulating law name column 222 as a result of operation of an operation section by the administrator of the management apparatus 6 in accordance with a saved number of years changing processing procedure RT4 shown in FIG. 40 (SP41). For example, the processor 116 of the management apparatus 6 awaits a so-called "right-click" operation on the regulating law name column 222.

In the event that there is a predetermined operation on the regulating law name column 222 as a result of an operation of an operating section by the administrator of the management apparatus 6 (SP41: YES), the processor 116 of the management apparatus 6 checks whether or not there has been a predetermined operation on the regulating law name of the regulating law name column 222 other than for this others column 224 (SP42). For example, the processor 116 of the management apparatus 6 checks whether or not there has been a so-called "right click" operation on the regulating law name of the regulating law name column 222 other than for this others column 224 or on the others column 224.

In the event that a predetermined operation has taken place on the regulating law name of the regulating law name column 222 other than for this others column 224, the processor 116 of the management apparatus 6 executes change application selection processing (RT5).

Figure 41:
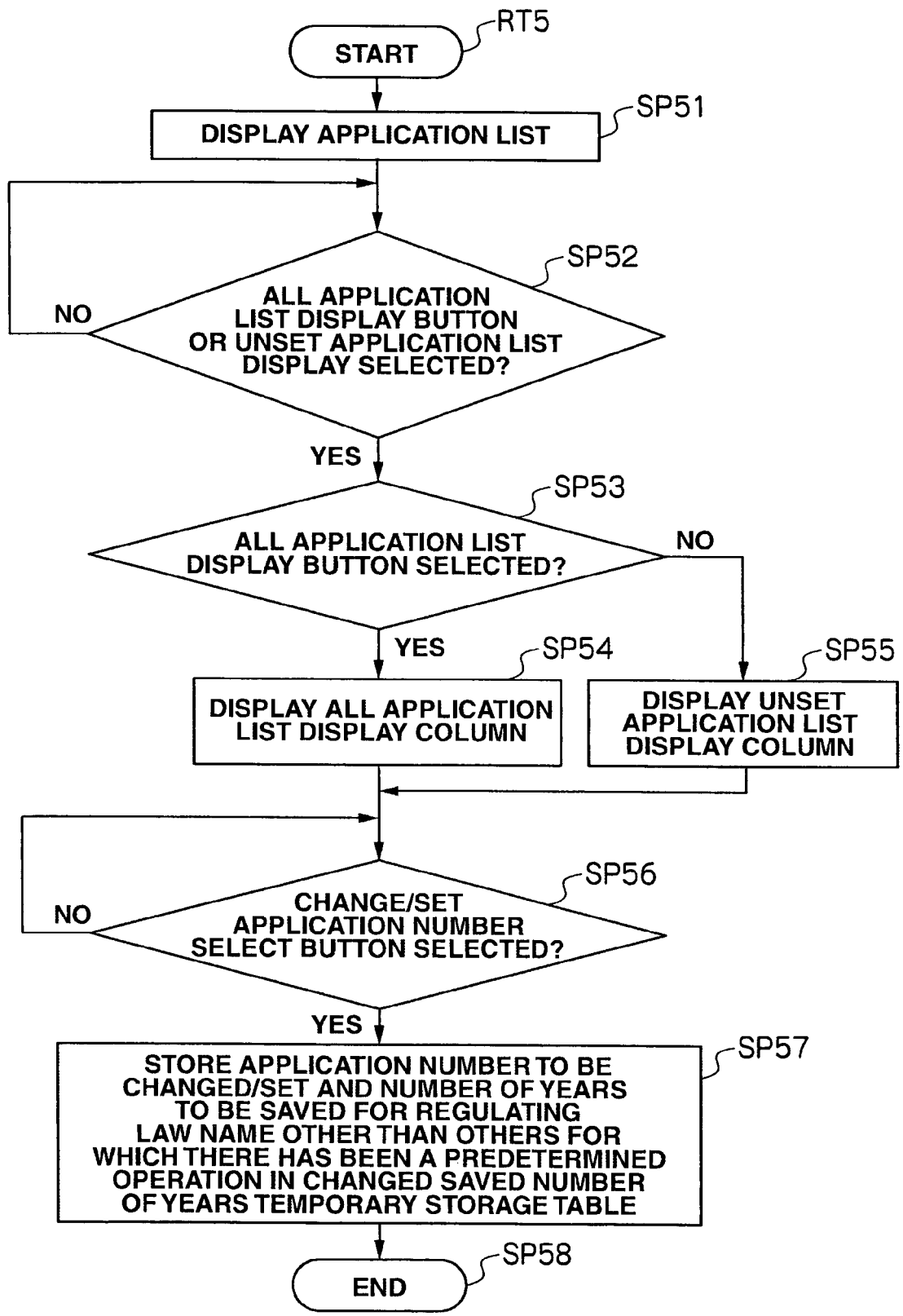
FIG. 41 is a flowchart showing a changing application selection processing procedure.

FIG. 41 is an example of a flowchart relating to changing application selection processing for management apparatus 6 at this storage system 1 and show a specific processing procedure for the processor 116 of the management apparatus 6.

In the event of a predetermined operation on the regulating law name of the regulating law name column 222 other than this others column 224 (SP42: YES), the processor 116 of the management apparatus 6 displays, for example, application list display button 240 at the upper side of the regulating law name of the regulating law name column 222 subjected to a predetermined operation as shown in FIG. 27 in accordance with changing application selection processing procedure RT5 shown in FIG. 41 (SP51).

As a result of operation of the operation section by the administrator of the management apparatus 6, the processor 116 of the management apparatus 6 awaits selection of all application list display button 231 or unset application list display button 232 in standby mode (SP52).

In the event that the all application list display button 231 or the unset application list display button 232 is selected as a result of an operation of an operating section by the administrator of the management apparatus 6 (SP52: YES), the processor 116 of the management apparatus 6 checks whether or not all application list display button 231 of the all application list display button 231 and the unset application list display button 232 is selected (SP53).

In the event that all application list display button 231 of the all application list display button 231 and the unset application list display button 232 is selected as a result of an operation of an operating section by the administrator of the management apparatus 6 (SP53: YES), the processor 116 of the management apparatus 6 displays the all applications list display column 250 shown in FIG. 28 on the topology display screen 200 (SP54). Specifically, processor 116 of the management apparatus 6 refers to the application attribute management table 124 shown in FIG. 16, and stores and displays the application number stored in application column 124A of the application attribute management table 124 in the all applications display column 252 of the all applications list display column 250.

In the event that the all application list display button 231 of the all application list display button 231 and the unset application list display button 232 is not selected as a result of an operation of an operating section by the administrator of the management apparatus 6, i.e. in the event that the unset application list display button 232 is selected (SP53: NO), the processor 116 of the management apparatus 6 displays the unset applications list display column 260 shown in FIG. 29 in the topology display screen 200 (SP55). Specifically, the processor 116 of the management apparatus 6 refers to the application attribute management table 124 shown in FIG. 16, and stores and displays an application number with a number of years to saved stored in the number of years to be saved column 124B of "-" in the unset applications display column 262 of the unset applications list display column 260.

The applications 23 for which the number of years saved are to be changed/set are then selected by checking the change application check column 251 of the all applications list display column 250 or the set application check column 261 of the unset applications list display column 260 as a result of an operation of an operating section by the administrator of the management apparatus 6, and after this, the processor 116 of the management apparatus 6 awaits selection of the OK buttons 254, 265 in standby mode (SP56).

In the event that applications 23 the number of years to be saved for are to be changed/set are then selected by checking the change application check column 251 of the all applications list display column 250 or the set application check column 261 of the unset applications list display column 260 as a result of an operation of an operating section by the administrator of the management apparatus 6, and OK button 254, 264 is then selected (SP56: YES), the processor 116 of the management apparatus 6 then stores the application numbers of the applications 23 the number of years to be saved for are to be changed/set for in the application number column 127A of the changed saved number of years temporary storage table 127 shown in FIG. 19, refers to the regulating law management table 123, and stores the number of years to be saved for the regulating law name resulting from a predetermined operation in the corresponding number of years to be saved column 127B of the changed saved number of years temporary storage table 127 (SP57).

The processor 116 of the management apparatus 6 then ends the changing application selection processing procedure RT5 shown in FIG. 41 (SP58).

With regards to this, in the event that a predetermined operation on the regulating law name of the regulating law name column 222 other than this others column 224 does not take place, i.e. in the event that there is no predetermined operation on the others column 224 (SP42: NO), the processor 116 of the management apparatus 6 executes an unset application regulating law selection processing procedure (RT6).

Figure 42:
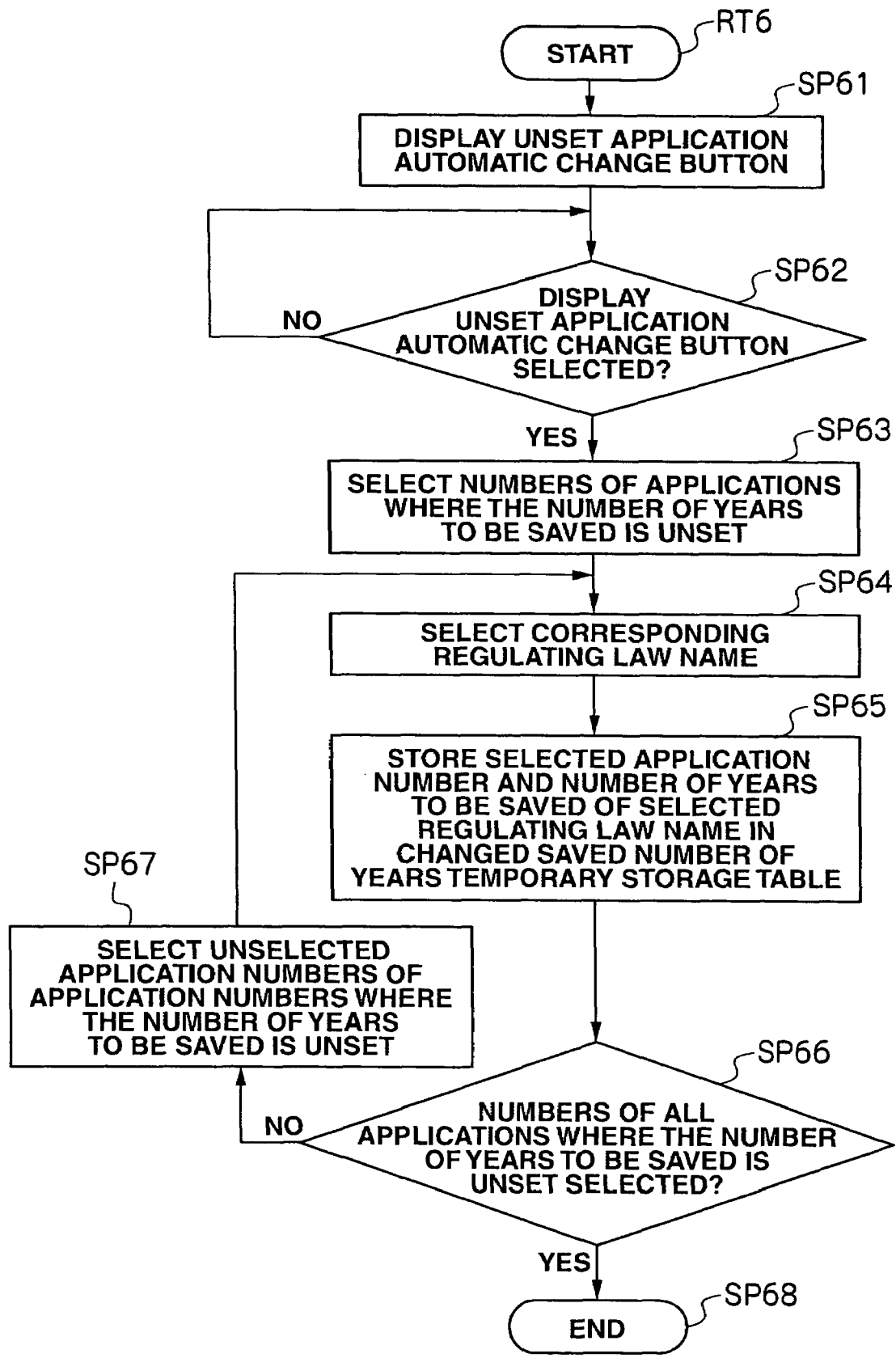
FIG. 42 is a flowchart showing an unset application regulating law selection processing procedure.

FIG. 42 is an example of a flowchart relating to an unset application regulating law selection processing procedure for management apparatus 6 at this storage system 1 and shows a specific processing procedure for the processor 116 of the management apparatus 6.

In the event that a predetermined operation takes place on the others column 224 (SP42: NO), as shown in FIG. 30, in accordance with unset application regulating law selection processing procedure RT6 shown in FIG. 42, the processor 116 of the management apparatus 6, for example, displays the unset application automatic change button 270 at the upper side of the others column 224 that this has been pressed (SP61).

The processor 116 of the management apparatus 6 then awaits selection of the unset application automatic change button 270 as a result of operation of an operation section by the administrator of the management apparatus 6 in standby mode (SP62).

In the event that the unset application automatic change button 270 is selected as a result of an operation of an operating section by the administrator of the management apparatus 6 (SP62: YES), the processor 116 of the management apparatus 6 selects the applications 23 where the number of years to be saved is not yet set (SP63). Specifically, the processor 116 of the management apparatus 6 refers to the application attribute management table 124 shown in FIG. 16, and selects an application number with a number of years to be saved stored in the number of years to be saved column 124B of "-".

Continuing on, the processor 116 of the management apparatus 6 refers to the regulating law management table 123 shown in FIG. 15 and the application attribute management table 124 shown in FIG. 16, and selects the corresponding regulating law name stored in regulating law name column 123B of the regulating law management table 123 based on the data type stored in the data type column 124F of the application attribute management table 124 (SP64).

The processor 116 of the management apparatus 6 then stores the application numbers of the selected applications 23 in the application number column 127A of the changed saved number of years temporary storage table 127 shown in FIG. 19, refers to the regulating law management table 123, and stores the number of years to be saved for the selected regulating law name in the corresponding number of years to be saved column 127B of the changed saved number of years temporary storage table 127 (SP65).

Processor 116 of the management apparatus 6 checks whether or not all of the application numbers for where the number of years to be saved is unset stored in the application number column 124A of the application attribute management table 124 have been selected (SP66).

In the event that all of the application numbers for where the number of years to be saved has not yet been set stored in the application number column 124A of the application attribute management table 124 have not been selected (SP66: NO), the processor 116 of the management apparatus 6 selects unselected application numbers of the application numbers where the number of years to be saved has not yet been set saved in the application number column 124A of the application attribute management table 124 (SP67), then, after this, refers again to the regulating law management table 123 shown in FIG. 15 and the application attribute management table 124 shown in FIG. 16, returns to the step SP64 of selecting corresponding regulated law names stored in the regulating law name column 123B of the regulating law management table 123 based on the data type stored in the data type column 124F of the application attribute management table 124, and then repeats the same processing thereafter (SP64 to SP66).

With regards to this, in the event that all of the application numbers where the number of years to be saved stored in the application number column 124A of the application attribute management table 124 have been selected, (SP66: YES), the processor 116 of the management apparatus 6 then ends the unset application regulating law selection processing procedure RT6 shown in FIG. 42 (SP68).

In the event that the changing application selection processing procedure RT5 shown in FIG. 41 is complete (SP58) or in the event that the unset application regulating law selection processing procedure RT6 shown in FIG. 42 is finished (SP68), the processor 116 of the management apparatus 6 executes management apparatus side number of years saved changing processing procedure (RT7).

Figure 43:
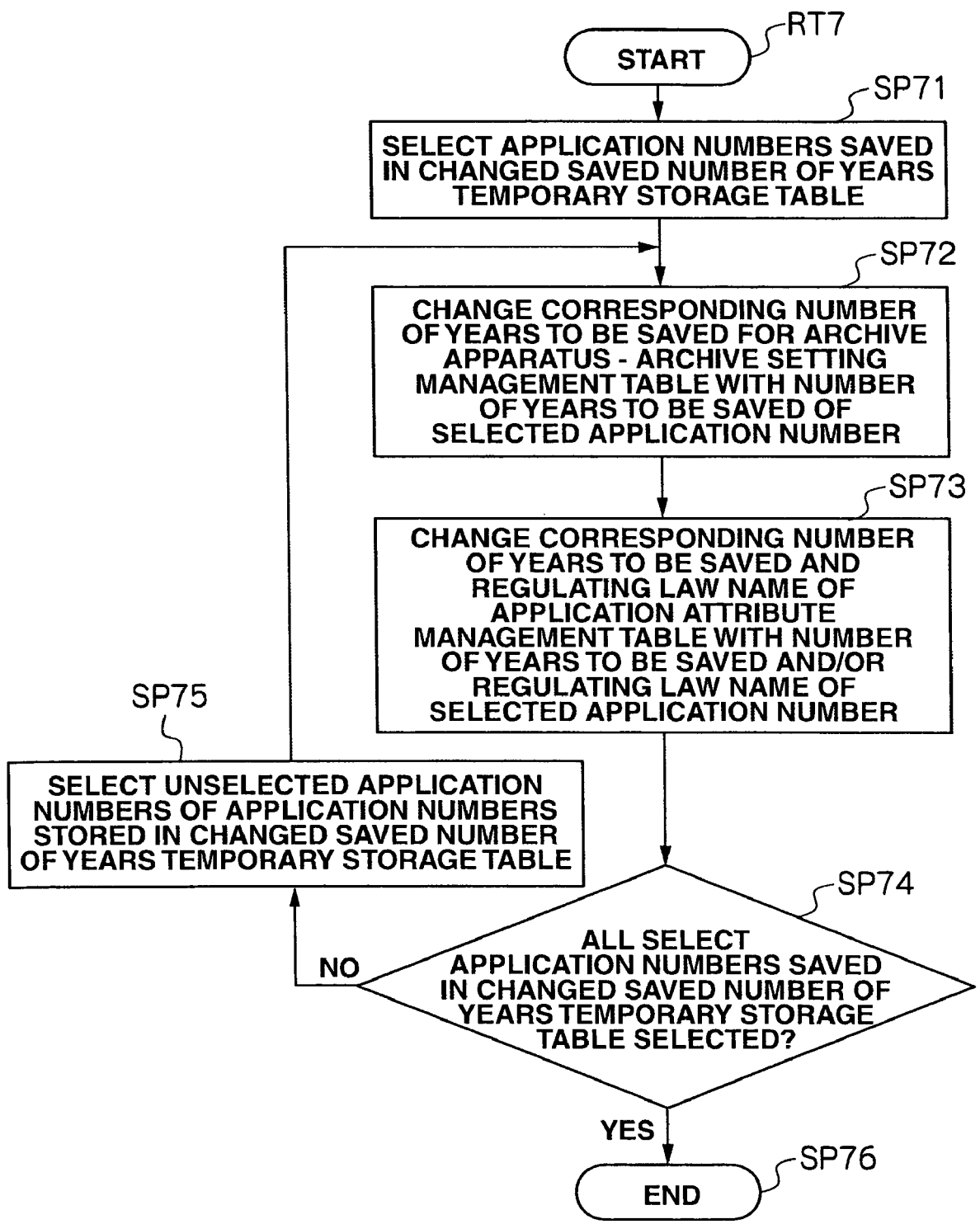
FIG. 43 is a flowchart showing a management apparatus side number of years saved changing processing procedure.

FIG. 43 is an example of a flowchart relating to a management apparatus side saved number of years changing processing procedure for management apparatus 6 at this storage system 1 and shows a specific processing procedure for the processor 116 of the management apparatus 6.

In the event that the changing application selection processing procedure RT5 shown in FIG. 41 is complete (SP58), or in the event that the unset application regulating law selection processing procedure RT6 shown in FIG. 42 is complete (SP68), the processor 116 of the management apparatus 6 selects an application number stored in the application number column 127A of the changed saved number of years temporary storage table 127 in changing application selection processing procedure RT5 shown in FIG. 41 or unset application regulating law selection processing procedure RT6 shown in FIG. 42 in accordance with the management apparatus side number of years saved changing processing procedure RT7 shown in FIG. 43 (SP71).

Continuing on, the processor 116 of the management apparatus 6 changes the number of years to be saved stored in the number of years to be saved column 122D of the archive apparatus—archive setting management table 122 corresponding to the selected application number to the number of years to be saved stored in the number of years to be saved column 127B of the changed saved number of years temporary storage table 127 corresponding to the selected application number (SP72).

Continuing on, the processor 116 of the management apparatus 6 changes the number of years to be saved stored in the saved number of years column 124B of the application attribute management table 124 corresponding to the selected application number to the number of years to be saved stored in the number of years to be saved column 127B of the changed saved number of years temporary storage table 127 corresponding to the selected application number (SP73).

Every time a regulating law name stored in regulating law name column 124E of the application attribute management table 124 corresponding to the selected application number is stored in the application number column 127A of the changed saved number of years temporary storage table 127 in the changing application selection processing procedure RT5 shown in FIG. 41, the processor 116 of the management apparatus 6 changes the selected regulating law name based on the regulating law a predetermined operation takes place for, or based on the selected application number in the unset application regulating law selection processing procedure RT6 shown in FIG. 42 (SP73).

Continuing on, processor 116 of the management apparatus 6 checks whether or not all of the application numbers stored in the application number column 127A of the changed saved number of years temporary storage table 127 have been selected (SP74).

In the event that all of the application numbers stored in application number column 127A of the changed saved number of years temporary storage table 127 have not been selected (SP74: NO), the processor 116 of the management apparatus 6 selects unselected application numbers of the application numbers stored in the application number column 127A of the changed saved number of years temporary storage table 127 (SP75). After this, again, the step SP72 of changing the number of years to be saved stored in the number of years to be saved column 122D of the archive apparatus—archive setting management table 122 corresponding to the selected application number to the number of years to be saved stored in the number of years to be saved column 127B of the changed saved number of years temporary storage table 127 corresponding to the selected application number is returned to, and the same processing is then repeated thereafter (SP72 to SP74).

With regards to this, in the event that all of the application numbers stored in the application number column 127A of the changed saved number of years temporary storage table 127 are selected (SP74: YES), the processor 116 of the management apparatus 6 then ends the management apparatus side number of years saved changing processing procedure RT7 shown in FIG. 43 (SP76).

In the event that the management apparatus side number of years saved changing processing procedure RT7 shown in FIG. 43 is complete (SP76), the processor 116 of the management apparatus 6 executes archive apparatus side number of years saved changing processing (RT8).

Figure 44:
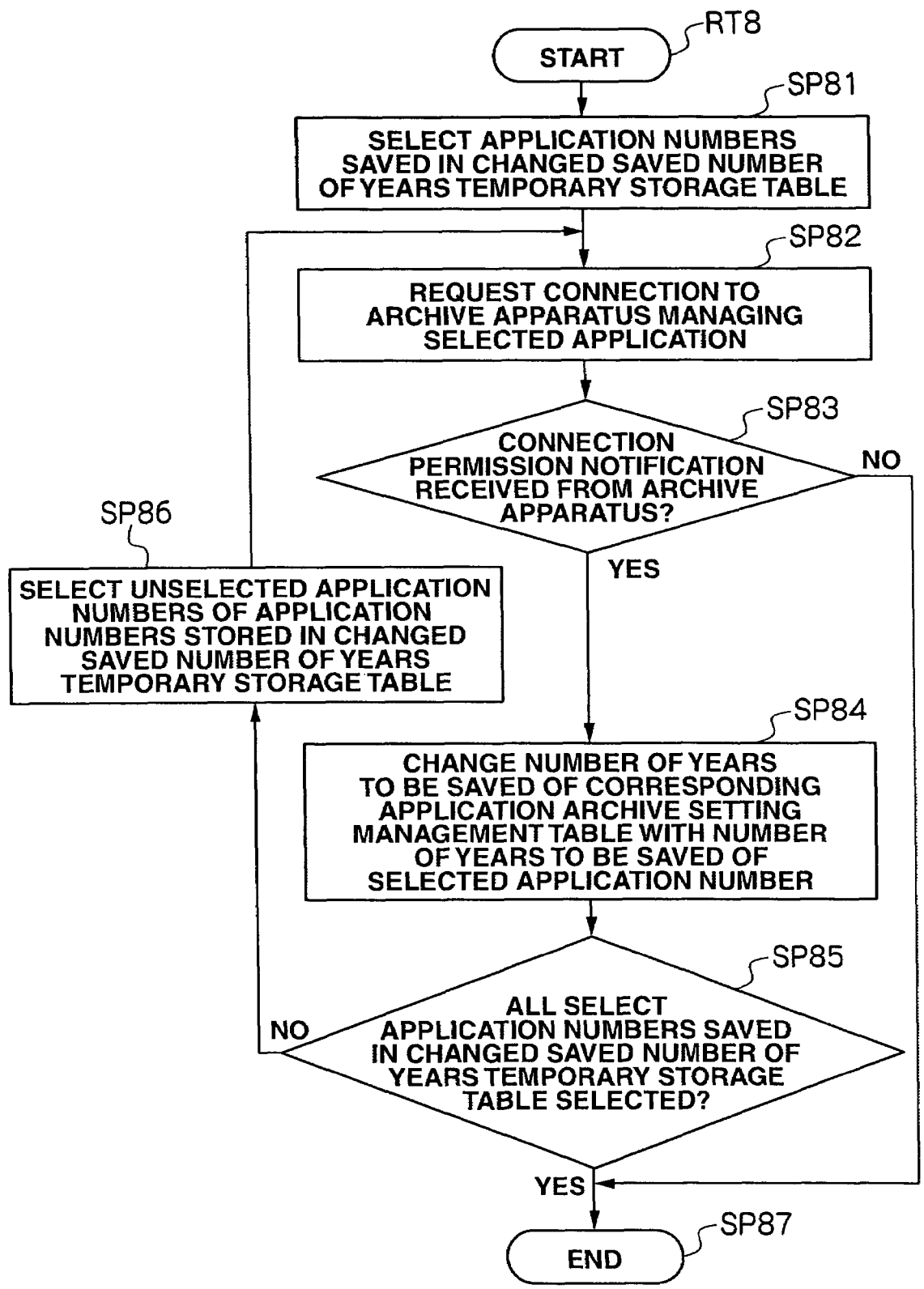
FIG. 44 is a flowchart showing an archive apparatus side number of years saved changing processing procedure.

FIG. 44 is an example of a flowchart relating to archive apparatus side saved number of years changing processing for management apparatus 6 at this storage system 1 and shows a specific processing procedure for the processor 116 of the management apparatus 6.

In the event that the management apparatus side number of years saved changing processing procedure RT7 shown in FIG. 43 is complete, the processor 116 of the management apparatus 6 selects the application numbers stored in the application number column 127A of the changed saved number of years temporary storage table 127 in changing application selection processing procedure RT5 shown in FIG. 41 or unset application regulating law selection processing procedure RT6 shown in FIG. 42 in accordance with archive apparatus side number of years saved changing processing procedure RT8 shown in FIG. 44 (SP81).

The processor 116 of the management apparatus 6 then refers to the archive apparatus—archive setting management table 122 shown in FIG. 14, and requests connection to the archive apparatus 3 managing the applications of the selected application numbers (SP82). In this event, the processor 116 of the management apparatus 6 refers to the archive apparatus password management table 125, selects archive apparatus numbers for the archive apparatus 3 managing the applications 23 of the selected application numbers, and requests connections by sending connection requests containing the corresponding user ID's and passwords.

The processor 116 of the management apparatus 6 then checks whether or not connection permission notification has been received from the archive apparatus 3 requesting the connection (SP83). For example, the processor 116 of the management apparatus 6 checks whether or not connection permission notification has been received from the archive apparatus 3 requesting the connection using whether or not connection permission notification is received from the archive apparatus 3 requesting the connection within a predetermined time from transmission of the connection request.

In the event that connection permission notification is not received from the archive apparatus 3 requesting the connection (SP83: NO), the processor 116 of the management apparatus 6 ends the archive apparatus side number of years saved changing processing procedure RT8 shown in FIG. 44 with an error (SP87), and then ends the saved number of years changing processing procedure RT4 shown in FIG. 40 (SP43). For example, in the event that the user ID and password are different, notification that connection is not permitted is received, and connection permission notification is not received.

With regards to this, in the event that connection permission notification is received from the archive apparatus 3 requesting the connection (SP83: YES), the processor 116 of the management apparatus 6 changes the number of years to be saved stored in the number of years to be saved column 42C of the application archive setting management table 42 corresponding to the selected application number to the number of years to be saved stored in the number of years to be saved column 127B of the changed saved number of years temporary storage table 127 corresponding to the selected application number (SP84). Specifically, the processor 116 of the management apparatus 6 sends a change request to change the number of years to be saved stored in the number of years to be saved column 127B of the changed saved number of years temporary storage table 127 corresponding to the selected application number to the archive apparatus 3 requesting the connection. When the change request is received, the archive apparatus 3 changes the number of years to be saved stored in the number of years to be saved column 42C of the application archive setting management table 42 corresponding to the selected application number.

Continuing on, processor 116 of the management apparatus 6 checks whether or not all of the application numbers stored in the application number column 127A of the changed saved number of years temporary storage table 127 have been selected (SP85).

In the event that all of the application numbers stored in the application number column 127A of the changed saved number of years temporary storage table 127 have not been selected (SP85: NO), the processor 116 of the management apparatus 6 selects application numbers that have not yet been selected of the application numbers stored in the application number column 127A of the changed saved number of years temporary storage table 127 (SP86), then, after this, refers to the archive apparatus—archive setting management table 122 shown in FIG. 14, returns to step SP82 of requesting connection to the archive apparatus 3 managing the applications 23 of the selected application numbers, and then repeats the same processing (SP82 to SP85).

With regards to this, in the event that all of the application numbers stored in the application number column 127A of the changed saved number of years temporary storage table 127 are selected (SP85: YES), the processor 116 of the management apparatus 6 then ends the archive apparatus side number of years saved changing processing procedure RT8 shown in FIG. 44 (SP87).

In the event that the archive apparatus side number of years saved changing processing procedure RT8 shown in FIG. 44 is complete (SP87), the processor 116 of the management apparatus 6 ends the saved number of years changing processing procedure RT4 shown in FIG. 40 (SP43).

With this kind of storage system 1, even in cases where the number of years it is necessary to save data for is changed as a result of amendments to the regulating law so that the number of years to be saved of the regulating law disclosed in the number of years data handled by the applications 23 is to be saved for is changed to the current number of years to be saved at the management apparatus 6 it is possible to also reflect changes in the number of years to be saved at the corresponding host apparatus 2, archive apparatus 3, storage apparatus 4 and storage management apparatus 5 without the administrator having to perform the troublesome operation of changing the number of years to be saved set at each respective apparatus, and management of each of the host apparatus 2, archive apparatus 3, storage apparatus 4 and storage management apparatus 5 is made substantially more straightforward.

The reflecting of information between the host apparatus 2 and the archive apparatus 3, between the archive apparatus 3 and the storage apparatus 4, and between the storage apparatus 4 and the storage management apparatus 5 can be realized using related art technology.

(4-4) Emphasized Displaying Processing

Figure 45:
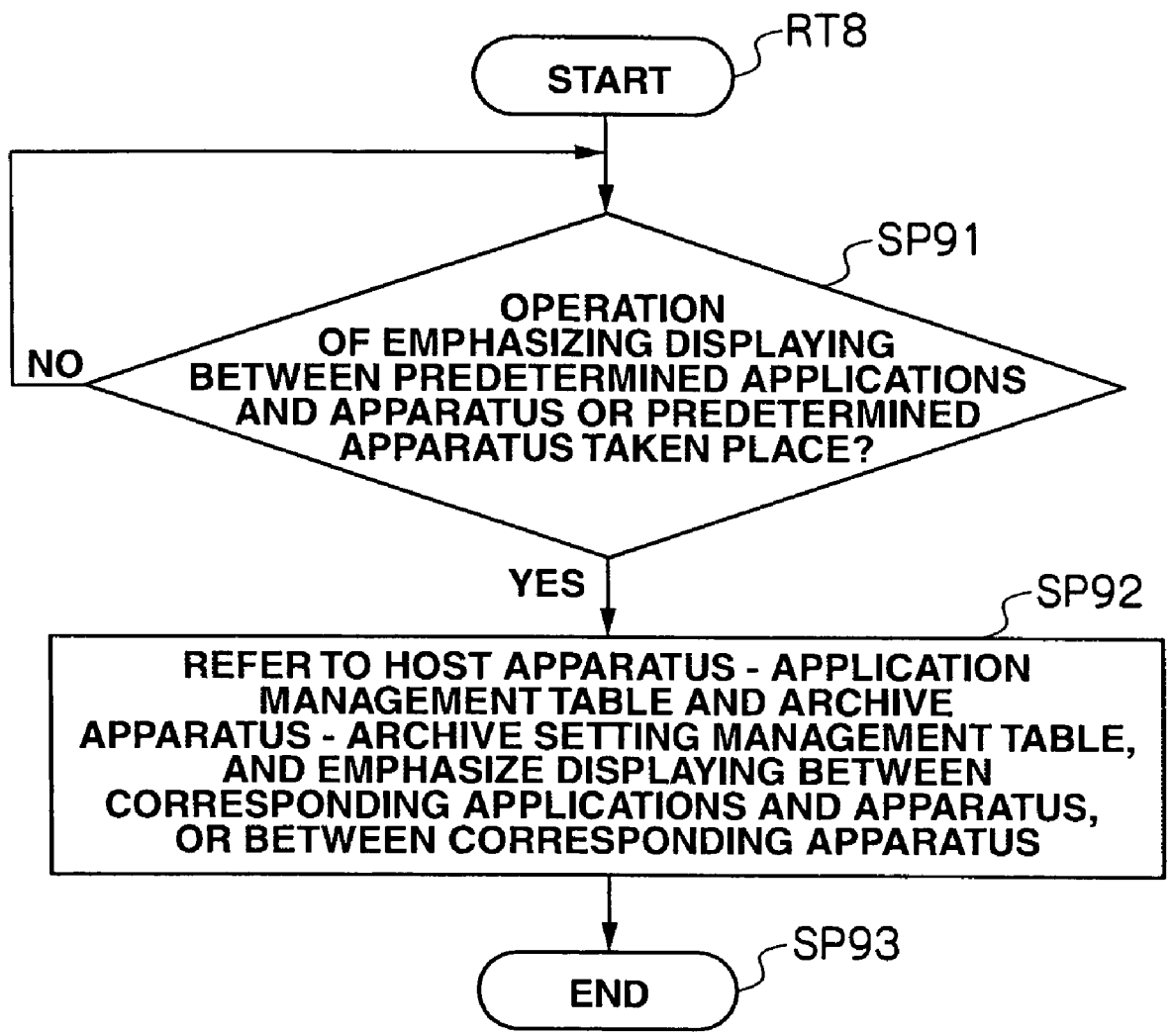
FIG. 45 is a flowchart showing an emphasized display processing procedure.

FIG. 45 is an example of a flowchart relating to emphasized display processing for management apparatus 6 at this storage system 1 and show a specific processing procedure for the processor 116 of the management apparatus 6.

In the event that the topology display processing RT1 shown in FIG. 36 is complete (SP5), by executing the emphasized display processing program 144 that emphasizes displaying between predetermined applications 23 and apparatus, or between predetermined apparatus, the processor 116 of the management apparatus 6 waits in standby mode for an operation for emphasized displaying between predetermined applications 23 and apparatus or between predetermined apparatus, in accordance with emphasized display processing procedure RT9 shown in FIG. 45.

In the event of an operation for emphasized displaying between predetermined applications and apparatus or between predetermined apparatus (SP91:YES), the processor 116 of the management apparatus 6 refers to the host apparatus—application management table 41 and the archive apparatus—archive setting management table 122, performs emphasized displaying between the corresponding application 23 and apparatus, or between the corresponding apparatus on the topology display screen 200 of the display screen 119A of the display apparatus 119 (SP92), then ends the emphasized display processing procedure RT9 shown in FIG. 45 (SP93).

Figure 46:
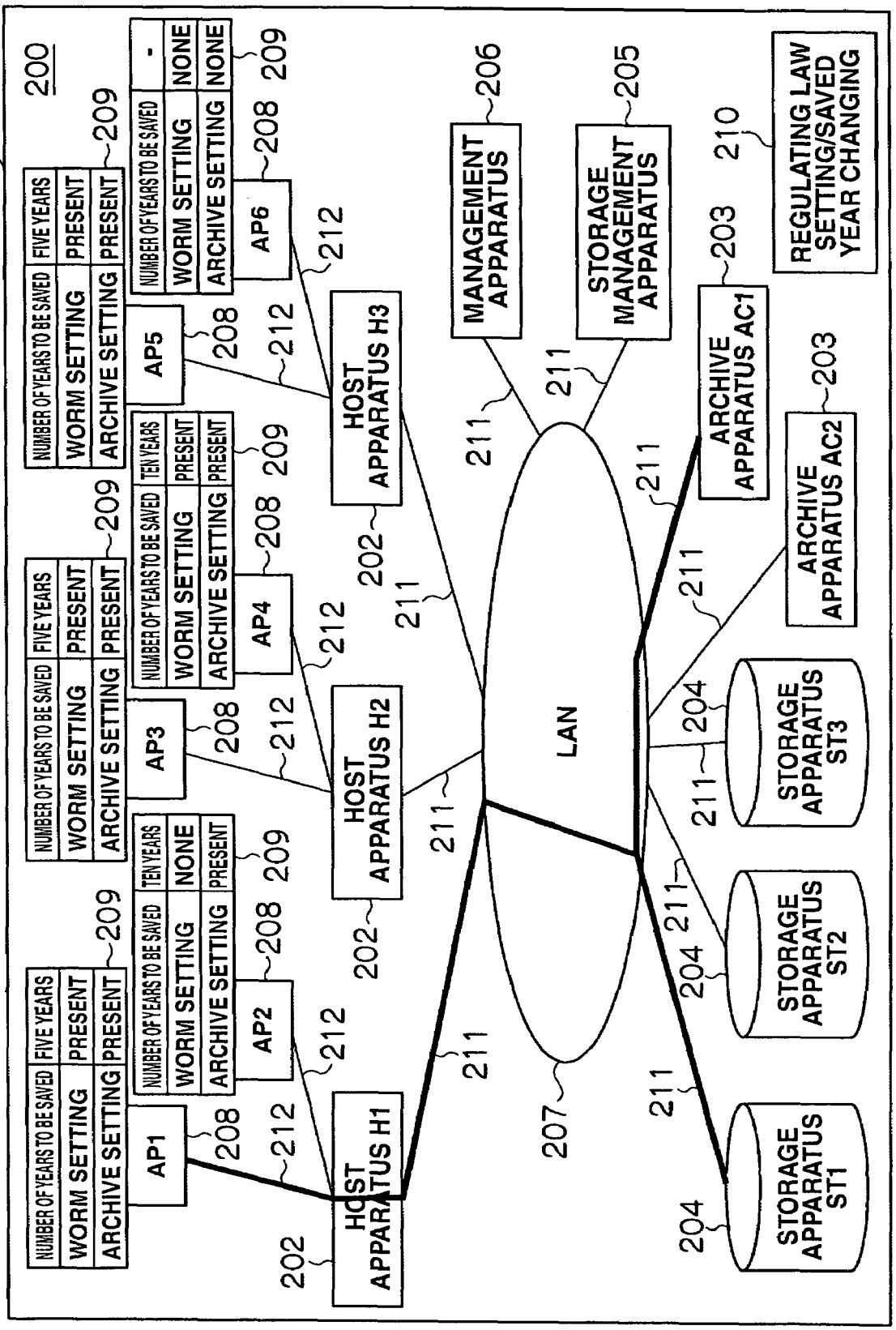
FIG. 46 is an outline view illustrating a topology display screen in the case of emphasized displaying.

FIG. 46 shows the topology display screen 200 for the case where host apparatus 2 storing application 23 of "AP1", archive apparatus 3 managing the host apparatus 2, and storage apparatus 4 storing data handled by the application 23 are displayed in an emphasized manner.

In this case, an operation takes place to emphasize displaying of the host apparatus 2 storing the application 23 of application display column 208 of "AP1", the archive apparatus 3 managing the host apparatus 2, and the storage apparatus 4 storing data handled by the application 23 at the top of the application display column 208 of "AP1" for example, and in the case of this operation, the processor 116 of the management apparatus 6 refers to the host apparatus—application management table 41. Then, as the application 23 of "AP1" is stored in the host apparatus 2 of "host apparatus H1", as shown in FIG. 46, the processor 116 of the management apparatus 6 displays connection line 212 connecting the host display column 208 of "AP1" and the host apparatus display column 202 of "host apparatus H1" in an emphasized manner.

Further, upon referring to the archive apparatus—archive setting management table 122, as shown in FIG. 46, the processor 116 of the management apparatus 6 displays connection line 211 connecting the host apparatus display column 202 of "host apparatus H1" and the archive apparatus display column 203 of "archive apparatus AC1" and connection line 211 connecting the host apparatus display column 202 of "host apparatus H1" and the storage apparatus display column 204 of "storage apparatus ST1" in an emphasized manner because the host apparatus 2 housing the application 23 of "AP1" is managed at archive apparatus 3 of "AC1" and the data handled by the application 23 of "AP1" is stored in the storage apparatus 4 of "ST1".

Figure 47:
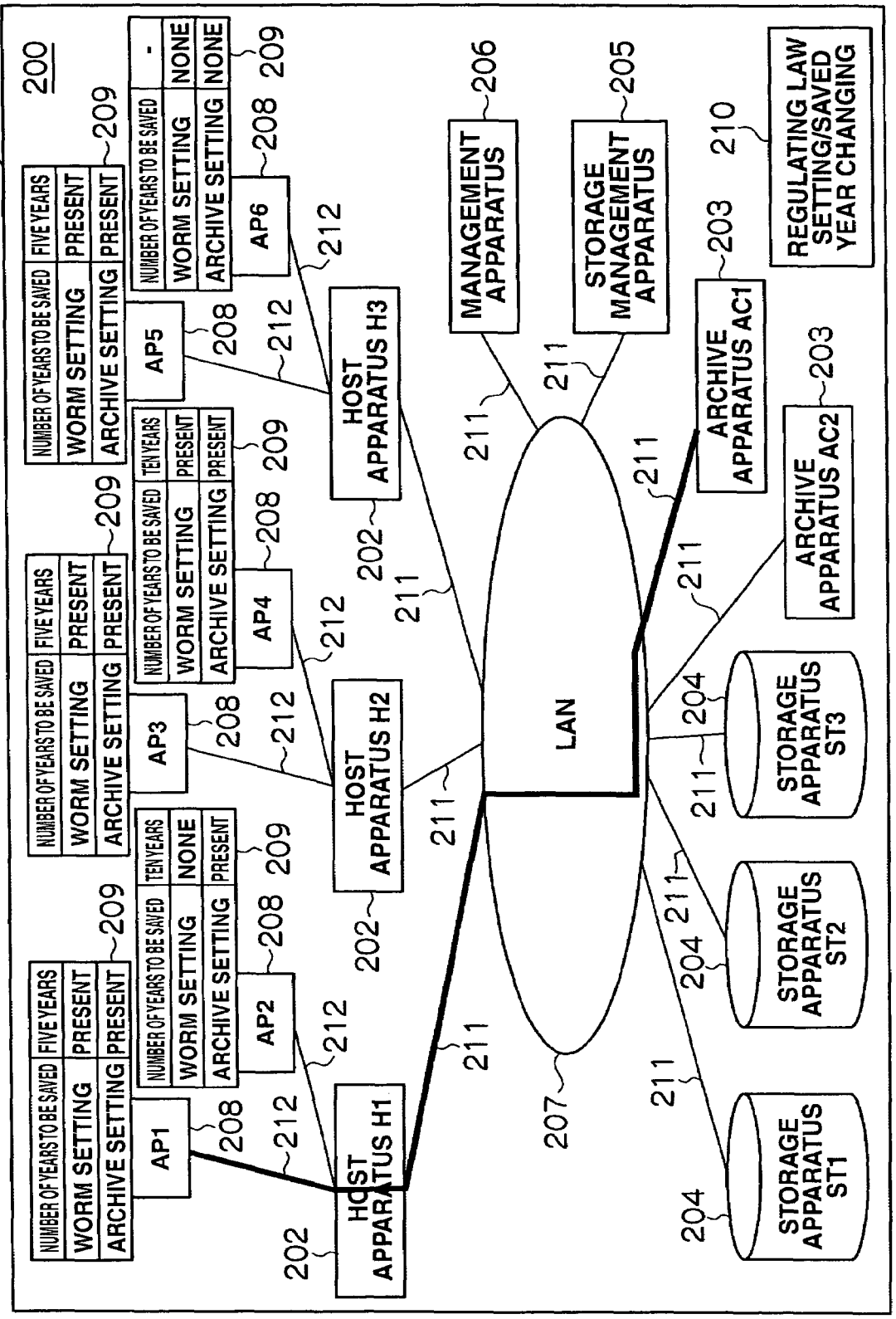
FIG. 47 is a further outline view illustrating a topology display screen in the case of emphasized displaying.

FIG. 47 shows the topology display screen 200 for the case where the host apparatus 2 storing the application 23 of "AP1" and the archive apparatus 3 managing the host apparatus 2 are displayed in an emphasized manner.

In this case, an operation takes place to emphasize displaying of the host apparatus 2 storing the application 23 of application display column 208 of "AP1", the archive apparatus 3 managing the host apparatus 2 at the top of the application display column 208 of "AP1" for example, and in the case of this operation, the processor 116 of the management apparatus 6 refers to the host apparatus—application management table 41. Then, as described above, as the application 23 of "AP1" is stored in the host apparatus 2 of "host apparatus H1", as shown in FIG. 47, the processor 116 of the management apparatus 6 displays connection line 212 connecting the host display column 208 of "AP1" and the host apparatus display column 202 of "host apparatus H1" in an emphasized manner.

Further, upon referring to the archive apparatus—archive setting management table 122, as described above, as shown in FIG. 47, the processor 116 of the management apparatus 6 displays the connection line 211 connecting the host apparatus display column 202 of "host apparatus H1" and the archive apparatus display column 203 of the "archive apparatus AC1" in an emphasized manner because the host apparatus 2 storing the application 23 of "AP1" is managed at the archive apparatus 3 of "AC1".

Figure 48:
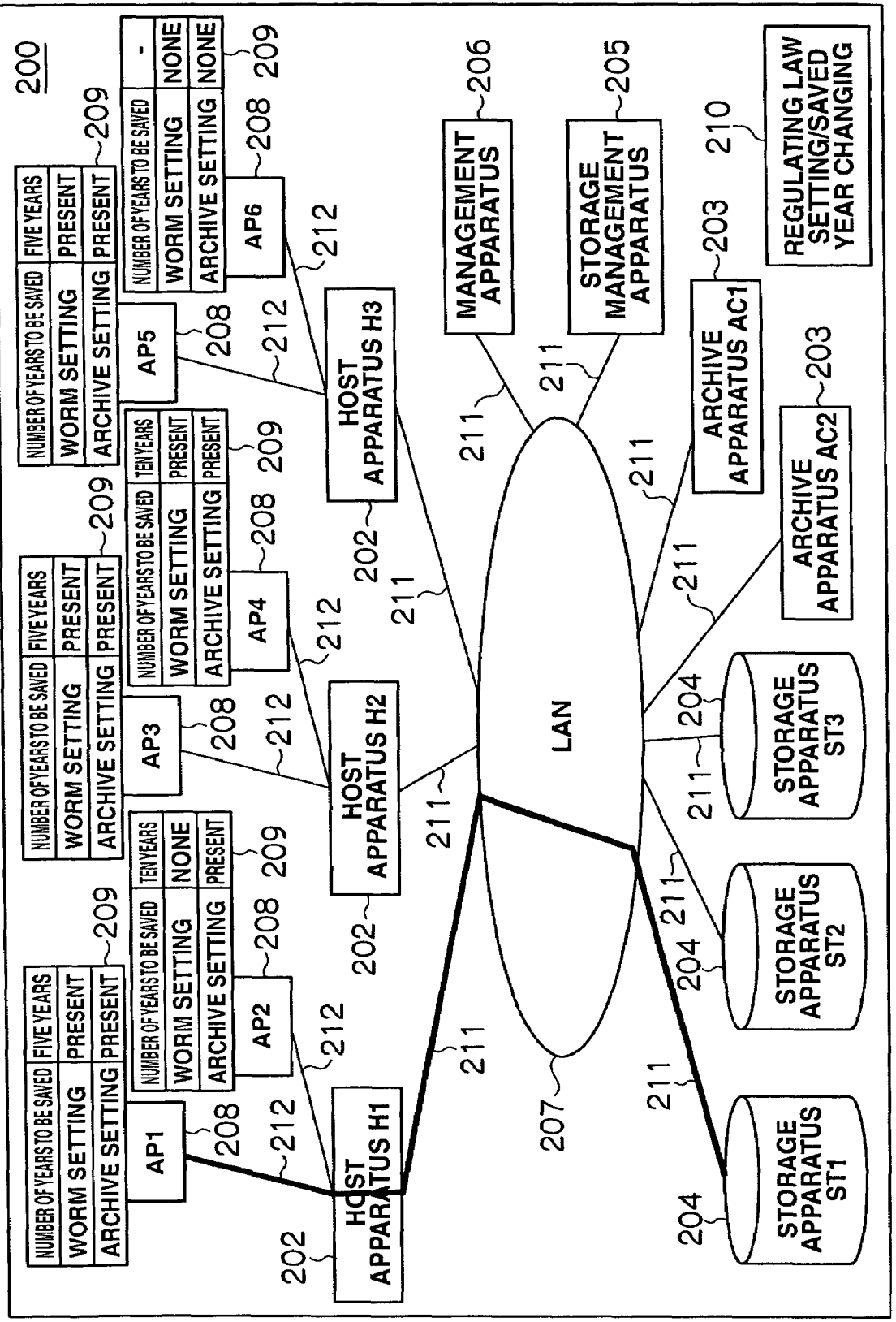
FIG. 48 is another outline view illustrating a topology display screen in the case of emphasized displaying.

FIG. 48 shows the topology display screen 200 for the case where host apparatus 2 storing application 23 of "AP1" and storage apparatus 4 storing data handled by the application 23 are displayed in an emphasized manner.

In this case, an operation takes place to emphasize displaying of the host apparatus 2 storing the application 23 of application display column 208 of "AP1", and the storage apparatus 4 storing data handled by the application 23 at the top of the application display column 208 of "AP1" for example, and in the case of this operation, the processor 116 of the management apparatus 6 refers to the host apparatus—application management table 41. Then, as described above, as the application 23 of "AP1" is stored in the host apparatus 2 of "host apparatus H1", as shown in FIG. 48, the processor 116 of the management apparatus 6 displays connection line 212 connecting the host display column 208 of "AP1" and the host apparatus display column 202 of "host apparatus H1" in an emphasized manner.

Further, as described above, upon referring to the archive apparatus—archive setting management table 122, as shown in FIG. 48, the processor 116 of the management apparatus 6 displays the connection line 211 connecting the host apparatus display column 202 of "host apparatus H1" and the storage apparatus display column 204 of "storage apparatus ST1" in an emphasized manner because the data handled by the application 23 of "AP1" is stored in the storage apparatus 4 of "ST1".

Figure 49:
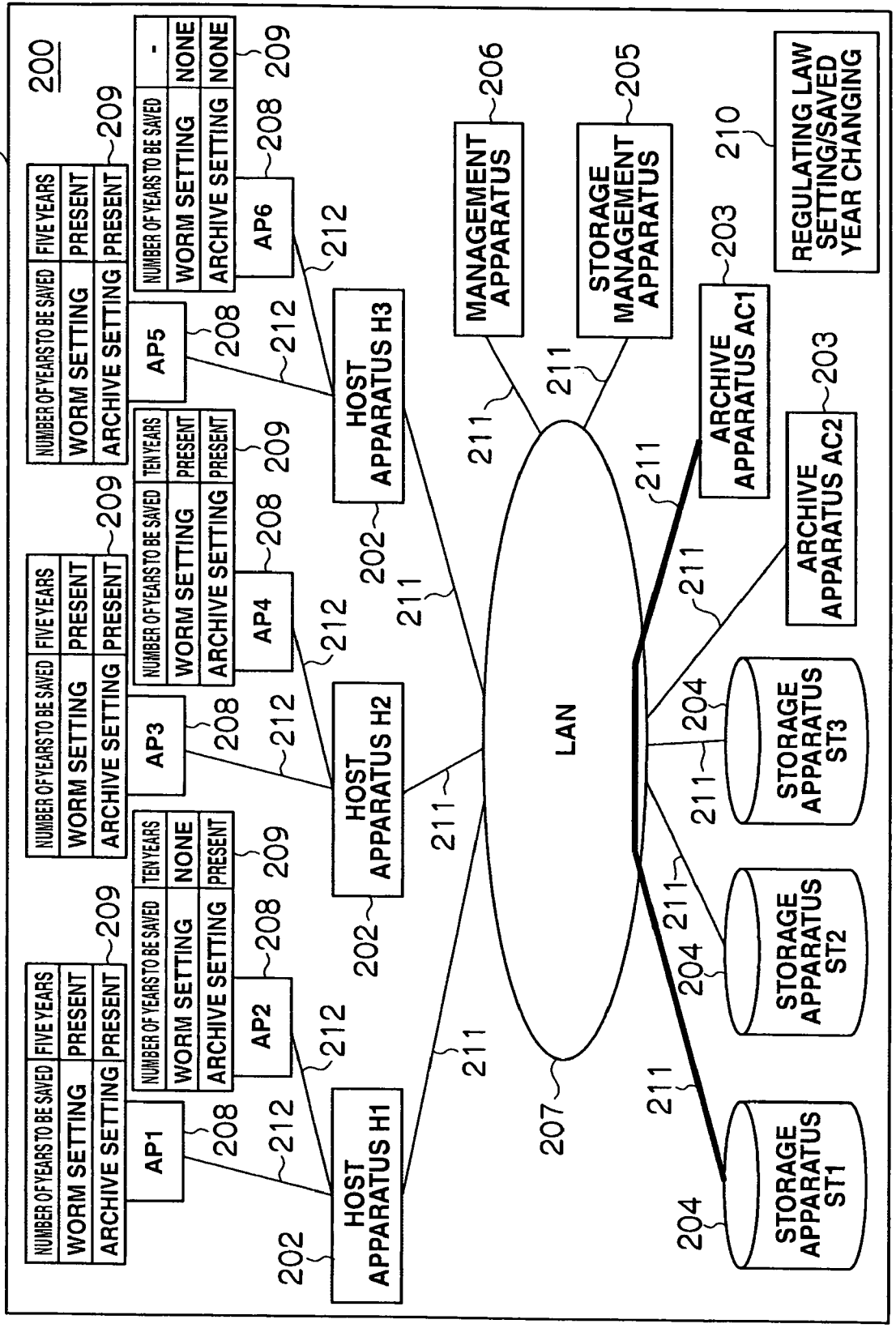
FIG. 49 is a further outline view illustrating a topology display screen in the case of emphasized displaying.

FIG. 49 shows the topology display screen 200 for the case where the archive apparatus 3 of "AC1" and the storage apparatus 4 handled by the archive apparatus 3 are displayed in an emphasized manner.

In this case, for example, at archive apparatus display column 203 of "archive apparatus AC1", an operation takes place to display the archive apparatus 3 of "AC1" and the storage apparatus 4 handling the archive apparatus 3 in an emphasized manner, and in the event of this operation, the processor 116 of the management apparatus 6 refers to the archive apparatus—archive setting management table 122. The processor 116 of the management apparatus 6 then, as shown in FIG. 49, displays the connection line 211 connecting the archive apparatus display column 203 of "archive apparatus AC1" and the storage apparatus display column 204 of "storage apparatus ST1" in an emphasized manner because the archive apparatus 3 of "AC1" handles the storage apparatus 4 of "ST1".

In this embodiment, a description is given of the case of displaying the connection lines 211, 212 in an emphasized manner by displaying using thick lines but the present invention is by no means limited in this respect, and various methods for displaying in an emphasized manner are possible such as, for example, displaying the connection lines 211, 212 flashing or displaying the connection lines 211, 212 using color etc.

At the storage system 1, by referring at the management apparatus 6 to the connection relationship between the each of the host apparatus 2, archive apparatus 3, storage apparatus 4 and storage management apparatus 5 connected to the management apparatus 6 via the LAN 7, referring to the storage relationship of each of the apparatus 2 and the applications 23 stored in each of the host apparatus 2, and by then displaying the corresponding connection relationship and storage relationship in an emphasized manner, even in cases of confirmation between predetermined applications 23 and apparatus, and between predetermined apparatus, it is possible for the administrator to recognize the connection relationship and/or the storage relationship in a straightforward manner, and each of the host apparatus 2, archive apparatus 3, storage apparatus 4 and storage management apparatus 5 can be managed in an extremely straightforward manner.

(4-5) Same Data Type Setting Information Display Processing

Figure 50:
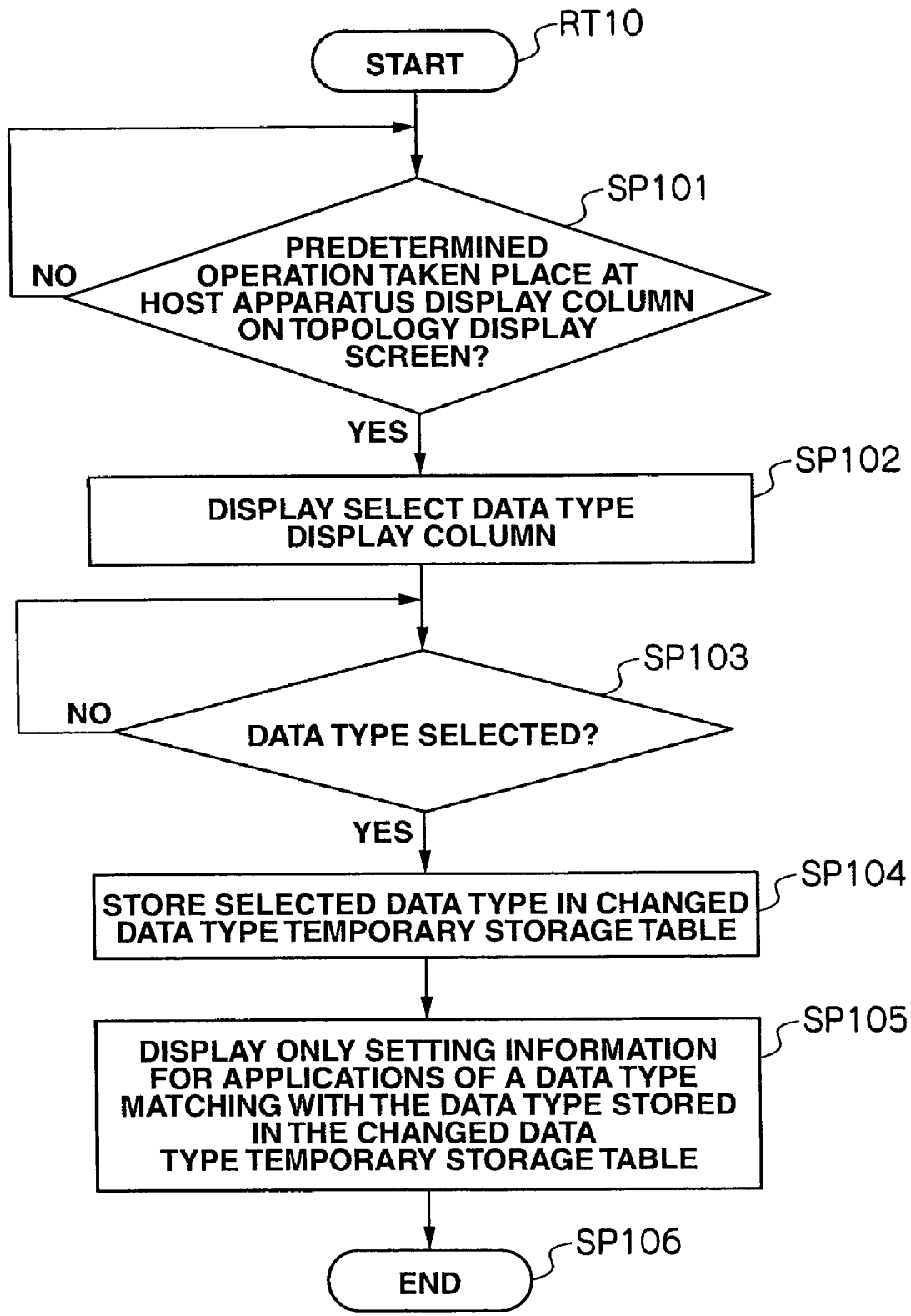
FIG. 50 is a flowchart showing a same data type setting information display processing procedure.

FIG. 50 is an example of a flowchart relating to same data type setting information display processing for management apparatus 6 at this storage system 1 and show a specific processing procedure for the processor 116 of the management apparatus 6.

In the event that the topology display process RT1 shown in FIG. 36 is complete (SP5), by executing the same data type setting information display processing program 145 for displaying only setting information for applications 23 of the same data type, the processor 116 of the management apparatus 6 waits in standby mode for a predetermined operation on the host apparatus display column 202 of the topology display screen 200 as a result of an operation of an operating section by the administrator of the management apparatus 6, in accordance with same data type setting information display processing procedure RT10 shown in FIG. 50. For example, the processor 116 of the management apparatus 6 awaits a so-called "right-click" operation on the host apparatus display column 202.

In the event that a predetermined operation takes place at the host apparatus display column 202 of the topology display screen 200 as a result of an operation of an operating section by the administrator of the management apparatus 6 (SP101: YES), as shown in FIG. 31, for example, the processor 116 of the management apparatus 6 displays the selected data type display column 280 at the upper side of the host display column there has been a predetermined operation for (SP102).

The processor 116 of the management apparatus 6 then waits in standby mode for one of the data types displayed at the selected data type display column 280 to be selected as a result of an operation of an operating section by the administrator of the management apparatus 6 (SP103).

In the event that one of the data types displayed at the selected data type display column 280 is selected as a result of an operation of an operating section by the administrator of the management apparatus 6 (SP103: YES), the processor 116 of the management apparatus 6 stores the selected data type in the changed data type column 128A of the changed data type temporary storage table 128 (SP104).

The processor 116 of the management apparatus 6 then refers to the application attribute management table 124, and when there is matching with the data type stored in the changed data type column 128A of the changed data type temporary storage table 128, only the setting information display column 209 of the application 23 of the application number corresponding to the data type stored in the data type column 124F is displayed at the topology display screen 200 (SP105), and the same data type setting information display processing procedure RT10 shown in FIG. 50 is complete (SP106).

Figure 51:
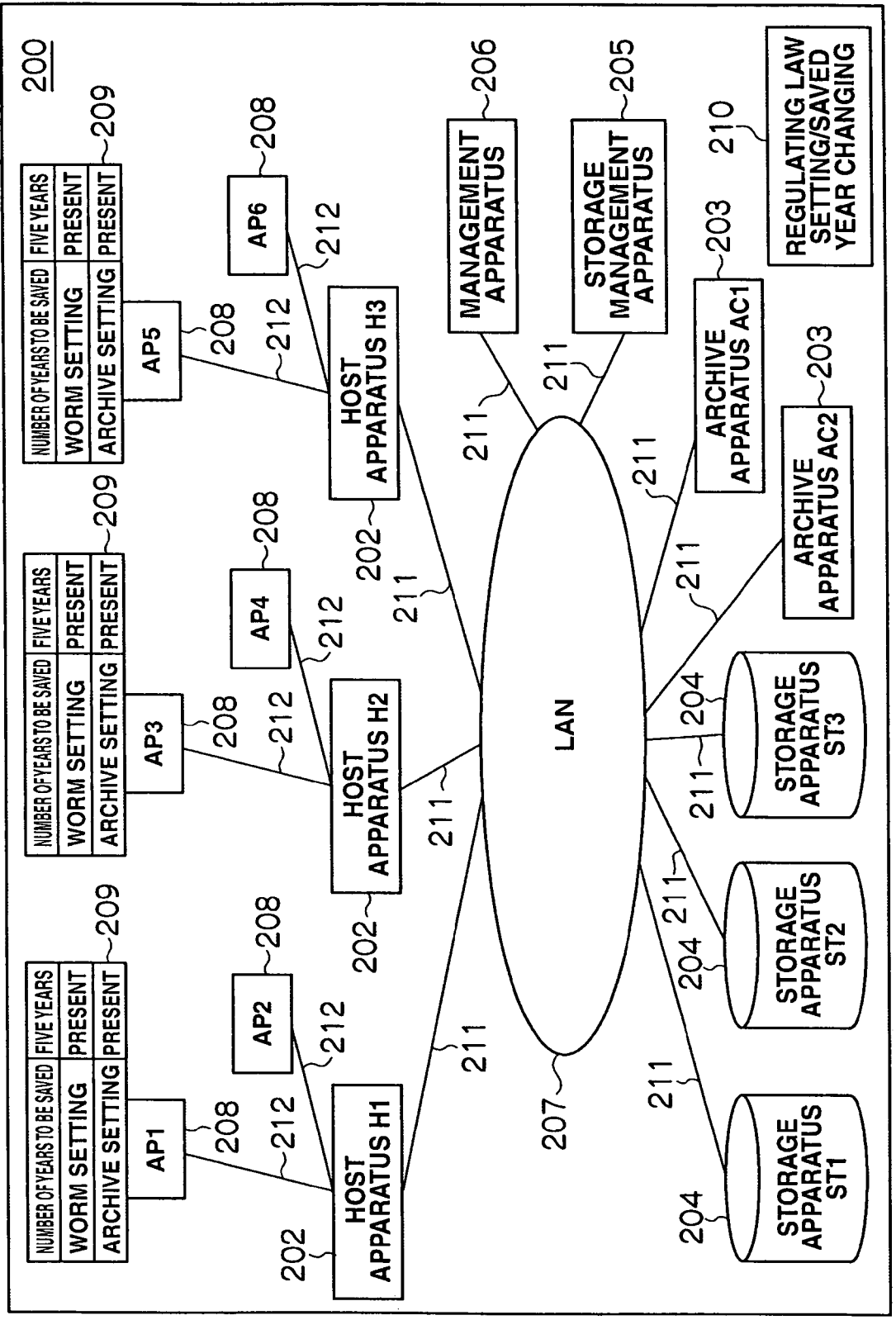
FIG. 51 is a further outline view illustrating a topology display screen in the case of selecting data type.

FIG. 51 shows the topology display screen 200 for the case where the data type "mail data" is selected. In this case, upon referring to the application attribute management table 124, because the applications 23 with the data type "mail data" stored in the data type column 124F are the applications 23 of "AP1", "AP3" and "AP5", the processor 116 of the management apparatus 6 displays the setting information display column 209 for the applications "AP1", "AP3" and "AP5" on the topology display screen 200.

At the storage system 1, at the management apparatus 6, even in the case where only setting information for applications 23 of the same data type is confirmed by referring to the application attribute management table 124, determining whether or not there is matching with the data type stored in the changed data type column 128A of the changed data type temporary storage table 128, and displaying only sitting information for applications 23 of the same data type, it is possible for the administrator to recognize the setting information in a straightforward manner, and each of the host apparatus 2, archive apparatus 3, storage apparatus 4 and storage management apparatus 5 can be managed in an extremely straightforward manner.

(4-6) Application Data Transfer Processing

Figure 52:
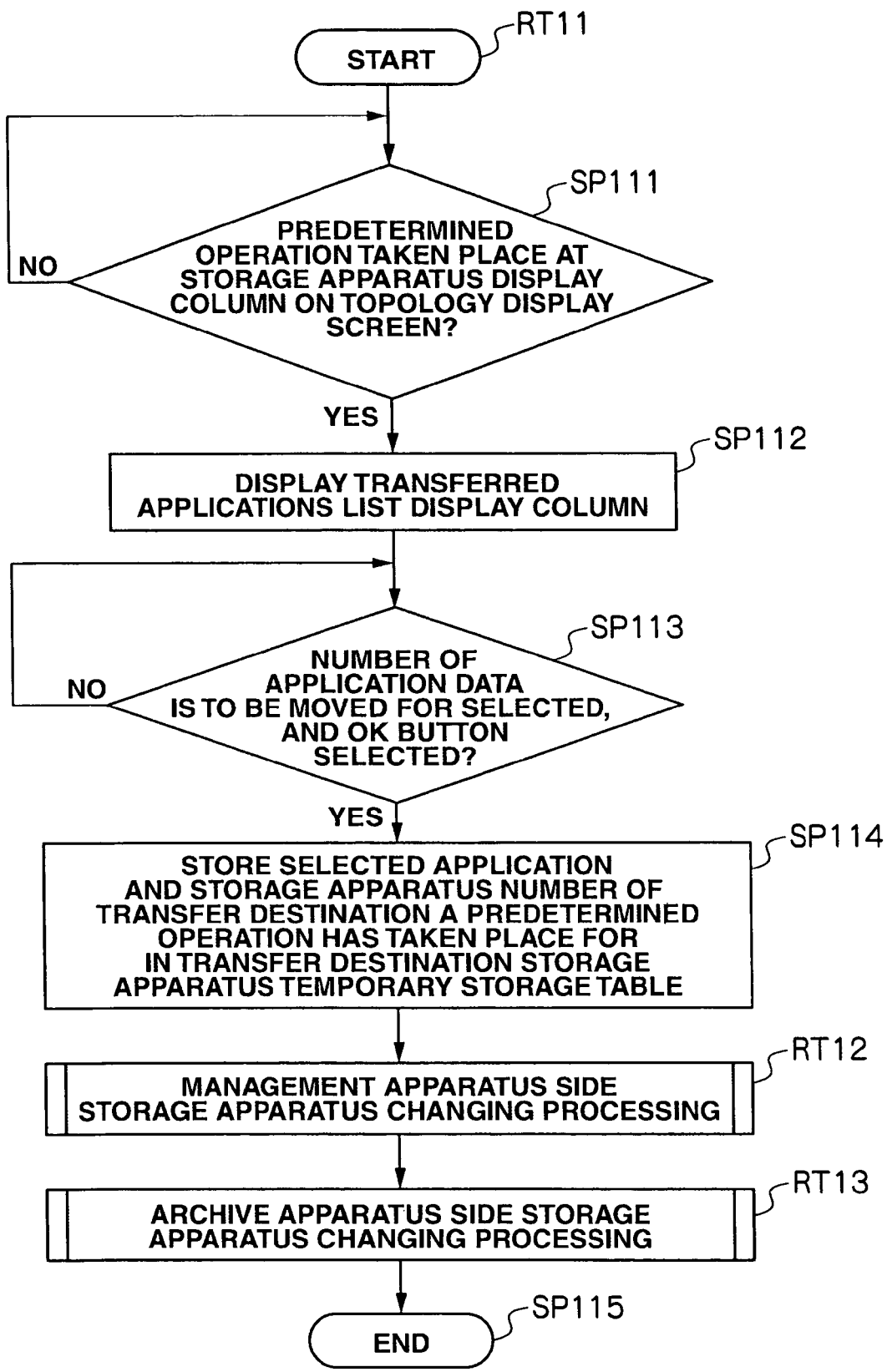
FIG. 52 is a flowchart showing an application data transfer procedure.

FIG. 52 is an example of a flowchart relating to application data transfer processing for management apparatus 6 at this storage system 1 and show a specific processing procedure for the processor 116 of the management apparatus 6.

In the event that the topology display process RT1 shown in FIG. 36 is complete (SP5), by executing the application data transfer processing program 146 to transfer the data handled by the application 23 between storage apparatus 4, the processor 116 of the management apparatus 6 waits in a standby state for a predetermined operation on the storage apparatus display column 204 of the topology display screen 200 as a result of an operation of an operating section by the administrator of the management apparatus 6, in accordance with application data transfer procedure RT11 shown in FIG. 52 (SP111). For example, the processor 116 of the management apparatus 6 waits for a so-called "drag and drop" operation from the storage apparatus display column 204 that is the source of the transfer to the storage apparatus display column 204 that is the transfer destination.

In the event that there is a predetermined operation on the storage apparatus display column 204 of the topology display screen 200 as a result of an operation of an operating section by the administrator of the management apparatus 6 (SP111: YES), the processor 116 of the management apparatus 6 displays the transferred applications list display column 290 shown in FIG. 32 on the topology display screen 200 of display screen 119A of the display apparatus 119 (SP112).

Continuing on, the processor 116 of the management apparatus 6 selects the number of the application the storage apparatus 4 storing the data handled by the application 23 is moved to by checking the transfer application check column 291 of the transferred applications list display column 290 as a result of an operation of an operating section by the administrator of the management apparatus 6, and then waits in a standby state for the OK button 293 to be selected (SP113).

The processor 116 of the management apparatus 6 then selects the number of the application the storage apparatus 4 storing the data handled by the application 23 is transferred to by checking the application check column 291 of the transferred applications list display column 290 as a result of an operation of an operating section by the administrator of the management apparatus 6. After this, in the event that the OK button 293 is selected (SP13: YES), the application number for transferring the storage apparatus 4 storing the data handled by the application 23 is stored in the application number column 129A of the transfer destination storage apparatus temporary storage table 129 shown in FIG. 21, and the storage number of the storage apparatus 4 that is the transfer destination of the predetermined operation is stored in the corresponding transfer destination storage apparatus number column 129B of the transfer destination storage apparatus temporary storage table 129 (SP114).

Continuing on, the processor 116 of the management apparatus 6 executes management apparatus side storage apparatus changing processing (RT7).

Figure 53:
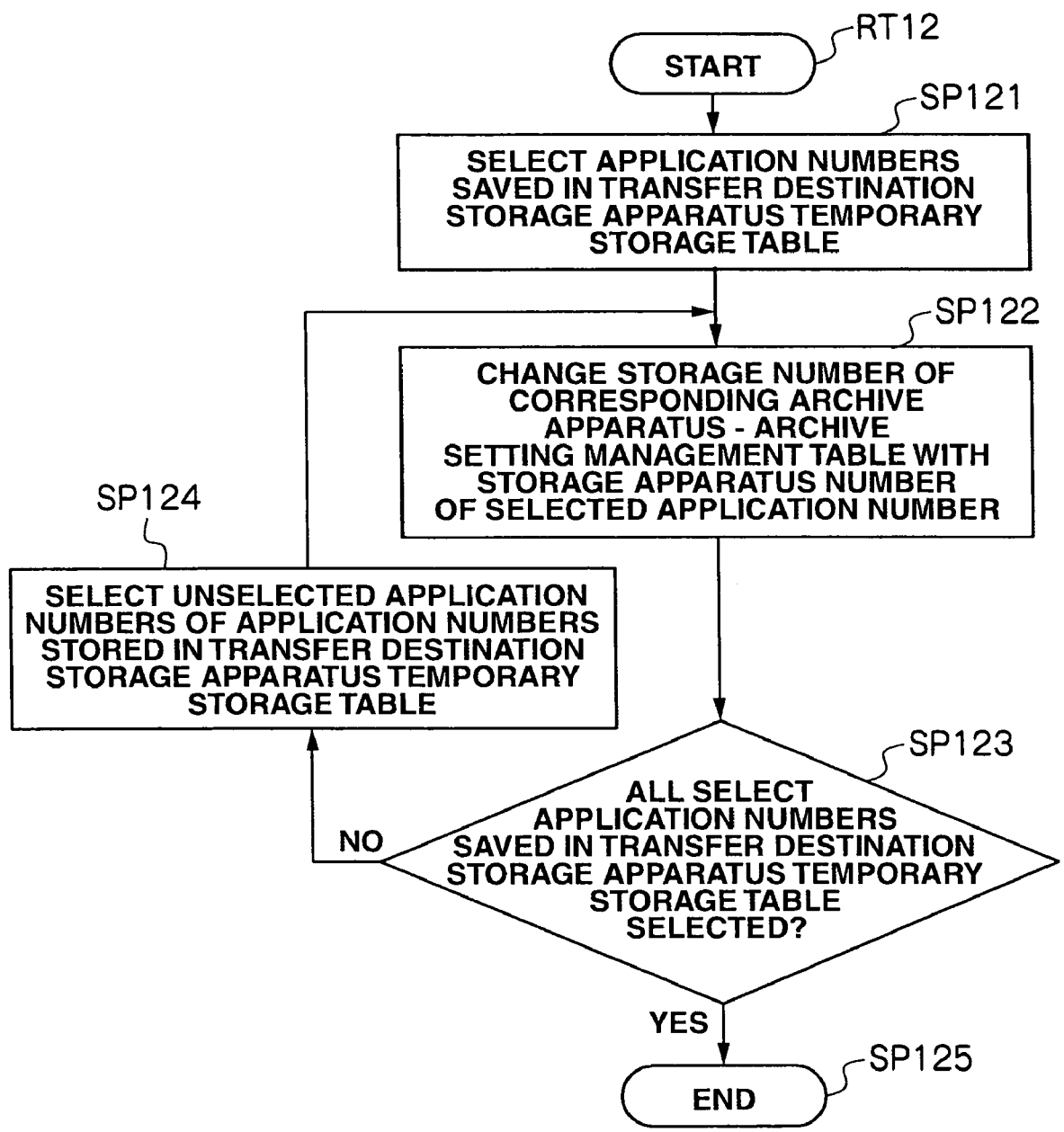
FIG. 53 is a flowchart showing a management apparatus side storage apparatus changing processing procedure.

FIG. 53 is an example of a flowchart relating to management apparatus side storage apparatus changing processing for management apparatus 6 at this storage system 1 and show a specific processing procedure for the processor 116 of the management apparatus 6.

In the event that the number of the application moving the data handled by the selected application 23 to the storage apparatus 4 for storage is stored in the application number column 129A of the transfer destination storage apparatus temporary storage table 129 shown in FIG. 21, and the storage number of the storage apparatus 4 of the transfer destination resulting from a predetermined operation is stored in the corresponding transfer destination storage apparatus number column 129B of the transfer destination storage apparatus temporary storage table 129 (SP114), the processor 116 of the management apparatus 6 selects the application number stored in the application number column 129A of the transfer destination storage apparatus temporary storage table 129 in accordance with management apparatus side storage apparatus changing processing procedure RT12 shown in FIG. 53 (SP121).

The processor 116 of the management apparatus 6 then changes the storage apparatus number stored in the storage apparatus column 122E of the archive apparatus—archive setting management table 122 corresponding to the selected application number with the storage apparatus number stored in the transfer destination storage apparatus column 129B of the transfer destination storage apparatus temporary storage table 129 corresponding to the selected application number (SP122).

Continuing on, processor 116 of the management apparatus 6 checks whether or not all of the application numbers stored in the application number column 129A of the transfer destination storage apparatus temporary storage table 129 have been selected (SP123).

In the event that all of the application numbers stored in the application number column 129A of the transfer destination storage apparatus temporary storage table 129 have not been selected (SP123: NO), the processor 116 of the management apparatus 6 selects unselected application numbers of the application numbers stored in the application number column 129A of the transfer destination storage apparatus temporary storage table 129 (SP124). After this, the step SP122 of changing the storage apparatus number stored in the storage apparatus column 122E of the archive apparatus—archive setting management table 122 corresponding to the selected application number with the storage apparatus number stored in the transfer destination storage apparatus column 129B of the transfer destination storage apparatus temporary storage table 129 corresponding to the selected application number is then returned to, and the same processing is repeated (SP122 to SP123).

With regards to this, in the event that all of the application numbers stored in the application number column 129A of the transfer destination storage apparatus temporary storage table 129 are selected (SP123: YES), the processor 116 of the management apparatus 6 then ends the management apparatus side storage apparatus changing processing procedure RT12 shown in FIG. 53 (SP125).

In the event that the management apparatus side storage apparatus changing processing procedure RT12 shown in FIG. 53 is complete (SP125), the processor 116 of the management apparatus 6 executes archive apparatus side storage apparatus changing processing (RT13).

Figure 54:
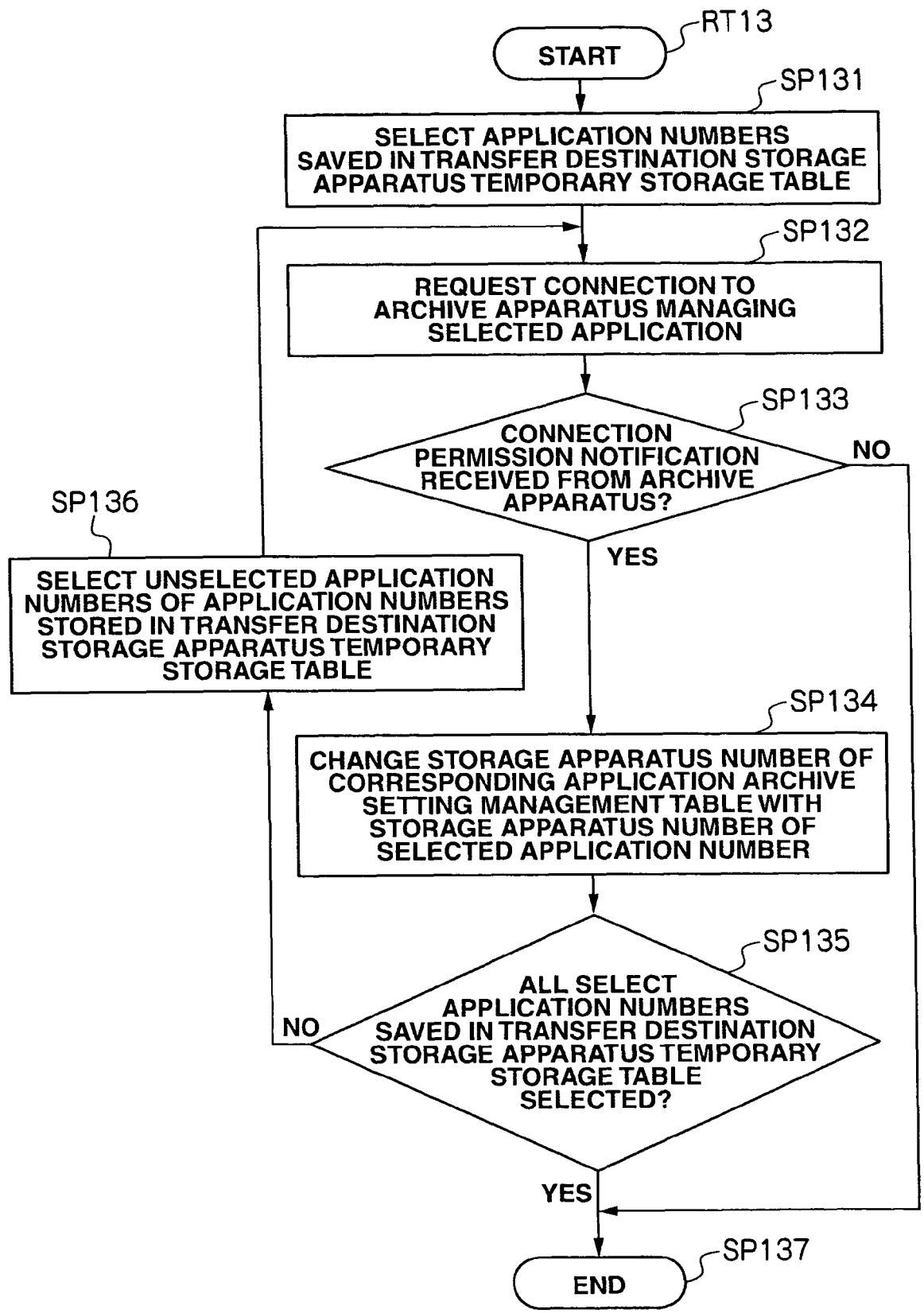
FIG. 54 is a flowchart showing an archive apparatus side storage apparatus changing processing procedure.

FIG. 54 is an example of a flowchart relating to archive apparatus side storage apparatus changing processing for management apparatus 6 at this storage system 1 and show a specific processing procedure for the processor 116 of the management apparatus 6.

In the event that the management apparatus side storage apparatus changing processing procedure RT12 shown in FIG. 53 is complete (SP125), the processor 116 of the management apparatus 6 selects the application number stored in the application number column 129A of the transfer destination storage apparatus temporary storage table 129 in accordance with archive apparatus side storage apparatus changing processing procedure RT13 shown in FIG. 54 (SP131).

The processor 116 of the management apparatus 6 then refers to the archive apparatus—archive setting management table 122 shown in FIG. 14, and requests connection to the archive apparatus 3 managing the applications of the selected application numbers (SP132). In this event, the processor 116 of the management apparatus 6 refers to the archive apparatus password management table 125, selects archive apparatus numbers for the archive apparatus 3 managing the applications 23 of the selected application numbers, and requests connections by sending connection requests containing the corresponding user ID's and passwords.

The processor 116 of the management apparatus 6 then checks whether or not connection permission notification has been received from the archive apparatus 3 requesting the connection (SP133). For example, the processor 116 of the management apparatus 6 checks whether or not connection permission notification has been received from the archive apparatus 3 requesting the connection using whether or not connection permission notification is received from the archive apparatus 3 requesting the connection within a predetermined time from transmission of the connection request.

In the event that connection permission notification is not received from the archive apparatus 3 requesting the connection (SP133: NO), the processor 116 of the management apparatus 6 ends the archive apparatus side storage apparatus changing processing procedure RT13 shown in FIG. 54 with an error (SP137), and then ends the application data transfer procedure RT11 shown in FIG. 52 (SP115). For example, in the event that the user ID and password are different, notification that connection is not permitted is received, and connection permission notification is not received.

With regards to this, in the event that connection permission notification is received from the archive apparatus 3 requesting the connection (SP133: YES), the processor 116 of the management apparatus 6 changes the storage apparatus number stored in storage apparatus number column 42D of the application archive setting management table 42 corresponding to the selected application number with the storage apparatus number stored in the transfer destination storage apparatus column 129B of the transfer destination storage apparatus temporary storage table 129 corresponding to the selected application number (SP134). Specifically, the processor 116 of the management apparatus 6 sends a change request to change the storage apparatus number stored in the transfer destination storage apparatus column 129B of the transfer destination storage apparatus temporary storage table 129 corresponding to the selected application number to the archive apparatus 3 requesting the connection. When the change request is received, the archive apparatus 3 changes the number of years to be saved stored in the storage apparatus number column 42D of the application archive setting management table 42 corresponding to the selected application number.

Continuing on, processor 116 of the management apparatus 6 checks whether or not all of the application numbers stored in the application number column 129A of the transfer destination storage apparatus temporary storage table 129 have been selected (SP135).

In the event that all of the application numbers stored in the application number column 129A of the transfer destination storage apparatus temporary storage table 129 have not been selected (SP135: NO), the processor 116 of the management apparatus 6 selects application numbers that have not yet been selected of the application numbers stored in the application number column 129A of the transfer destination storage apparatus temporary storage table 129 (SP136), then, after this, refers to the archive apparatus—archive setting management table 122 shown in FIG. 14, returns to step SP132 of requesting connection to the archive apparatus 3 managing the applications 23 of the selected application numbers, and then repeats the same processing (SP132 to SP135).

With regards to this, in the event that all of the application numbers stored in the application number column 129A of the transfer destination storage apparatus temporary storage table 129 are selected (SP135: YES), the processor 116 of the management apparatus 6 then ends the archive apparatus side storage apparatus changing processing procedure RT13 shown in FIG. 54 (SP137).

In the event that the archive apparatus side storage apparatus changing processing procedure RT13 shown in FIG. 54 is complete (SP137), the processor 116 of the management apparatus 6 then ends the application data transfer procedure RT11 shown in FIG. 52 (SP115).

Figure 55:
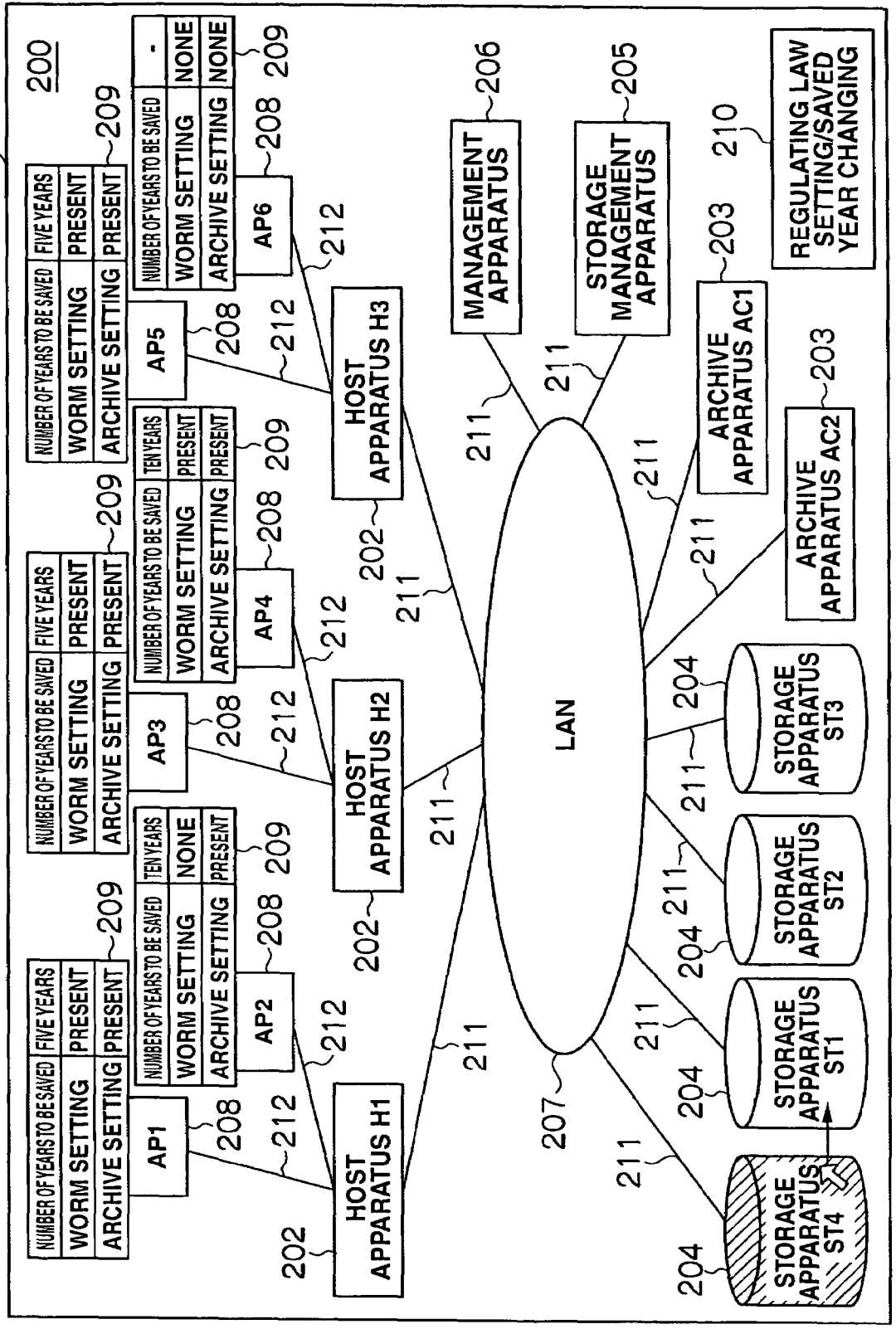
FIG. 55 is a further outline view illustrating a topology display screen in the case of a predetermined operation.
Figure 56:
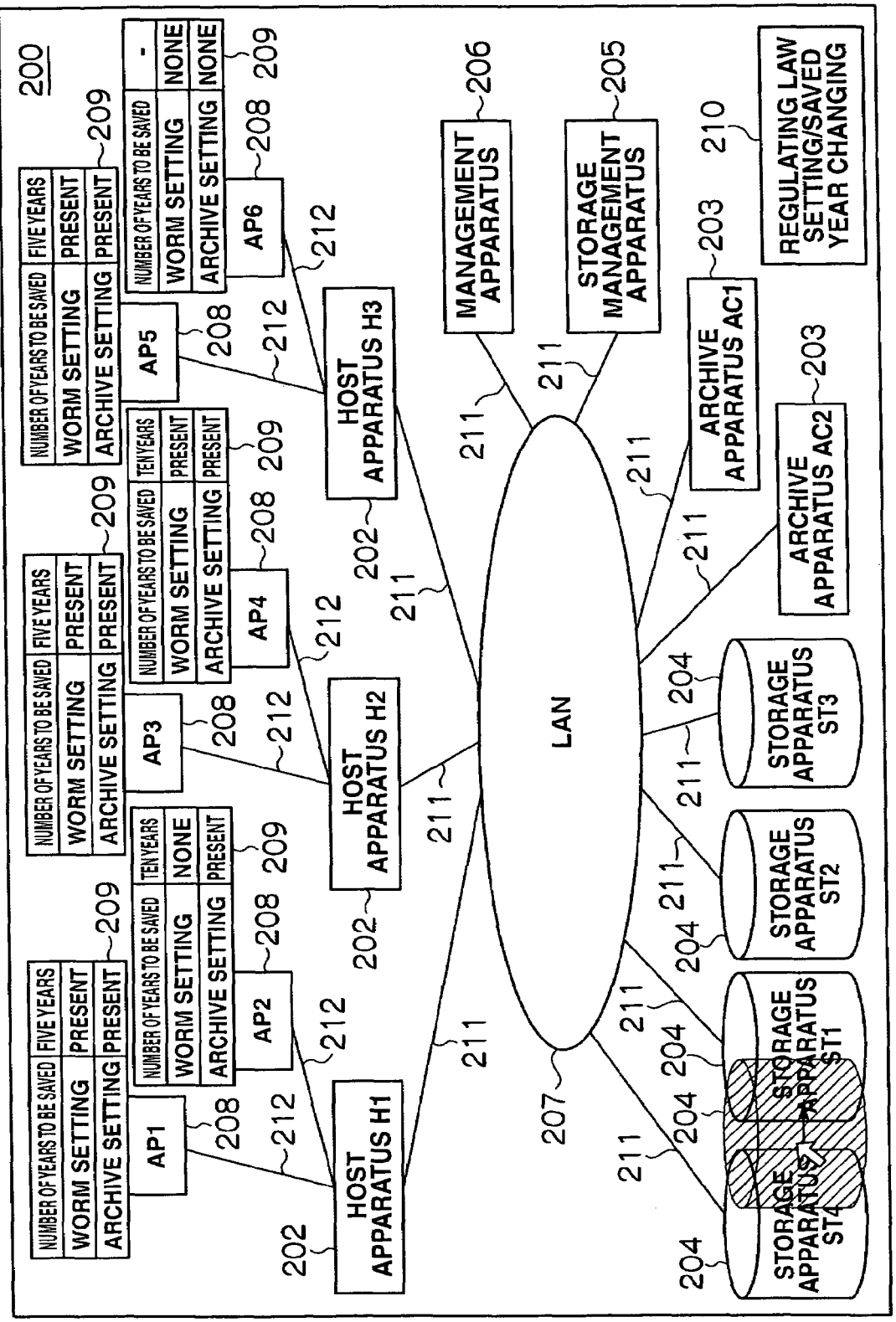
FIG. 56 is another outline view illustrating a topology display screen in the case of a predetermined operation.
Figure 57:
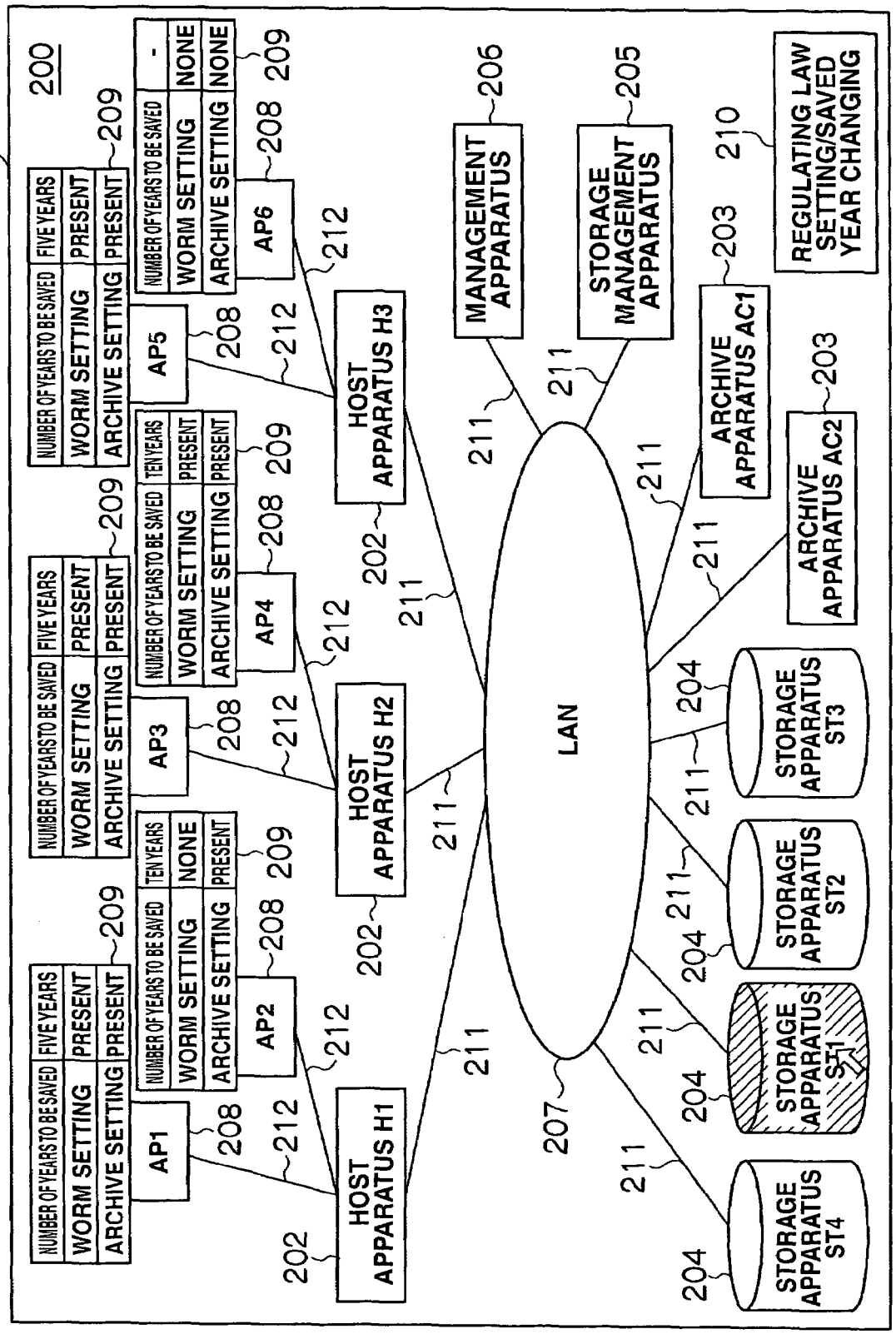
FIG. 57 is a still further outline view illustrating a topology display screen in the case of a predetermined operation.

FIG. 55 to FIG. 57 show the topology display screen 200 for the case of a so-called "drag and drop" operation from the storage apparatus display column 204 of "storage apparatus ST4" to the storage apparatus display column 204 of "storage apparatus ST1". The time of the case where a WORM setting function is not provided at the storage apparatus 4 of "ST4" but WORM setting becomes necessary as a result of amendments to the law etc. is also considered.

In this case, the processor 116 of the management apparatus 6 changes the data handled by the selected application 23 stored in the storage apparatus "ST4" to the storage apparatus 4 of "ST1"

With the storage system 1, at the management apparatus 6, by referring to the connection relationship between the each of the host apparatus 2, archive apparatus 3, storage apparatus 4 and storage management apparatus 5 connected to the management apparatus 6 via the LAN 7, and changing the storage apparatus number of the transfer source storing the data handled by the application 23 to the storage apparatus number of the transfer destination, even in cases where new regulating laws are issued or cases where it is necessary to save new data as a result of amendments etc. of the regulating laws, it is possible to reflect changes of the storage apparatus 4 at the corresponding host apparatus 2, archive apparatus 3, storage apparatus 4 and storage management apparatus 5 without the administrator having the burden of the troublesome operation of performing the data transfer operation at the respective apparatus, data can be transferred to the corresponding storage apparatus 4, and each of the host apparatus 2, archive apparatus 3, storage apparatus 4 and storage management apparatus 5 can be managed in an extremely straightforward manner.

The reflecting of information between the host apparatus 2 and the archive apparatus 3, between the archive apparatus 3 and the storage apparatus 4, and between the storage apparatus 4 and the storage management apparatus 5 and the moving of the data between storage apparatus 4 based on transfer instructions can be realized using related art technology.

(4-7) Saved Number of Year Manual Changing Processing

Figure 58:
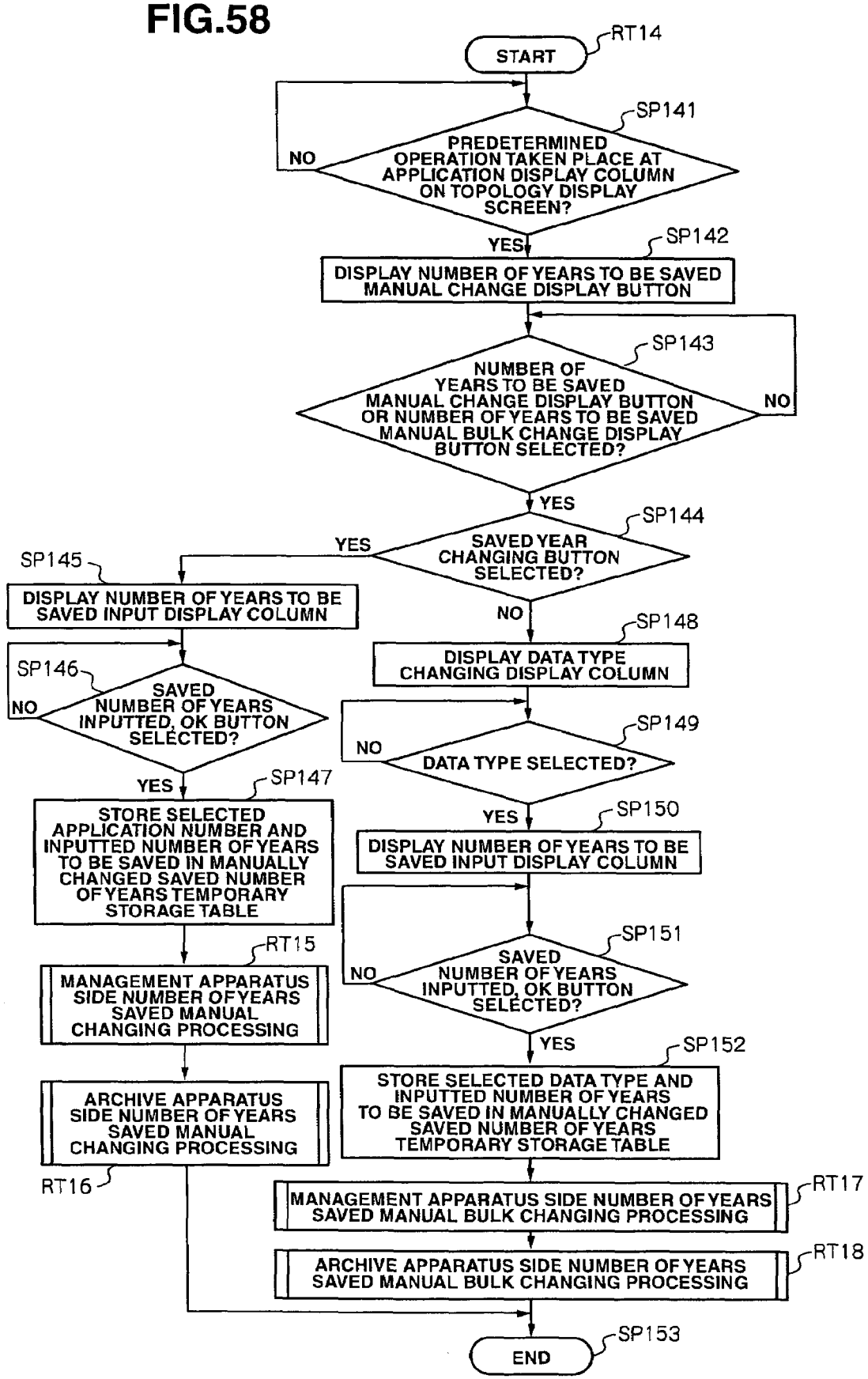
FIG. 58 is a flowchart showing a saved number of years manual changing processing procedure.

FIG. 58 is an example of a flowchart relating to saved number of years manual changing processing for management apparatus 6 at this storage system 1 and show a specific processing procedure for the processor 116 of the management apparatus 6.

In the event that the topology display processing RT1 shown in FIG. 36 is finished (SP5), by executing saved number of years manual changing processing program 147 for manually changing the number of years data handled by the application 23 is saved for, the processor 116 of the management apparatus 6 waits in standby mode for a predetermined operation on the application display column 208 of the topology display screen 200 as a result of an operation of an operating section by the administrator of the management apparatus 6, in accordance with saved number of years manual changing processing procedure RT14 shown in FIG. 58 (SP141). For example, the processor 116 of the management apparatus 6 awaits a so-called "right-click" operation on the application display column 208.

In the event that a predetermined operation takes place on the application display column 208 of the topology display screen 200 as a result of an operation of an operating section by the administrator of the management apparatus 6 (SP141: YES), the processor 116 of the management apparatus 6 displays, for example, the number of years to be saved manual change display button 300 at the upper side of the application display column 208 there has been a predetermined operation for, as shown in FIG. 33 on the topology display screen 200 of the display screen 119A of the display apparatus 119 (SP61).

The processor 116 of the management apparatus 6 then awaits selection of the number of years to be saved manual change button 301 or the number of years to be saved manual bulk change button 302 as a result of operation of an operation section by the administrator of the management apparatus 6 in standby mode (SP143).

In the event that the number of years to be saved manual change button 301 or the number of years to be saved manual bulk change button 302 is selected as a result of an operation of an operating section by the administrator of the management apparatus 6 (SP143: YES), the processor 116 of the management apparatus 6 checks whether the number of years to be saved manual change button 301 of the number of years to be saved manual change button 301 and the number of years to be saved manual bulk change button 302 is selected (SP144).

In the event that number of years to be saved manual change button 301 is selected of the number of years to be saved manual change button 301 and the number of years to be saved manual bulk change button 302 (SP144: YES), the processor 116 of the management apparatus 6 displays the number of years to be saved input display column 310 shown in FIG. 34 on the topology display screen 200 of the display screen 119A of the display apparatus 119 (SP145).

The number of years to be saved for is then inputted to the number of years to be saved input column 311 of the number of years to be saved input display column 310, and the processor 116 of the management apparatus 6 then waits in standby mode for the OK button 313 to be selected (SP146).

In the event that the number of years to be saved is inputted to the number of years to be saved input column 311 of the number of years to be saved input display column 310 and the OK button 313 is selected (SP146: YES), the processor 116 of the management apparatus 6 stores the application number of the application display column 208 subjected to a predetermined operation in the application number column 130A of the manually changed saved number of years temporary storage table 130, and stores the inputted saved number of years in the corresponding changed saved number of years column 130C of the manually changed saved number of years temporary storage table 130 (SP147).

Continuing on, the processor 116 of the management apparatus 6 executes management apparatus side saved number of years manual changing processing (RT15).

Figure 59:
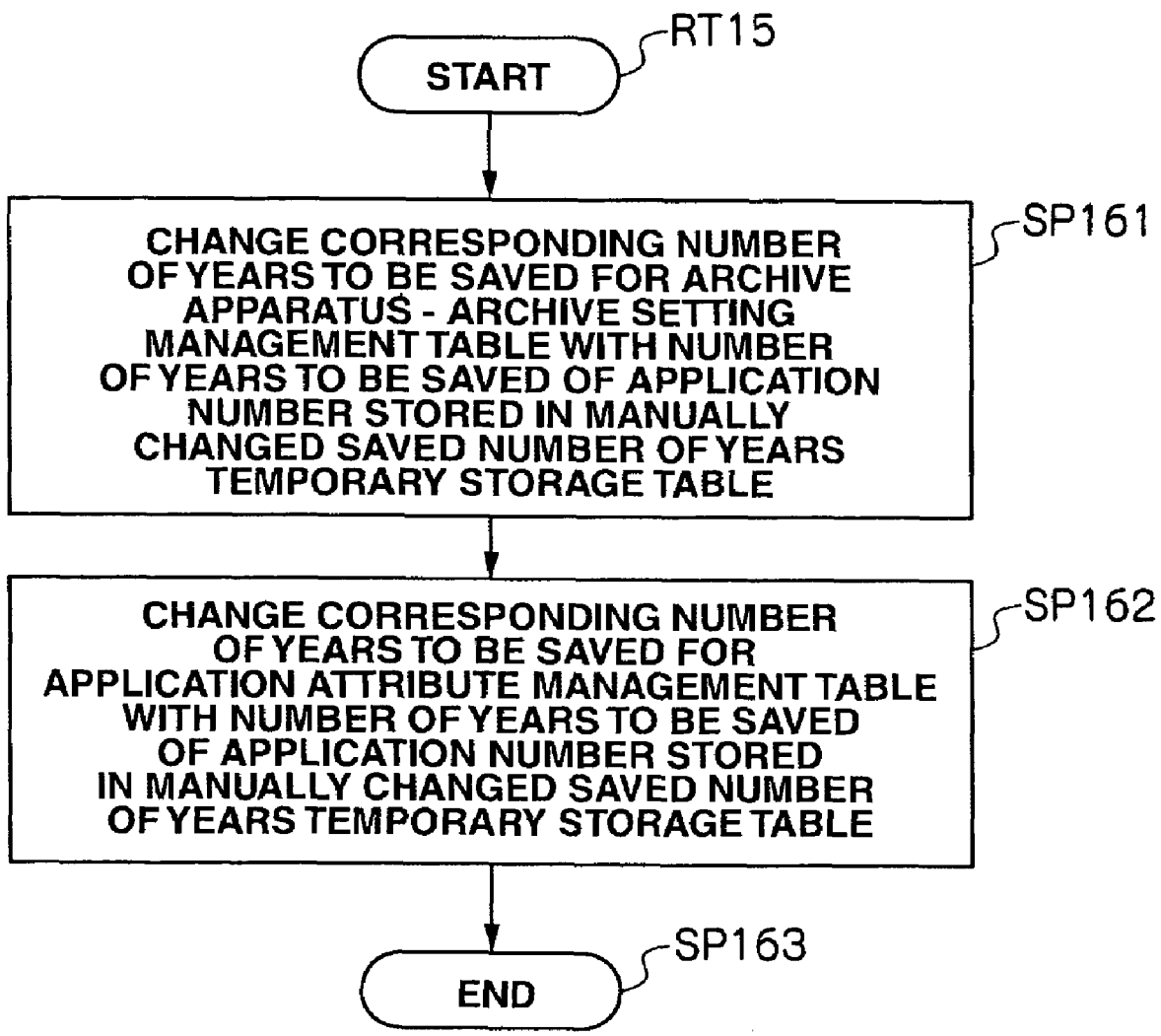
FIG. 59 is a flowchart showing a management apparatus side number of years saved manual changing processing procedure.

FIG. 59 is an example of a flowchart relating to management apparatus side saved number of years manual changing processing for management apparatus 6 at this storage system 1 and show a specific processing procedure for the processor 116 of the management apparatus 6.

In the event that the application number of the application display column 208 subjected to a predetermined operation is stored in the application number column 130A of the manually changed saved number of years temporary storage table 130, and the inputted number of years to be saved is stored in the corresponding changed number of years to be saved column 130C of the manually changed saved number of years temporary storage table 130 (SP147), the saved number of years stored in the saved number of years column 122D of the archive apparatus-archive setting management table 122 corresponding to the application number stored in the application number column 130A of the manually changed saved number of years temporary storage table 130 is changed by the processor 116 of the management apparatus 6 to the number of years saved stored in the changed number of years saved column 130C of the manually changed saved number of years temporary storage table 130 corresponding to the application number (SP161) in accordance with management apparatus side number of years saved manual changing processing procedure RT15 shown in FIG. 59 (SP161).

The processor 116 of the management apparatus 6 then changes the number of years to be saved stored in the number of years to be saved column 124B of the application attribute management table 124 corresponding to the application number saved in the application number column 130A of the manually changed saved number of years temporary storage table 130 to the saved number of years stored in the changed saved number of years column 130C of the manually changed saved number of years temporary storage table 130 corresponding to the application number (SP162).

The processor 116 of the management apparatus 6 then ends the management apparatus side number of years saved manual changing processing procedure RT15 shown in FIG. 59 (SP163).

Continuing on, the processor 116 of the management apparatus 6 executes management apparatus side saved number of years manual changing processing (RT16).

Figure 60:
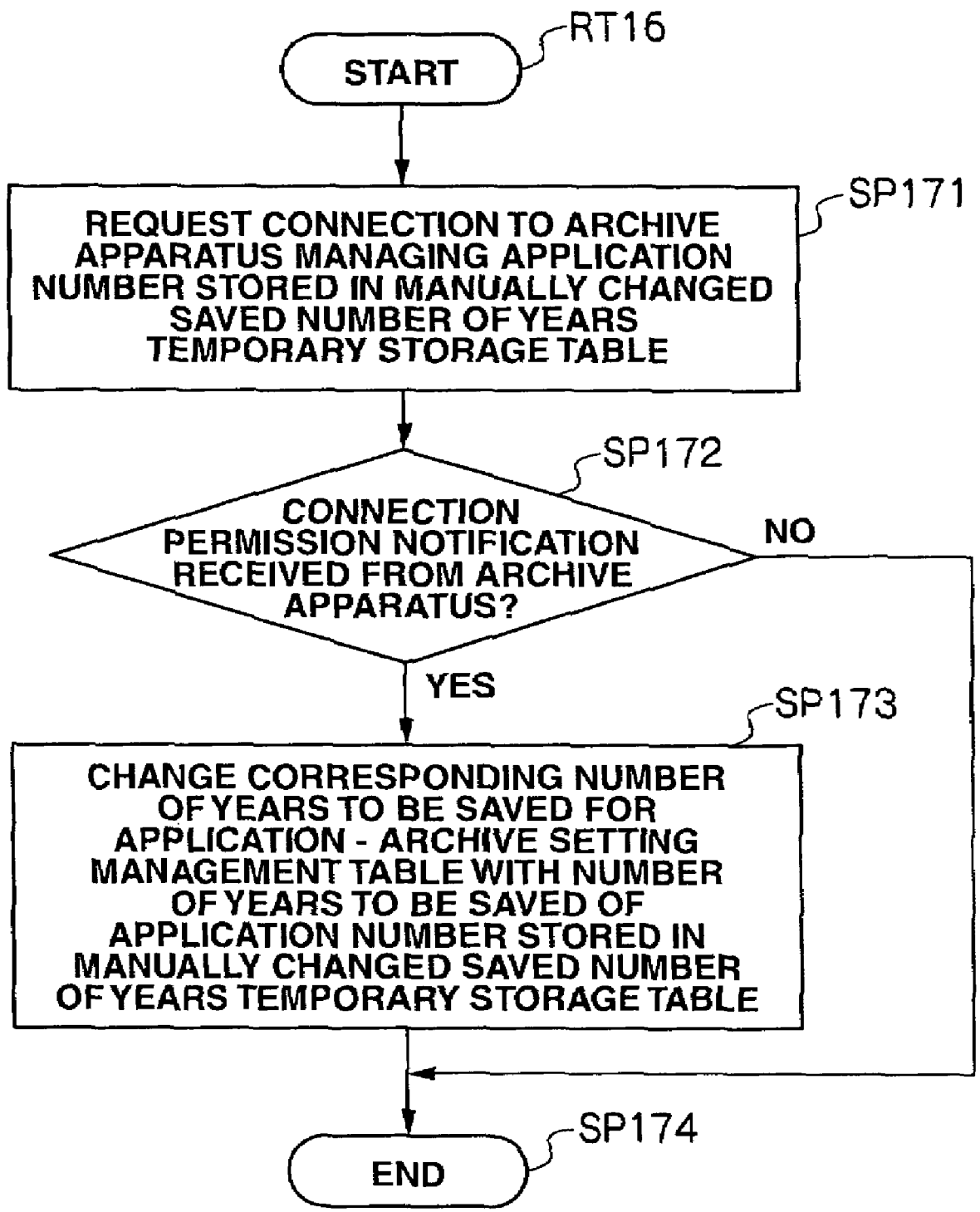
FIG. 60 is a flowchart showing an archive apparatus side number of years saved manual changing processing procedure.

FIG. 60 is an example of a flowchart relating to archive apparatus side saved number of years manual changing processing for management apparatus 6 at this storage system 1 and shows a specific processing procedure for the processor 116 of the management apparatus 6.

In the event that the management apparatus side number of years saved manual changing processing procedure RT15 shown in FIG. 59 is complete (SP163), in accordance with archive apparatus side number of years saved manual changing processing procedure RT16 shown in FIG. 60, the processor 116 of the management apparatus 6 refers to the archive apparatus-archive setting management table 122 shown in FIG. 14, and requests connection to the archive apparatus 3 managing the application 23 of the application number stored in the application number column 130A of the manually changed saved number of years temporary storage table 130 (SP171).

The processor 116 of the management apparatus 6 then checks whether or not connection permission notification has been received from the archive apparatus 3 requesting the connection (SP172).

In the event that connection permission notification is not received from the archive apparatus 3 requesting the connection (SP172: NO), the processor 116 of the management apparatus 6 ends the archive apparatus side number of years saved manual changing processing procedure RT16 shown in FIG. 60 with an error (SP174), and then ends the saved number of years manual changing processing procedure RT14 shown in FIG. 58 (SP153).

With regards to this, in the event that connection permission notification is received from the archive apparatus 3 requesting connection (SP172: YES), the processor 116 of the management apparatus 6 changes the number of years saved stored in the number of years saved column 42C of the application archive setting management table 42 corresponding to the application number stored in the application number column 130A of the manually changed saved number of years temporary storage table 130 to the number of years saved in the changed number of years saved column 130C of the manually changed saved number of years temporary storage table 130 corresponding to the application number (SP173). Specifically, the processor 116 of the management apparatus 6 sends a changing request to change the saved number of years stored in the changed saved number of years column 130C corresponding to the application number stored in the application number column 130A of the manually changed saved number of years temporary storage table 130 to the archive apparatus 3 requesting the connection. When the change request is received, the archive apparatus 3 changes the number of years to be saved stored in the number of years to be saved column 42C of the application archive setting management table 42 corresponding to the selected application number stored in the application number column 130A of the manually changed saved number of years temporary storage table 130.

The processor 116 of the management apparatus 6 then ends the archive apparatus side number of years saved manual changing processing procedure RT16 shown in FIG. 60 (SP174).

In the event that the number of years to be saved manual change button 301 of the number of years to be saved manual change button 301 or the number of years to be saved manual bulk change button 302 is not selected, i.e. in the case that the number of years to be saved manual bulk change button 302 is selected (SP144: NO), the processor 116 of the management apparatus 6 displays data type changing display column 320 shown in FIG. 35 on the topology display screen 200 of the display screen 119A of the display apparatus 119 (SP148).

The processor 116 of the management apparatus 6 then waits in standby mode for one of the data types displayed at the data type changing display column 320 to be selected as a result of an operation of an operating section by the administrator of the management apparatus 6 (SP149).

In the event that one of the data types displayed at the data type changing display column 320 is selected as a result of an operation of an operating section by the administrator of the management apparatus 6 (SP149: YES), the processor 116 of the management apparatus 6 displays the number of years to be saved input display column 310 shown in FIG. 34 on the topology display screen 200 of the display screen 119A of the display apparatus 119 (SP150).

The number of years to be saved for is then inputted to the number of years to be saved input column 311 of the number of years to be saved input display column 310, and the processor 116 of the management apparatus 6 then waits in standby mode for the OK button 313 to be selected (SP151).

In the event that the number of years to be saved is inputted to the number of years to be saved input column 311 of the number of years to be saved input display column 310 (SP151: YES), the processor 116 of the management apparatus 6 stores the selected data type in the data type column 130B of the manually changed saved number of years temporary storage table 130, and stores the inputted number of years to be saved in the number of years to be saved column 130C of the manually changed saved number of years temporary storage table 130 (SP152).

Continuing on, the processor 116 of the management apparatus 6 executes management apparatus side saved number of years manual bulk changing processing (RT17).

Figure 61:
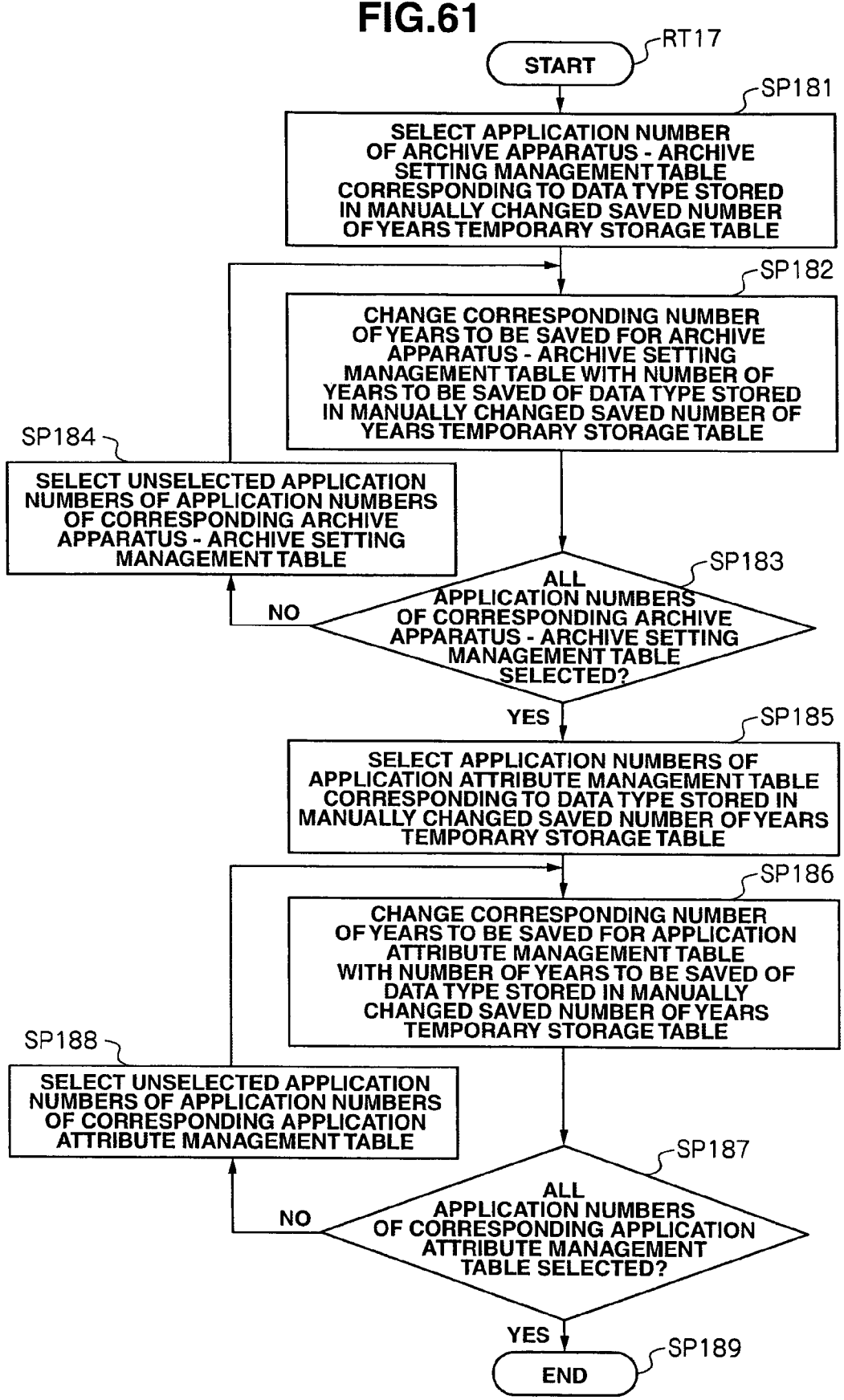
FIG. 61 is a flowchart showing a management apparatus side number of years saved manual bulk changing processing procedure.

FIG. 61 is an example of a flowchart relating to management apparatus side saved number of years manual bulk changing processing for management apparatus 6 at this storage system 1 and show a specific processing procedure for the processor 116 of the management apparatus 6.

In the event that the selected data type is stored in the data type column 130B of the manually changed saved number of years temporary storage table 130, and the inputted number of years to be saved is stored in the number of years to be saved column 130C of the manually changed saved number of years temporary storage table 130 (SP152), the processor 116 of the management apparatus 6 selects the application number stored in the application number column 122B of the archive apparatus-archive setting management table 122 corresponding to the data type stored in the data type column 130B of the manually changed saved number of years temporary storage table 130, in accordance with management apparatus side saved number of years manual bulk changing processing procedure RT17 (SP181).

The processor 116 of the management apparatus 6 then changes the number of years to be saved stored in the number of years to be saved column 122D of the archive apparatus-archive setting management table 122 corresponding to the application number stored in the application number column 122B of the archive apparatus-archive setting management table 122 with the number of years to be saved stored in the changed number of years to be saved column 130C of the manually changed saved number of years temporary storage table 130 corresponding to the data type stored in the data type column 130B of the manually changed saved number of years temporary storage table 130 (SP182).

The processor 116 of the management apparatus 6 then checks whether or not all of the application numbers stored in the application number column 122B of the archive apparatus-archive setting management table 122 corresponding to the data type stored in the data type column 130B of the manually changed saved number of years temporary storage table 130 have been selected (SP183).

In the event that all of the application numbers stored in the application number column 122B of the archive apparatus-archive setting management table 122 corresponding to the data type stored in the data type column 130B of the manually changed saved number of years temporary storage table 130 have not been selected (SP183: NO), the processor 116 of the management apparatus 6 selects unselected application number of the application numbers stored in the application number column 122B of the archive apparatus-archive setting management table 122 corresponding to the data type stored in the data type column 130B of the manually changed saved number of years temporary storage table 130 (SP184). After this, the step SP182 of changing the number of years to be saved stored in the number of years to be saved column 122D of the archive apparatus-archive setting management table 122 corresponding to the application number stored in the application number column 122B of the archive apparatus-archive setting management table 122 with the number of years to be saved stored in the changed number of years to be saved column 130C of the manually changed saved number of years temporary storage table 130 corresponding to the data type stored in the data type column 130B of the manually changed saved number of years temporary storage table 130 is returned to, and the same processing is repeated (SP182, SP183).

On the other hand, in the event that all of the application numbers stored in the application number column 122B of the archive apparatus-archive setting management table 122 corresponding to the data type stored in the data type column 130B of the manually changed saved number of years temporary storage table 130 have been selected (SP183: YES), the processor 116 of the management apparatus 6 selects application numbers stored in the application number column 124A of the application attribute management table 124 corresponding to the data type stored in the data type column 130B of the manually changed saved number of years temporary storage table 130 (SP185).

The processor 116 of the management apparatus 6 then changes the number of years to be saved stored in the number of years to be saved column 124B of the application attribute management table 124 stored in the application number column 124A of the application attribute management table 124 with the number of years to be saved stored in the number of years to be saved column 130C of the manually changed saved number of years temporary storage table 130 corresponding to the data type stored in the data type column 130B of the manually changed saved number of years temporary storage table 130 (SP186).

The processor 116 of the management apparatus 6 then checks whether or not all of the application numbers stored in the application number column 124A of the application attribute management table 124 corresponding to the data type stored in the data type column 130B of the manually changed saved number of years temporary storage table 130 have been selected (SP187).

In the event that all of the application numbers stored in the application number column 124A of the application attribute management table 124 corresponding to the data type stored in the data type column 130B of the manually changed saved number of years temporary storage table 130 have not been selected (SP187: NO), the processor 116 of the management apparatus 6 selects unselected application numbers of the application numbers stored in the application number column 124A of the application attribute management table 124 corresponding to the data type stored in the data type column 130B of the manually changed saved number of years temporary storage table 130 (SP188). After this, the step SP186 of changing the number of years to be saved stored in the number of years to be saved column 124B of the application attribute management table 124 corresponding to the application number stored in the application number column 124A of the application attribute management table 124 with the number of years to be saved stored in the number of years to be saved column 130C of the manually changed saved number of years temporary storage table 130 corresponding to the data type stored in the data type column 130B of the manually changed saved number of years temporary storage table 130 is returned to, and the same processing is then repeated (SP186, SP187).

On the other hand, in the event that all of the application numbers stored in the application number column 124A of the application attribute management table 124 corresponding to the data type stored in the data type column 130B of the manually changed saved number of years temporary storage table 130 have been selected (SP187: YES), the processor 116 of the management apparatus 6. then ends the management apparatus side saved number of years manual bulk changing processing procedure RT17 shown in FIG. 61 (SP189).

Continuing on, the processor 116 of the management apparatus 6 executes management apparatus side saved number of years manual bulk changing processing (RT18).

Figure 62:
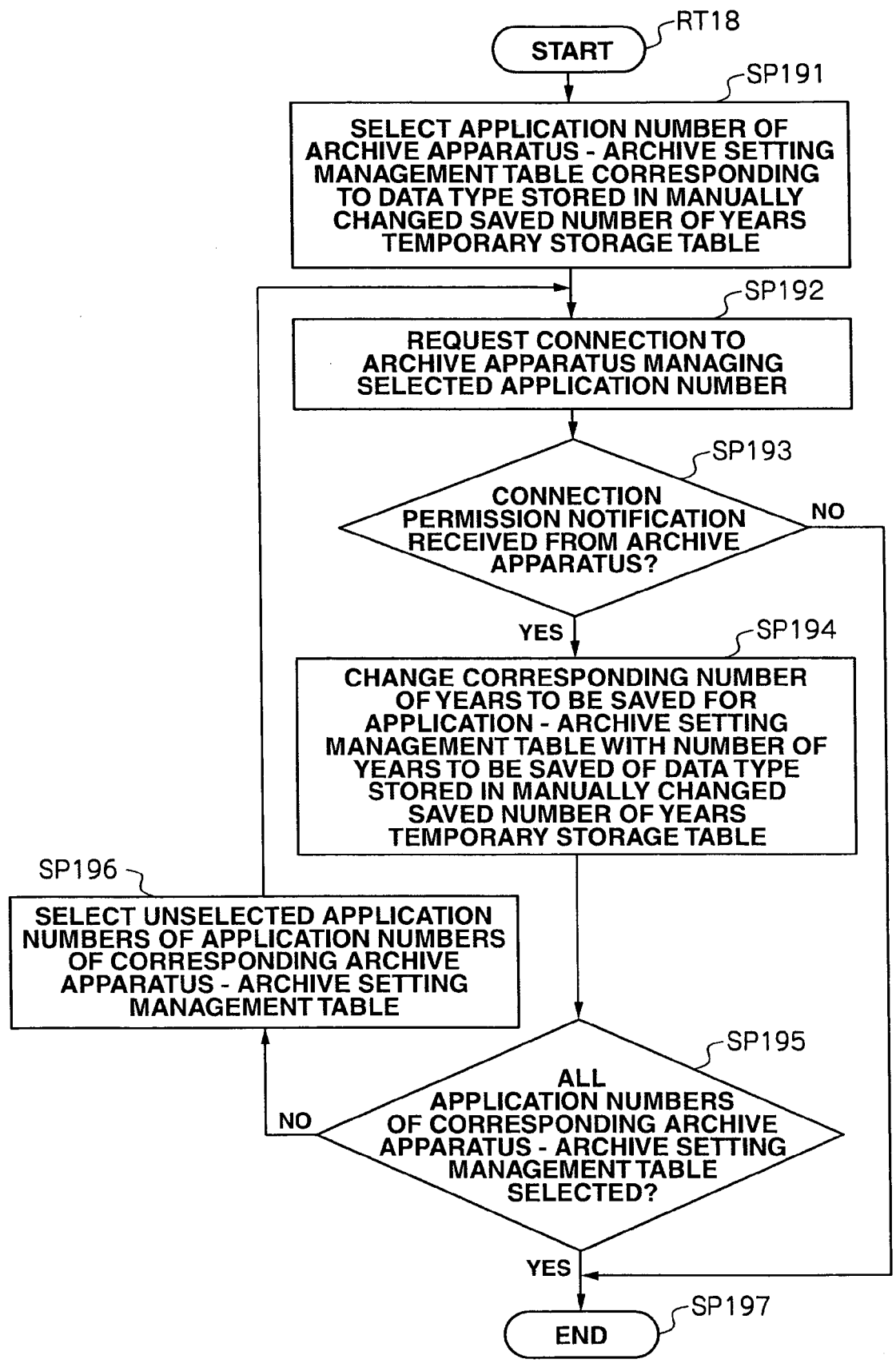
FIG. 62 is a flowchart showing an archive apparatus side number of years saved manual bulk changing processing procedure.

FIG. 62 is an example of a flowchart relating to archive apparatus side saved number of years manual bulk changing processing for management apparatus 6 at this storage system 1 and shows a specific processing procedure for the processor 116 of the management apparatus 6.

In the event that the management apparatus side saved number of years manual bulk changing processing procedure RT17 shown in FIG. 61 is complete (SP189), the processor 116 of the management apparatus 6 selects the application number stored in the application number column 122B of the archive apparatus-archive setting management table 122 corresponding to the data type stored in the data type column 130B of the manually changed saved number of years temporary storage table 130, in accordance with the archive apparatus side number of years saved manual bulk changing processing procedure RT18 shown in FIG. 62 (SP191).

The processor 116 of the management apparatus 6 the requests connection to the archive apparatus 3 for managing the application 23 of the selected application number (SP192).

The processor 116 of the management apparatus 6 then checks whether or not connection permission notification has been received from the archive apparatus 3 requesting the connection (SP193).

In the event that connection permission notification is not received from the archive apparatus 3 requesting the connection (SP193: NO), the processor 116 of the management apparatus 6 ends the archive apparatus side number of years saved manual bulk changing processing procedure RT18 shown in FIG. 62 with an error (SP197), and then ends the saved number of years manual changing processing procedure RT14 shown in FIG. 58 (SP153).

On the other hand, in the event that connection permission notification is received from the archive apparatus 3 requesting the connection (SP193: YES), the processor 116 of the management apparatus 6 changes the number of years to be saved stored in the number of years to be saved column 42C of the application archive setting management table 42 corresponding to the application number stored in the application number column 122B of the archive apparatus-archive setting management table 122 corresponding to the data type stored in the data type column 130B of the manually changed saved number of years temporary storage table 130 with the number of years to be saved stored in the changed number of years to be saved column 130C of the manually changed saved number of years temporary storage table 130 corresponding to the data type stored in the data type column 130B of the manually changed saved number of years temporary storage table 130 (SP194). Specifically, the processor 116 of the management apparatus 6 sends a changing request to change the saved number of years stored in the changed saved number of years column 130C corresponding to the data type stored in the data type column 130B of the manually changed saved number of years temporary storage table 130 to the archive apparatus 3 requesting the connection. Upon receiving the change request, the archive apparatus 3 changes the number of years to be saved stored in the number of years to be saved column 42C of the application archive setting management table 42 corresponding to the application number stored in the application number column 122B of the archive apparatus-archive setting management table 122 corresponding to the data type stored in the data type column 130B of the manually changed saved number of years temporary storage table 130.

The processor 116 of the management apparatus 6 then checks whether or not all of the application numbers stored in the application number column 122B of the archive apparatus-archive setting management table 122 corresponding to the data type stored in the data type column 130B of the manually changed saved number of years temporary storage table 130 have been selected (SP195).

In the event that all of the application numbers stored in the application number column 122B of the archive apparatus-archive setting management table 122 corresponding to the data type stored in the data type column 130B of the manually changed saved number of years temporary storage table 130 have not been selected (SP195: NO), the processor 116 of the management apparatus 6 selects unselected application numbers of the application numbers stored in the application number column 122B of the archive apparatus-archive setting management table 122 corresponding to the data type stored in the data type column 130B of the manually changed saved number of years temporary storage table 130 (SP196), the step SP192 of requesting connection to the archive apparatus 3 managing the applications of the selected application numbers is returned to, and the same processing is repeated (SP192 to SP195).

On the other hand, in the event that all of the application numbers stored in the application number column 122B of the archive apparatus-archive setting management table 122 corresponding to the data type stored in the data type column 130B of the manually changed saved number of years temporary storage table 130 have been selected (SP195: YES), the processor 116 of the management apparatus 6 then ends the archive apparatus side number of years saved manual bulk changing processing procedure RT18 shown in FIG. 62 (SP197).

With this kind of storage system 1, at the management apparatus 6, by changing the current number of years to be saved based on the input of the number of years to be saved to the number of years to be saved input column 311 of the number of years to be saved input display column 310, even in cases of inputting the number of years to be saved, it is possible to also reflect changes in the number of years to be saved at the corresponding host apparatus 2, archive apparatus 3, storage apparatus 4 and storage management apparatus 5 without the administrator having to perform the troublesome operation of changing the number of years to be saved set at each respective apparatus, and management of each of the host apparatus 2, archive apparatus 3, storage apparatus 4 and storage management apparatus 5 is made substantially more straightforward.

(4-8) Disparate Number of Years to be Saved Emphasized Displaying Processing

Figure 63:
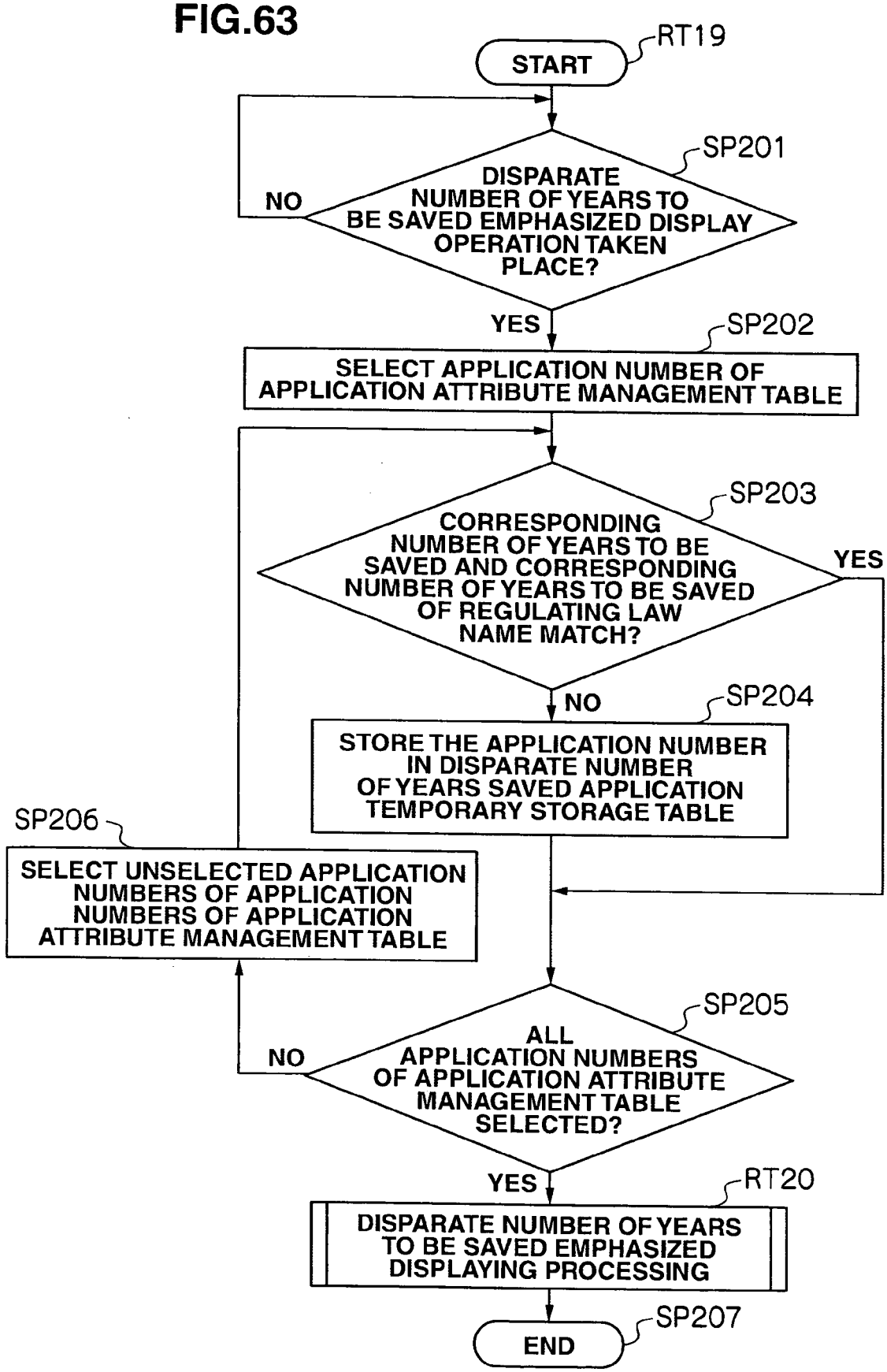
FIG. 63 is a flowchart showing a saved number of years matching confirmation processing procedure.

FIG. 63 is an example of a flowchart relating to saved number of years matching confirmation processing for management apparatus 6 at this storage system 1 and show a specific processing procedure for the processor 116 of the management apparatus 6.

When the topology display screen 200 is displayed, as a result of confirming that the number of years to be saved that the data handled by the application 23 is to be saved for and the number of years to be saved of the regulating law match, and executing disparate saved number of years emphasized display processing program 148 for displaying the setting information display column 209 for disparate numbers of years saved in an emphasized manner, the processor 116 of the management apparatus 6 waits in standby mode for a disparate number of years to be saved emphasized display operation as a result of an operation of an operating section by the administrator of the management apparatus 6, in accordance with the saved number of years matching confirmation processing procedure RT19 shown in FIG. 63 (SP201).

In the event that there is a disparate saved number of years display operation as a result of an operation of an operating section by the administrator of the management apparatus 6 (SP201: YES), the processor 116 of the management apparatus 6 selects the application number stored in the application number column 124A of the application attribute management table 124 (SP202).

The processor 116 of the management apparatus 6 then checks whether or not the number of years to be saved stored in the number of years to be saved column 124B of the application attribute management table 124 corresponding to the application number stored in the application number column 124A of the application attribute management table 124 and the number of years to be saved obtained by referring to the regulating law management table 123 from the regulating law name stored in the regulating law name column 124E of the application attribute management table 124 corresponding to the application number match (SP203).

In the event that the number of years to be saved stored in the number of years to be saved column 124B of the application attribute management table 124 corresponding to the application number stored in the application number column 124A of the application attribute management table 124 and the number of years to be saved obtained by referring to the regulating law management table 123 from the regulating law name stored in the regulating law name column 124E of the application attribute management table 124 corresponding to the application number match (SP203: YES), the processor 116 of the management apparatus 6 proceeds to step SP205.

In the event that the number of years to be saved stored in the number of years to be saved column 124B of the application attribute management table 124 corresponding to the application number stored in the application number column 124A of the application attribute management table 124 and the number of years to be saved obtained by referring to the regulating law management table 123 from the regulating law name stored in the regulating law name column 124E of the application attribute management table 124 corresponding to the application number do not match (SP203: NO), the processor 116 of the management apparatus 6 stores the application number stored in the application number column 124A of the application attribute management table 124 in the disparate saved number of years saved application number column 131A of the disparate number of years saved application temporary storage table 131 shown in FIG. 23 (SP204).

Processor 116 of the management apparatus 6 then checks whether or not all of the application numbers stored in the application number column 124A of the application attribute management table 124 have been selected (SP205).

In the event that all of the application numbers stored in the application number column 124A of the application attribute management table 124 are not selected (SP205: NO), the processor 116 of the management apparatus 6 selects unselected application numbers of the application numbers stored in the application number column 124A of the application attribute management table 124 (SP206). The step SP203 of checking whether or not the number of years to be saved stored in the number of years to be saved column 124B of the application attribute management table 124 corresponding to the application number stored in the application number column 124A of the application attribute management table 124 and the number of years to be saved obtained by referring to the regulating law management table 123 from the regulating law name stored in the regulating law name column 124E of the application attribute management table 124 corresponding to the application number match is then returned to, and the same processing is then repeated (SP203 to SP205).

Figure 64:
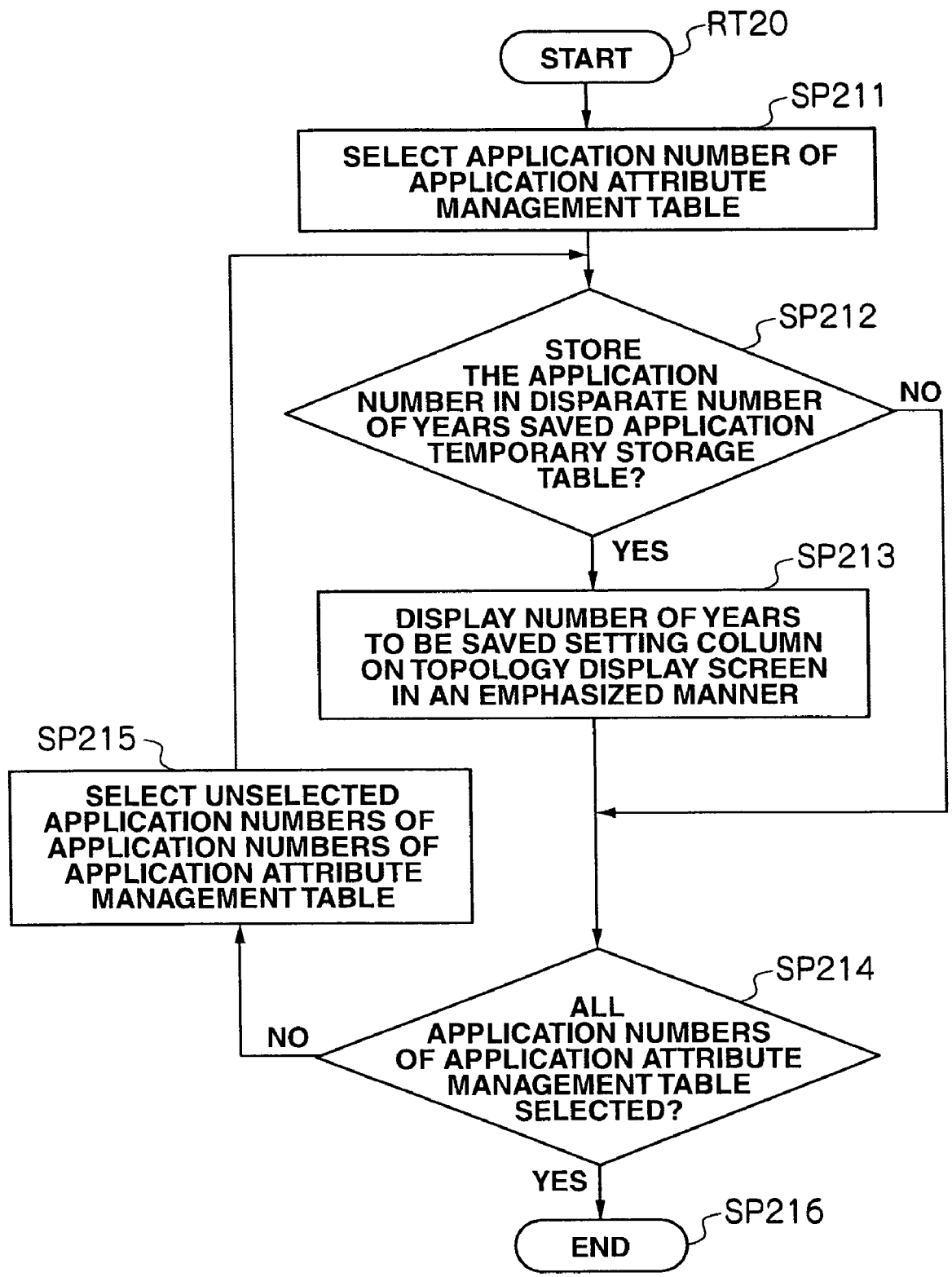
FIG. 64 is a flowchart showing a disparate saved number of years emphasized display processing procedure.

In the event that all of the application numbers stored in the application number column 124A of the application attribute management table 124 have been selected (SP205: YES), the processor 116 of the management apparatus 6 executes the disparate number of years to be saved emphasizing processing (RT20). FIG. 64 is an example of a flowchart relating to disparate saved number of years emphasized display processing for management apparatus 6 at this storage system 1 and show a specific processing procedure for the processor 116 of the management apparatus 6.

In the event that all of the application numbers stored in the application number column 124A of the application attribute management table 124 have been selected (SP205: YES), the processor 116 of the management apparatus 6 selects the application number stored in the application number column 124A of the application attribute management table 124, in accordance with disparate saved number of years emphasized display processing procedure RT20 shown in FIG. 64 (SP211).

The processor 116 of the management apparatus 6 then checks whether or not the selected application number is stored in the disparate number of years to be saved application column 131A of the disparate saved number of years saved application temporary storage table 131 (SP212).

In the event that the selected application number is not stored in the disparate number of years to be saved application column 131A of the disparate saved number of years saved application temporary storage table 131 (SP212: NO), the processor 116 of the management apparatus 6 proceeds to step SP214.

Figure 65:
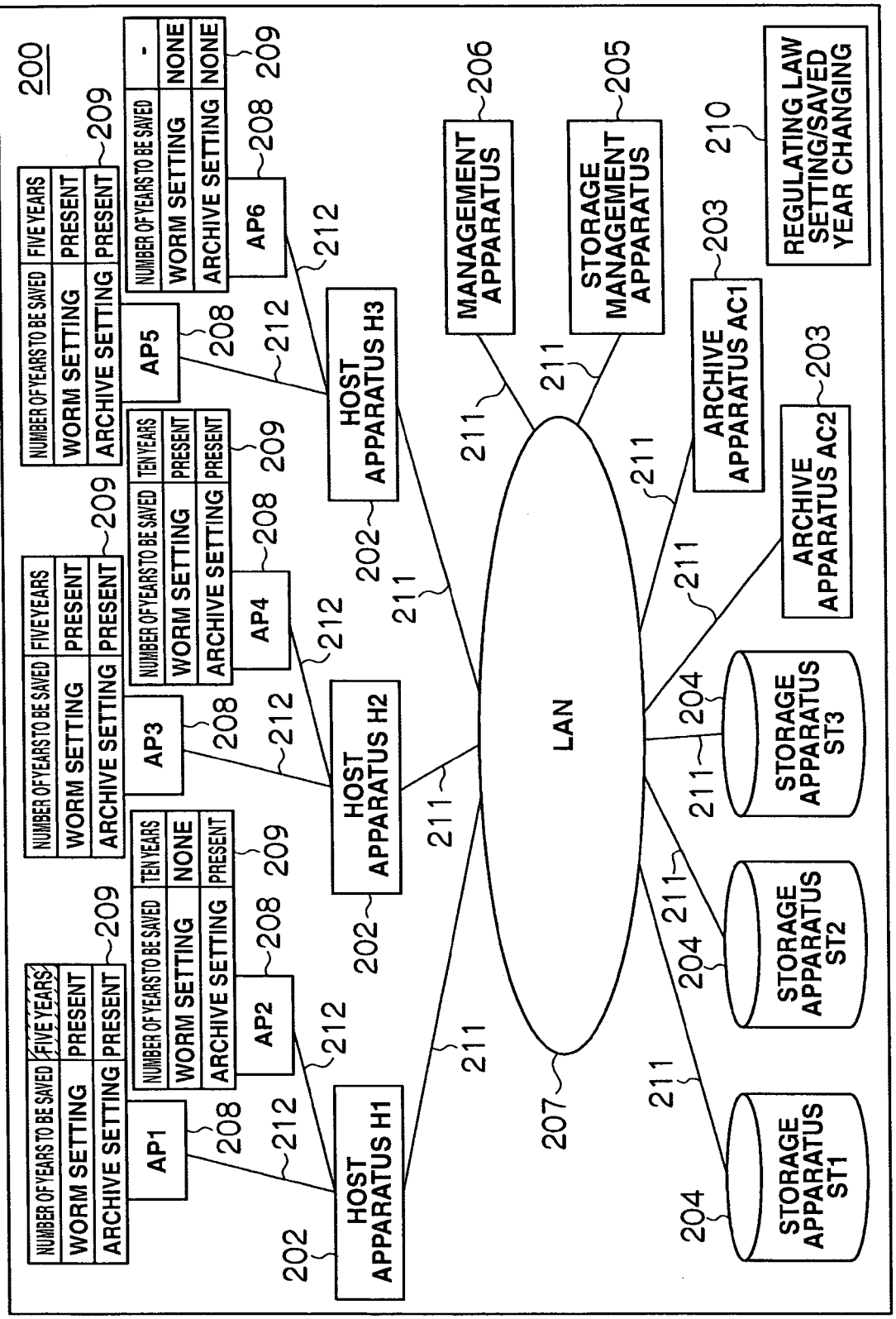
FIG. 65 is a further outline view illustrating a topology display screen in the case of displaying a disparate saved number of years saved in an emphasized manner.

In the event that the selected application is stored in the disparate number of years to be saved application column 131A of the disparate saved number of years saved application temporary storage table 131 (SP212: YES), for example, as shown in FIG. 65, the processor 116 of the management apparatus 6 displays the corresponding number of years to be saved setting column of the setting information column 209 on the topology display screen 200 (SP213).

Processor 116 of the management apparatus 6 then checks whether or not all of the application numbers stored in the application number column 124A of the application attribute management table 124 have been selected (SP214).

In the event that all of the application numbers stored in the application number column 124A of the application attribute management table 124 are not selected (SP214: NO), the processor 116 of the management apparatus 6 selects unselected application numbers of the application numbers stored in the application number column 124A of the application attribute management table 124 (SP215). The step SP212 of checking whether or not the selected application number is stored in the disparate number of years to be saved application column 131A of the disparate saved number of years saved application temporary storage table 131 is then returned to, and the same processing is repeated (SP212 to SP214).

On the other hand, in the event that all of the application numbers stored in the application number column 124A of the application attribute management table 124 have been selected (SP214: YES), the processor 116 of the management apparatus 6 then ends the disparate saved number of years emphasized display processing procedure RT20 shown in FIG. 64 (SP216), and then ends the saved number of years matching confirmation processing procedure RT19 shown in FIG. 63 (SP177).

With this storage system 1, at the management apparatus 6, by referring to the application attribute management table 124, determining whether or not the current number of years to be saved for an application number and a number of years to be saved for a regulating law corresponding to the application number match, and in the case that there are disparities with the number of years to be saved, displaying the corresponding number of years to be saved setting column for the setting information 209 in an emphasized manner on the topology display screen 200, in the event that the number of years to be saved that actual data for applications of the host apparatus is to be saved for and the number of years to be saved recorded in host apparatus do not match, the inconvenience caused the difficulty of detecting such disparities is alleviated, disparities in the numbers of years to be saved can be easily recognized by the administrator, and each of the host apparatus 2, archive apparatus 3, storage apparatus 4 and storage management apparatus 5 can be managed in an extremely straightforward manner. Industrial Field of Utilization The present invention can be broadly applied to storage systems where a plurality of host apparatus, storage apparatus, and management apparatus managing these apparatus are connected together.

What is claimed is:

1. A storage system comprising:
a host apparatus for storing a program;
a host management apparatus for managing the host apparatus;
a first storage apparatus for storing data handled by the program;
a second storage apparatus for storing data handled by the program;
storage management apparatus for managing the first storage apparatus and the second storage apparatus;
an archive apparatus for managing the timing of transfers of data handled by the program, the archive apparatus comprising a memory for storing an application archive setting management table, wherein the application archive setting management table indicates correspondences between the program, a storage apparatus, and a saving period specifying a length of time for which the data of the program should be saved; and
management apparatus for managing the host apparatus, the host management apparatus, the first storage apparatus, the second storage apparatus, and the storage management apparatus,
the management apparatus comprising:
an acquiring section for acquiring a connection relationship between the host apparatus, the host management apparatus, the first storage apparatus and the storage management apparatus, a storage relationship for the program, and a saving period specifying a length of time for which the data of the program should be saved, based on an external operation;
a display control section for displaying the connection relationship and the storage relationship on a display screen, for displaying the saving period of the program on the display screen, for displaying a display symbol that corresponds to the first storage apparatus on the display screen, and for displaying a display symbol that corresponds to the second storage apparatus on the display screen; and
a memory for storing an archive apparatus-archive setting management table, wherein the archive apparatus-archive setting management table indicates a correspondence between the program and a storage apparatus;
a data transfer section, wherein the data transfer section waits in a standby state for a drag and drop operation from the display symbol that corresponds to the first storage apparatus to the display symbol that corresponds to the second storage apparatus, and wherein the data transfer section transfers the data handled by the program from the first storage apparatus to the second storage apparatus in response to the drag and drop operation, wherein the transferring the data handled by the program includes:
updating the archive apparatus-archive setting management table to indicate a correspondence between the program and the second storage apparatus; and
sending a change request to the archive apparatus to update the application archive setting management table to indicate a correspondence between the program and the second storage apparatus;
wherein the archive apparatus, based on the change request, updates the application archive setting management table to indicate a correspondence between the program, the second storage apparatus, and a saving period specifying a length of time for which the data of the program should be saved.

2. The storage system of claim 1, wherein the acquiring section of the management apparatus acquires regulatory law information indicating a saving period specifying a length of time for which the data of the program should be saved, including a legally defined period of time for which the data of the program should be saved in accordance with the acquired regulatory law information, based on an external operation; and the management apparatus comprises:

a changing section for instructing changing of the saving period to the legally defined period, wherein the changing section instructs at least one of the host apparatus, the host management apparatus, the first storage apparatus, the second storage apparatus, and the storage management apparatus to change the saving period to the legally defined period, based on an external operation.

3. The storage system of claim 2, wherein the display control section displays programs acquired by the acquiring section as selectable while the changing section changes the saving period to the legally defined, and the changing section changes the saving period to the legally defined when a program of the programs displayed by the display control section is selected based on an external operation.

4. The storage system of claim 2, wherein the display control section displays a program acquired by the acquiring section where the saving period is not selectable while the changing section changes the saving period to the legally defined, and the changing section changes the saving period to the legally defined when a program is selected based on an external operation, wherein the display control section displays the saving period of the selected program.

5. The storage system according to claim 2, wherein the changing section changes the saving period of the program, if the saving period of the program is not yet set, to the legally defined period according to a data type of the program, based on an external operation.

6. The storage system of claim 1, wherein the display control section displays at least one of a connection relationship for at least one of the host apparatus, the host management apparatus, the first storage apparatus, the second storage apparatus, and the storage management apparatus, and the storage relationship for the program in an emphasized manner, based on external operation.

7. The storage system of claim 1, wherein the display control section displays saving periods only for programs of a specified data type.

8. The storage system of claim 2, wherein the display control section displays the saving period of the program in an emphasized manner when there is a disparity between the saving period of the program and the legally defined period in accordance with regulatory law corresponding to a data type of the program.

9. A storage management method comprising:

a first step including a processor acquiring a connection relationship of a host apparatus for storing a program, a host management apparatus for managing the host apparatus, a first storage apparatus for storing data handled by the program, and storage management apparatus for managing the first storage apparatus, a storage relationship for the program, and a saving period specifying a length of time for which the data of the program should be saved; based on external operation;

a second step including a processor displaying the connection relationship and the storage relationship acquired in the first step on a display screen, displaying the saving period of the program on the display screen, displaying a display symbol that corresponds to the first storage apparatus on the display screen, and displaying a display symbol that corresponds to a second storage apparatus on the display screen; and a third step including;

a memory storing an application archive setting management table, wherein the application archive setting management table indicates correspondences between the program, a storage apparatus, and a saving period specifying a length of time for which the data of the program should be saved;

a memory storing an archive apparatus-archive setting management table, wherein the archive apparatus-archive setting management table indicates a correspondence between the program and a storage apparatus;

a processor waiting in a standby state for a drag and drop operation from the display symbol that corresponds to the first storage apparatus to the display symbol that corresponds to the second storage apparatus; and transferring the data handled by the program from the first storage apparatus to the second storage apparatus in response to the drag and drop operation, wherein transferring the data handled by the program includes:

updating the archive apparatus-archive setting management table to indicate a correspondence between the program and the second storage apparatus; and updating the application archive setting management table to indicate a correspondence between the program, the second storage apparatus, and a saving period specifying a length of time for which the data of the program should be saved.

10. The management method of claim 9, wherein the first step includes acquiring regulatory law information indicating a saving period specifying a length of time for which the data of the program should be saved, including a legally defined period of time for which the data of the program should be saved in accordance with the acquired regulatory law information, based on an external operation; wherein the management method further comprises:

a fourth step of instructing at least one of the host apparatus, the host management apparatus, the first storage apparatus, the second storage apparatus, and the storage management apparatus to change the saving period to the legally defined period, based on an external operation.

11. The management method of claim 10, wherein the fourth step includes displaying programs acquired in the first step as selectable while changing the saving period to the legally defined, and changing the saving period to the legally defined when a program displayed in the second step is selected based on an external operation.

12. The management method of claim 10, wherein the fourth step includes displaying the connection relationship and the storage relationship acquired in the first step, wherein any programs for which a saving period is not set are displayed as selectable, and changing the saving period to the regulated saving period, and changing the saving period to the legally defined when a program where the saving period is not displayed in the second step is selected based on external operation.

13. The management method of claim 10, wherein the fourth step includes changing the saving period of the program, if the saving period of the program is not yet set, to the legally defined period according to a data type of the program, based on an external operation.

14. The management method of claim 9, wherein the second step includes displaying at least one of a connection relationship for at least one of the host apparatus, the host management apparatus, the first storage apparatus, the second storage apparatus, and the storage management apparatus, and the storage relationship for the program in an emphasized manner, based on external operation.

15. The management method of claim 9, wherein the second step includes displaying saving periods only for programs of a specified data type.

16. The management method of claim 10, wherein the second step includes displaying the saving period of the program in an emphasized manner when there is a disparity between the saving period of the program and the legally defined period in accordance with regulatory law corresponding to a data type of the program.

17. A storage management apparatus for managing a plurality of apparatus, comprising:

an acquiring section for acquiring a connection relationship for an apparatus, a storage relationship for a program stored at the apparatus, and a saving period specifying a length of time for which the data of the program should be saved;

a display control section for displaying the connection relationship and the storage relationship on a display screen, displaying the saving period on the display screen, displaying a display symbol that corresponds to a first storage apparatus on the display screen, and displaying a display symbol that corresponds to a second storage apparatus on the display screen; and a data transfer section, wherein the data transfer section waits; in a standby state for a drag and drop operation from the display symbol that corresponds to the first storage apparatus to the display symbol that corresponds to the second storage apparatus, and wherein the data transfer section transfers the data handled by the program from the first storage apparatus to the second storage apparatus in response to the drag and drop operation, wherein the transferring the data handled by the program includes:

updating an archive apparatus-archive setting management table to indicate a correspondence between the program and the second storage apparatus based on an application number uniquely identifying a specific application and a storage apparatus number uniquely identifying a specific storage apparatus; and updating an application archive setting management table to indicate a correspondence between the program, the second storage apparatus, and a saving period specifying a length of time for which the data of the program should be saved.

* * * * *